US005928399A

United States Patent [19]

Yakou et al.

[11] Patent Number: 5,928,399

[45] Date of Patent: Jul. 27, 1999

[54] APPARATUS FOR MANUFACTURING AN IMAGE DISPLAY APPARATUS USING BONDING AGENTS

[75] Inventors: Takeshi Yakou, Tokyo; Tomoyuki Kubota, Kawasaki, both of Japan

[73] Assignee: Canon Kabushiki Kaisha, Tokyo, Japan

[21] Appl. No.: 09/179,306

[22] Filed: Oct. 27, 1998

Related U.S. Application Data

[62] Division of application No. 08/756,826, Nov. 26, 1996, Pat. No. 5,855,637.

[30] Foreign Application Priority Data

| | | | |
|---|---|---|---|
| Nov. 27, 1995 | [JP] | Japan | 7-307325 |
| Jun. 4, 1996 | [JP] | Japan | 8-141566 |
| Oct. 28, 1996 | [JP] | Japan | 8-285182 |

[51] Int. Cl.$^6$ .......... C03B 23/20

[52] U.S. Cl. .......... 65/152; 65/155; 65/158; 65/160; 65/162; 65/271; 65/273; 65/374.12; 65/29.12; 65/57

[58] Field of Search .......... 65/29.1, 29.11, 65/29.12, 29.17, 29.19, 42, 43, 57, 59.5, 59.3, 36, 152, 155, 158, 160, 162, 269, 271, 273, 305, 319, 355, 356, 374.12, DIG. 4, DIG. 13; 156/378, 379, 583.1, 349; 432/122, 124

[56] References Cited

U.S. PATENT DOCUMENTS

| | | | |
|---|---|---|---|
| 3,690,856 | 9/1972 | Bryan . | |
| 3,726,658 | 4/1973 | Banks . | |
| 3,728,096 | 4/1973 | Hart et al. . | |
| 3,778,126 | 12/1973 | Wilson | 316/20 |

(List continued on next page.)

FOREIGN PATENT DOCUMENTS

| | | |
|---|---|---|
| 050 294 | 4/1982 | European Pat. Off. . |
| 523 318 | 1/1993 | European Pat. Off. . |
| 58-214245 | 12/1983 | Japan . |
| 59-94343 | 5/1984 | Japan . |
| 64-31332 | 2/1989 | Japan . |
| 2-257551 | 10/1990 | Japan . |
| 3-55738 | 3/1991 | Japan . |
| 4-28137 | 1/1992 | Japan . |
| 94 15244 | 7/1994 | WIPO . |

OTHER PUBLICATIONS

Patent Abstracts of Japan, vol. 008, No. 209, Sep. 22, 1984.

Thin Solid Films, 9(1972) 317–328, G. Dittmer, "Electrical Conduction and Electron Emission of Discontinuous Thin Films".

Radio Engineering and Electronic Physics, Jul. 1965, pp. 1290–1296, M.L. Elinson et al., "The Emission of Hot Electrons and the Field Emission of Electrons from Tin Oxide".

(List continued on next page.)

*Primary Examiner*—Steven P. Griffin
*Attorney, Agent, or Firm*—Fitzpatrick, Cella, Harper & Scinto

[57] ABSTRACT

An apparatus for manufacturing a chamber, the chamber including first and second glass substrates and an enclosure arranged between the substrates or an enclosure and at least one spacer arranged between the substrates. The apparatus includes a pair of heating plates, having heaters therein, for holding the glass substrates, a temperature controller for controlling the temperature of the heaters, a position alignment device for moving at least one of the pair of heating plates in X-, Y-, and θ-directions, a first driving device for driving the position alignment device, a second driving device for moving at least one of the pair of heating plates in a Z-direction, an image monitoring device for monitoring the positions of the first and second substrates, and a control device for supplying a command to one of the first and second driving devices on the basis of information supplied from the image monitoring device

13 Claims, 44 Drawing Sheets

U.S. PATENT DOCUMENTS

| | | | |
|---|---|---|---|
| 3,947,260 | 3/1976 | Salisbury | 65/42 |
| 3,995,941 | 12/1976 | Nagahara et al. | 350/160 |
| 4,407,658 | 10/1983 | Bernot et al. | 445/25 |
| 4,904,895 | 2/1990 | Tsukamoto et al. | 313/336 |
| 5,066,883 | 11/1991 | Yoshioka et al. | 313/309 |
| 5,129,933 | 7/1992 | Muragishi et al. . | |
| 5,145,432 | 9/1992 | Midland et al. | 445/3 |
| 5,167,687 | 12/1992 | Muragishi et al. . | |
| 5,547,483 | 8/1996 | Garcia et al. | 65/42 |

OTHER PUBLICATIONS

International Electron Devices Meeting, 1975, pp. 519–521, M. Hartwell, "Strong Electron Emission from Patterned Tin–Indium Oxide Thin Films".

Journal of the Vacuum Society of Japan, vol. 26, No. 1, pp. 22–29, H. Araki et al., "Electroforming and Electron Emission of Carbon Thin Films".

Journal of Applied Physics, Dec. 1976, vol. 47, No. 12, pp. 5248–5263, C.A. Spindt et al., "Physical Properties of Thin–Film Field Emission Cathodes with Molybdenum Cones".

Journal of Applied Physics, vol. 32, No. 4, Apr., 1961, C.A. Mead, "Operation of Tunnel–Emission Devices".

Advances in Electronics and Electron Physics, vol. 8, 1956, pp. 91–185, W.P. Dyke et al., "Field Emission".

Technical Digest of IVMC 91, Nagahama 1991, R. Meyer et al., pp. 6–9, "Recent Development on 'Microtips' Display at Leti".

APPARATUS FOR MANUFACTURING AN IMAGE DISPLAY APPARATUS USING BONDING AGENTS

This Application is a Divisional of U.S. Application Ser. No. 08/756,826 filed Nov. 26, 1996, now U.S. Pat. No. 5,855,637

BACKGROUND OF THE INVENTION

1. Field of the Invention

The present invention relates to the processes of assembling a flat-panel type image display apparatus and, more particularly, to a manufacturing method and apparatus for an image display apparatus in which upper and lower glass plates are seal-bonded using low-melting point glass.

2. Related Background Art

As an image display apparatus using an electron beam, for example, a flat-panel type image display apparatus has been developed. This image display apparatus comprises an electron-emitting device for generating an electron beam in a vacuum chamber sandwiched between a glass-face plate (substrate) and a glass-rear plate (substrate), and displays an image in such a manner that an electron beam emitted by the electron-emitting device is accelerated and irradiated onto a phosphor to emit light. Such electron-emitting device will be described below.

Conventionally, two types of electron-emitting devices, i.e., thermionic cathode devices and cold cathode devices, are known. The cold cathode devices include, for example, surface conduction type emitting devices, field emission type (to be referred to as "FE" type hereinafter), devices, metal/insulating layer/metal type (to be referred to as "MIM" type hereinafter) devices, and the like.

The surface conduction type electron-emitting device includes, for example, an element described in M. I. Elinson, *Radio Eng. Electron Phys.,* 10, 1290, (1965), and another device to be described below.

The surface conduction type electron-emitting device utilizes a phenomenon in which electron emission occurs when a current flows in a direction parallel to the film surface of a small-area thin film formed on a substrate. As the surface conduction type electron-emitting device, in addition to an element using an $SnO_2$ thin film by Elinson et al. described above, an element using an Au thin film [G. Dittmer, "Thin Solid Films", 9, 317 (1972)], an element using an $In_2O_3/SnO_2$ thin film [M. Hartwell and C. G. Fonstad, "IEEE Trans. ED Conf.", 519 (1975), an element using a carbon thin film [Hisashi Araki et al., "*Vacuum*", Vol. 26, No. 1, 22 (1983)], and the like have been reported.

FIG. 46 is a plan view of the element by M. Hartwell et al., as an example of the typical element arrangement of such surface conduction type emission elements. Referring to FIG. 46, a conductive thin film 3004 consisting of a metal oxide is formed on a substrate 3001 by sputtering. The conductive thin film 3004 is formed into an H-shaped flat pattern. An electron emission portion 3005 is formed by performing an energization process called energization forming (to be described later) on the electro conductive thin film 3004. The interval L in FIG. 46 is set to fall within the range from 0.5 to 1 [mm], and the width W is set to be 0.1 [mm]. Note that FIG. 46 illustrates the electron emission portion 3005 as a rectangular portion formed at the center of the conductive thin film 3004 for the sake of illustrative convenience, but it does not necessarily faithfully express the position or shape of the actual electron emission portion.

In the above-mentioned surface conduction type emission elements such as the element by M. Hartwell et al., it is a common practice to form the electron emission portion 3005 by performing an energization process called energization forming on the conductive thin film 3004 before electron emission. More specifically, in the energization forming the electron emission portion 3005 is formed in an electrically high-resistance state in such a manner that the conductive thin film 3004 is locally destroyed, deformed, or denatured by applying a constant DC voltage or a DC voltage that increases at a very slow rate (e.g., about 1 V/min) across the two ends of the conductive thin film 3004. Note that a fissure is formed on a portion of the locally destroyed, deformed, or denatured conductive thin film. When an appropriate voltage is applied to the conductive thin film after the energization forming, electron emission occurs in the neighborhood of the fissure.

On the other hand, as the FE type elements, for example, an element by W. P. Dyke & W. W. Dolan, "Field emission", *Advance in Electron Physics,* 8, 89 (1956), an element by C. A. Spindt, "Physical properties of thin-film field emission cathodes with molybdenum cones", *J. Appl. Phys.,* 47, 5248 (1976), and the like are known.

FIG. 47 is a sectional view of the above-mentioned element by C. A. Spindt et al., as an example of the typical element arrangement of the FE type element. Referring to FIG. 47, an emitter wiring layer or interconnect 3011 consisting of a conductive material, an emitter cone 3012, an insulating layer 3013, and a gate electrode 3014 are formed on a substrate 3010. This element causes electron emission from the distal end portion of the emitter cone 3012 by applying an appropriate voltage across the emitter cone 3012 and the gate electrode 3014.

In another element arrangement of the FE type element, the emitter and the gate electrode are juxtaposed on the substrate to be substantially parallel to the substrate surface in place of the stacked structure shown in FIG. 47.

As an example of the MIM type element, an element by C. A. Mead, "Operation of Tunnel-emission Devices", *J. Appl. Phys.,* 32, 646 (1961), or the like is known. FIG. 48 shows an example of the typical element arrangement of the MIM type element. FIG. 48 is a sectional view. Referring to FIG. 48, a metal lower electrode 3021, a thin insulating layer 3022 having a thickness of about 100 Å, and a metal upper electrode 3023 having a thickness of 80 to 300 Å are formed on a substrate 3020. The MIM type element causes electron emission from the surface of the upper electrode 3023 upon application of an appropriate voltage across the upper and lower electrodes 3023 and 3021.

The above-mentioned cold cathode devices do not require any heaters since they can obtain electron emission at relatively low temperatures as compared to the thermionic cathode devices. Therefore, the cold cathode device has a simpler structure than the thermionic cathode device, and a very small element can be formed. Even when a large number of elements are arranged on a substrate at a high density, the problem of, e.g., heat melting of the substrate hardly occurs. The thermionic cathode device has a low response speed since it operates upon heating of a heater, while the cold cathode device has a high response speed.

For these reasons, extensive studies have been made to explore effective applications of the cold cathode device.

For example, since the surface conduction type electron-emitting device has the simplest structure and allows the easiest manufacture among the cold cathodes, a large number of elements can be formed over a large area. Hence, the method of driving an array of a large number of elements has been studied, as disclosed in Japanese Laid-Open Patent Application No. 64-31332 by the present applicant.

As for applications of the surface conduction type electron emitting device, for example, image forming apparatuses such as an image display apparatus, an image recording apparatus, and the like, a charged beam source, and the like have been studied.

In particular, as an application to the image display apparatus, as disclosed in U.S. Pat. No. 5,066,883 and Japanese Laid-Open Patent Application No. 2-257551 and No. 4-28137 by the present applicant, an image display apparatus which uses a combination of the surface conduction type electron-emitting device and a phosphor that emits light upon irradiation of an electron beam has been studied. The image display apparatus which uses a combination of the surface conduction type emission element and the phosphor is expected to have higher characteristics than conventional image display apparatuses. For example, the image display apparatus of this type is superior to liquid crystal display apparatuses that have become popular in recent years, since it is of emissive type and requires no backlight, and has a wide field angle.

The method of driving an array of a large number of FE type elements is disclosed in, e.g., U.S. Pat. No. 4,904,895 by the present applicant. As an example of an application of the FE type element to an image display apparatus, a flat-panel type display apparatus reported by R. Meyer et at. is known [R. Meyer, "Recent Development on Microtips Display at LETI", Tech. Digest of 4th Int. Vacuum Microelectronics Conf., Nagahama, pp. 6–9 (1991)].

Also, an example of application of an array of a large number of MIM type elements to an image display apparatus is disclosed in, e.g., Japanese Laid-Open Patent Application No. 3-55738 by the present applicant.

Of the above-mentioned image display apparatuses using the electron-emitting devices, the flat-panel type display apparatus has been receiving a lot of attention as an alternative to a CRT type display apparatus since it can attain a small-space, lightweight structure.

An image display apparatus with the above-mentioned electron-emitting device will be described below. FIG. 49 is an exploded view showing the arrangement of an image display apparatus. FIGS. 50A and 50B are respectively a perspective view and a side view showing the assembled state of the image display apparatus shown in FIG. 49.

Referring to FIG. 49, the image display apparatus is constituted by a glass-face plate 271 having red, blue, and green light-emitting members 271*c* for displaying an image, which are formed on a surface opposing an electron-emitting device 273*c*, a glass-rear plate 273 formed with the electron-emitting device 273*c*, and an outer frame 272 which is manufactured by, e.g., boring glass to constitute a vacuum chamber to be sandwiched between the glass-face plate 271 and the glass-rear plate 273. In order to prevent the vacuum chamber from being destroyed by atmospheric pressure acting on the vacuum chamber, a spacer 74 shown in FIG. 50B is arranged, as needed.

Alignment marks 271*a* and 271*b* used for adjusting the positional relationship between the light-emitting members 271*c* and the electron-emitting device 273*c* are formed on the glass-face plate 271, and alignment marks 273*a* and 273*b* are similarly formed on the glass-rear plate 273. Note that these alignment marks are formed at positions where they do not interfere with the light-emitting members 271*c* and the electron-emitting device 273*c*.

Fusion-bonding surfaces 272*a* and 272*b* of the outer frame 272, which respectively contact the glass-face plate 271 and the glass-rear plate 272, are coated with low-melting point glass in advance, and are pre-baked. The glass-face plate 271, the outer frame 272, and the glass-rear plate 273 are manufactured using soda-lime glass consisting of the same material having the same coefficient of thermal expansion.

In this arrangement, as shown in FIGS. 50A and 50B, the glass-face plate 271 and the glass-rear plate 273 are respectively fusion-bonded to the outer frame 272 by the low-melting point glass applied to the two surfaces of the outer frame 272, thus forming a closed chamber. At this time, the plates 271 and 273 are arranged, so that the alignment mark 271*a* of the glass-face plate 271 and the alignment mark 273*a* of the glass-rear plate 273, and the alignment mark 271*b* of the glass-face plate 271 and the alignment mark 273*b* of the glass-rear plate 273 respectively have predetermined positional relationships therebetween, thereby accurately determining the positional relationship between the light-emitting members 271*c* and the electron-emitting device 273*c*. Such alignment process can prevent color misregistration and luminance variations of characters, images, and the like. Note that the low-melting point glass is in the solid state at normal temperature (room temperature), and is in the molten state at a temperature of 400° C. or higher. Therefore, in order to fusion-bond the glass plates using the low-melting point glass, the temperature cycle including the heating and cooling processes is required.

As a conventional manufacturing method of an image display apparatus assembled by aligning the positions of a plurality of plates, a method proposed by Japanese Laid-Open Patent Application No. 59-94343, a method proposed by Japanese Laid-Open Patent Application No. 58-214245, or the like is known. These references disclose, e.g., a method of aligning the positions of a plurality of plates that constitute a flat-panel type image display apparatus using holes and alignment pins formed on the plates. However, in the method of performing position alignment using the alignment pins, the alignment accuracy may deteriorate depending on the accuracy of the holes and alignment pins formed on the plates.

On the other hand, a method of aligning the positions of a rear plate formed with an electron-emitting device and a face plate serving as a display surface by matching alignment marks formed outside the image display effective area while observing these marks using, e.g., a microscope is known. However, in the method of performing position alignment using alignment marks, when the positions of the plates are aligned to each other using, e.g., a microscope at room temperature, and thereafter, the plates are heated up to 400 to 450° C. to seal-bond (adhere) these plates using low-melting point frit glass, the plates may be displaced from each other due to their thermal expansion.

On the other hand, since the support points for the plates of upper and lower heating plates for heating the face plate and the rear plate do not always match each other, a shearing force acts among the face plate, outer frame, and rear plate due to shrinkage of the upper and lower heating plates in the cooling process after the rear plate is fixed to the face plate, resulting in peeling at the bonded portion. Similarly, in the process of fixing a spacer to the face plate or rear plate as well, a shearing force acts between the plate and spacer during cooling, and peeling at the bonded portion or destruction of the spacer due to low mechanical strength of the spacer may occur.

SUMMARY OF THE INVENTION

The present invention has been made to solve the problems of the related arts, and has as its object to provide a manufacturing method and apparatus for an image display apparatus, which can realize accurate seal-bonding and assembly free from any displacement by aligning the positions of plates at the seal-bonding temperature.

It is another object of the present invention to provide a manufacturing method and apparatus for an image display apparatus, which can prevent the shearing force from acting among a face plate, enclosure, and rear plate, and between the face plate and spacer, or reduce the force.

In order to achieve the above object, according to an embodiment of the present invention, there is provided a method of manufacturing an image display apparatus, which comprises a first substrate on which an electron-emitting device is arranged, a second substrate on which a phosphor that forms an image upon irradiation of an electron emitted by the electron-emitting device is arranged, and an enclosure which is bonded to the first and second substrates to hold a gap between the first and second substrates, comprising the steps of:

applying a bonding agent to bonding portions between the first and second substrates, and the enclosure;

heating to a temperature not less than a softening temperature of the bonding agent;

detecting a solidification state of the bonding agent;

performing position alignment between the first and second substrates during an interval after the bonding agent softens until the bonding agent solidifies;

bonding the first and second substrates via the enclosure by compressing the first substrate and/or the second substrate; and releasing a compression force to the first substrate and/or the second substrate.

According to another aspect, there is provided an apparatus for manufacturing a chamber constituted by first and second substrates, and an enclosure arranged between the first and second substrates or the enclosure and a spacer, comprising:

(a) a pair of heating plates which can respectively hold the first and second substrates and comprise heaters for heating the first and second substrates;

(b) a temperature controller for controlling temperatures of the heaters;

(c) position alignment means for moving at least one of the pair of heating plates in X-, Y-, and θ-directions;

(d) first driving means for driving the position alignment means;

(e) second driving means for moving at least one of the pair of heating plates in a Z-direction;

(f) image reading means for reading positions of the first and second substrates; and (g) control means for supplying a command to one of the first and second driving means on the basis of information supplied from the image reading means.

Other objects and features of the present invention will become apparent from the following description of the specification and the accompanying drawings.

BRIEF DESCRIPTION OF THE DRAWINGS

FIGS. 18A and 18B are views for explaining the contents of a ROM 210 and a RAM 220 arranged in a main control unit 200 of an NC controller 92, in which FIG. 18A is a table showing the architecture of problems stored in the ROM 219, and FIG. 18B is a table showing the architecture of programs stored in the RAM 220;

FIGS. 28A and 28B are views for explaining the detailed correction method of the displacement amount, in which FIG. 28A shows the state wherein the rotation correction of the respective mark positions is performed from the state before correction, and FIG. 28B shows the state upon performing Y-axis correction;

FIGS. 29A and 29B are views for explaining the detailed correction method of the displacement amount, in which FIG. 29A shows the state upon performing X-axis correction, and FIG. 29B shows the positional relationship between the alignment marks upon completion of the position correction;

FIGS. 32A and 32B are flow charts showing detection of the solidification state, in which FIG. 32A shows solidification detection based on torque monitoring, and FIG. 32B shows solidification detection based on the displacement amount before and after correction;

DETAILED DESCRIPTION OF THE PREFERRED EMBODIMENTS

The present invention will be described hereinafter with reference to the accompanying drawings.

Figure 1:
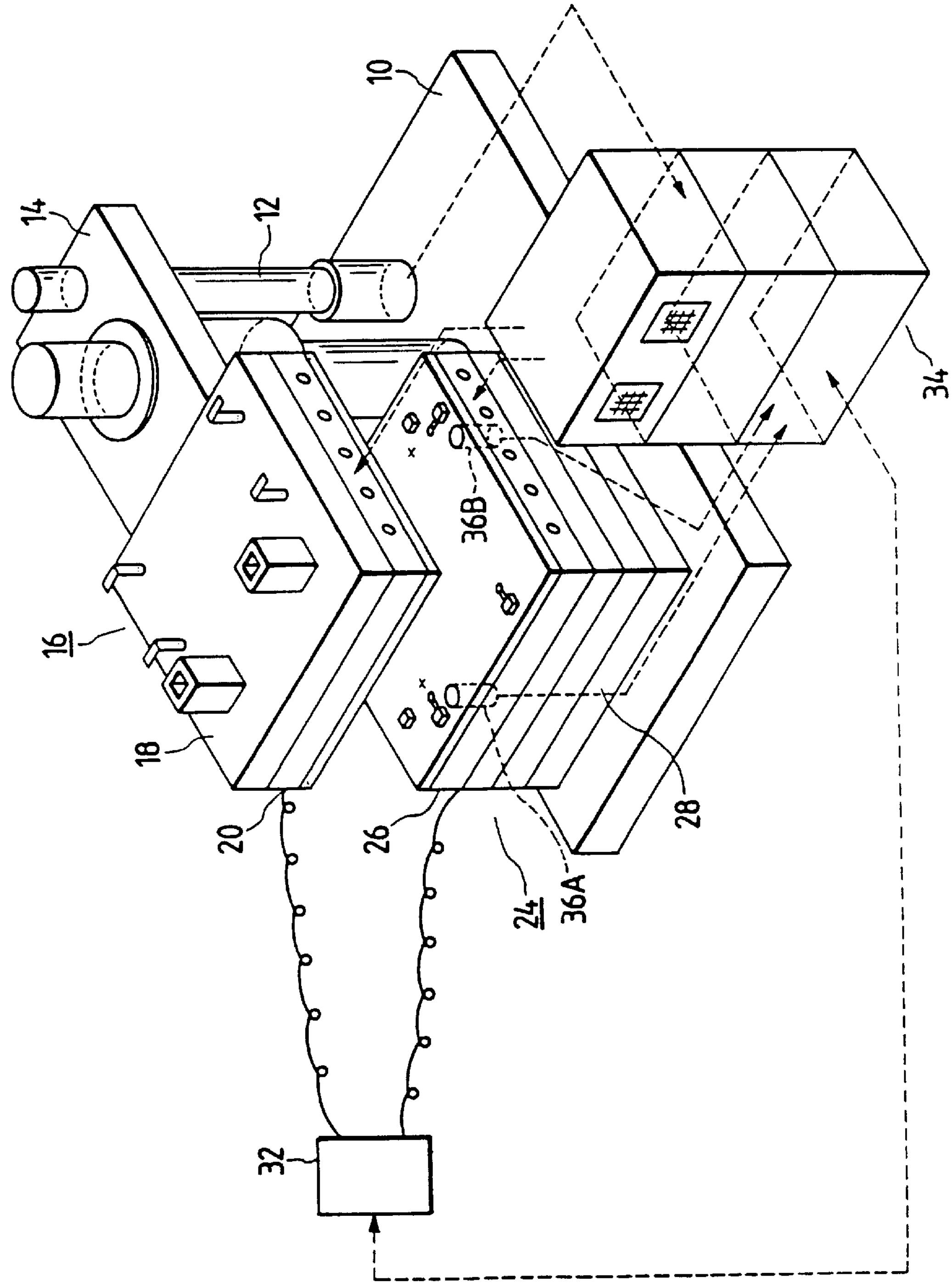
FIG. 1 is an explanatory view of the overall arrangement of an apparatus used in the present invention.
Figure 2:
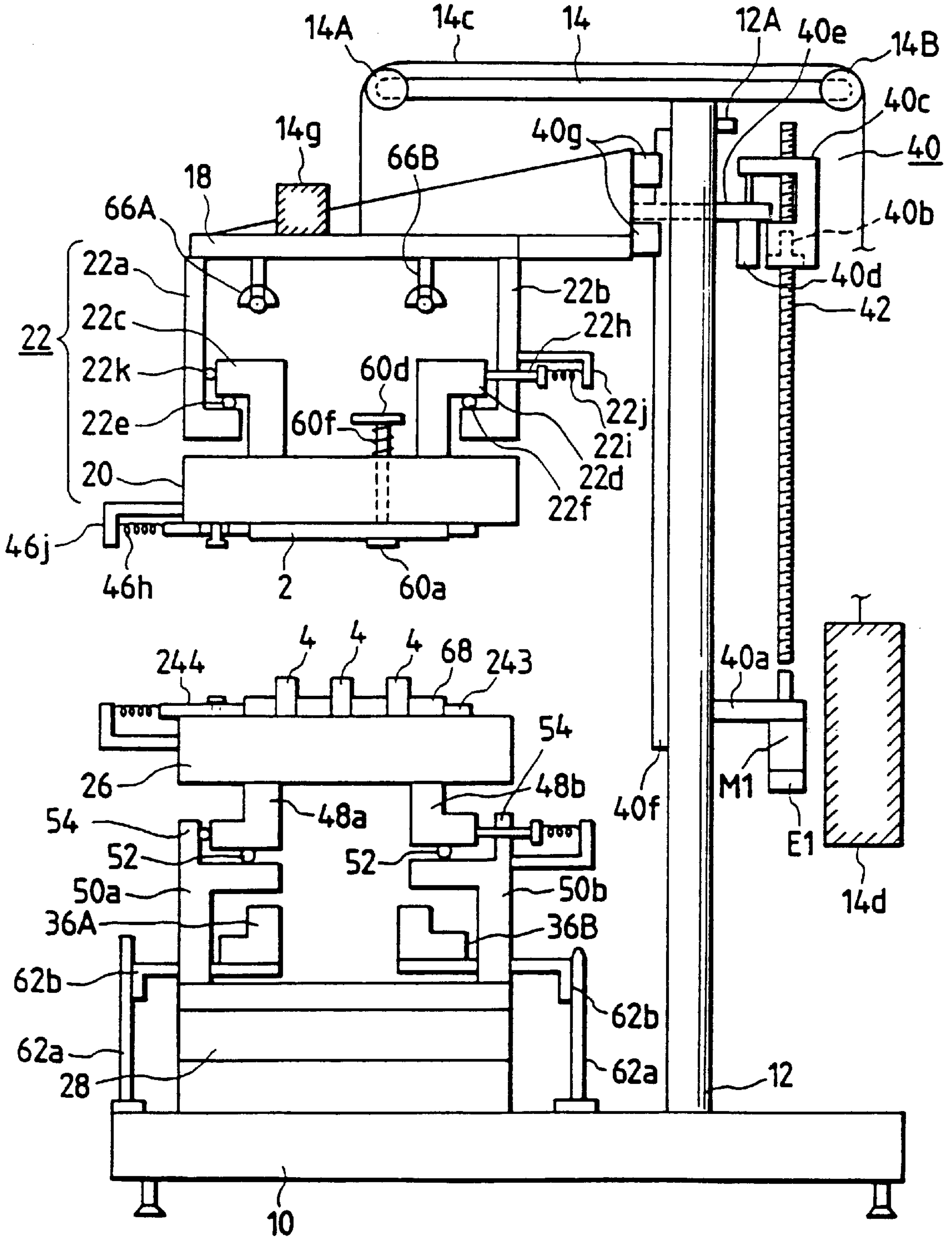
FIG. 2 is an explanatory view of the arrangement of principal part of the apparatus used in the present invention.

FIGS. 1 and 2 show the overall arrangement of a manufacturing apparatus that practices the manufacturing method of the present invention. Referring to FIGS. 1 and 2, a column member 12 stands upright on a base member 10 of the apparatus, and a pulley attachment plate (driving bar) 14 is fixed on the upper portion of the column 12.

Figure 49:
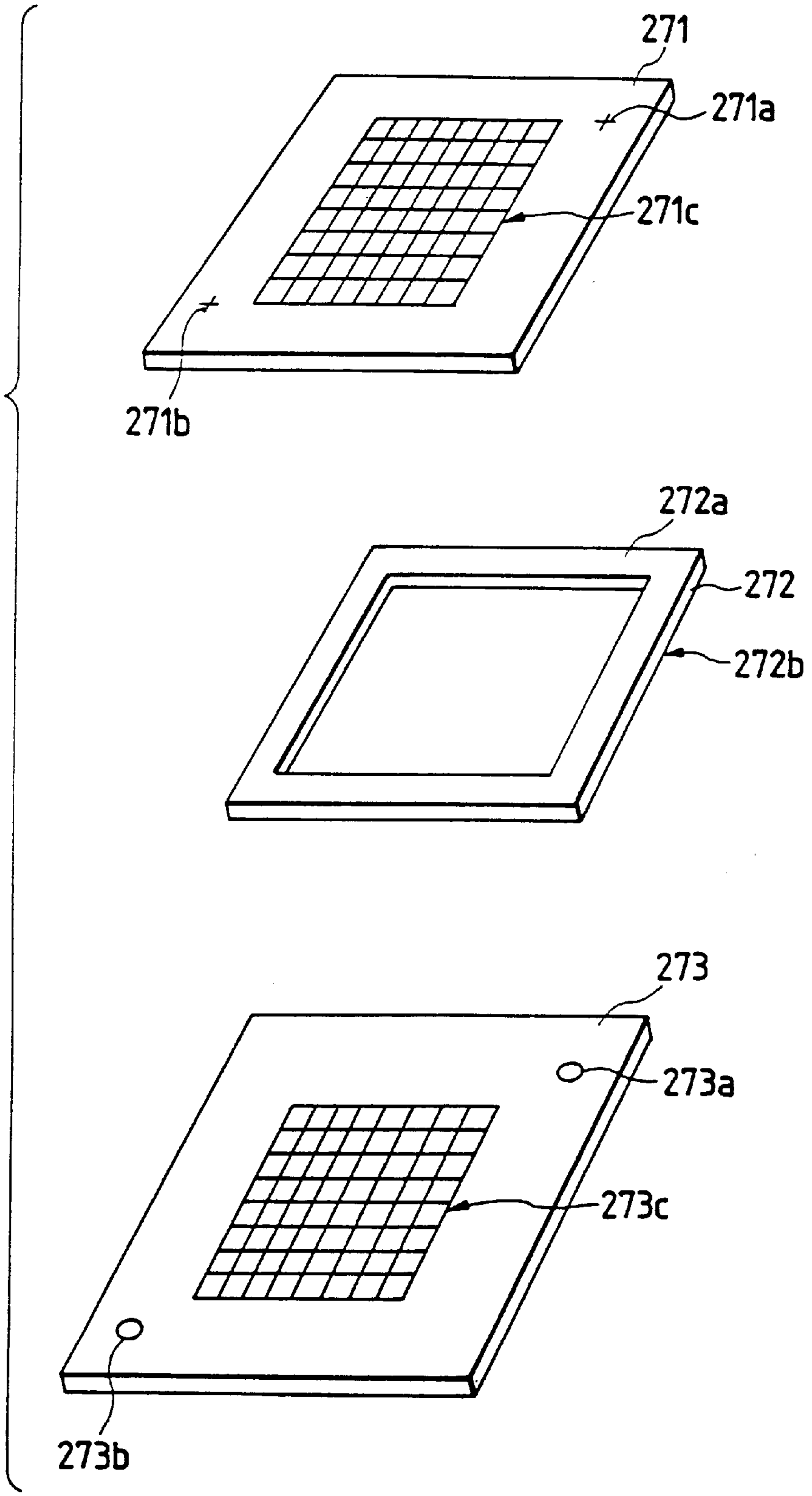
FIG. 49 is an exploded view showing the arrangement of an image display apparatus.
Figure 50A:
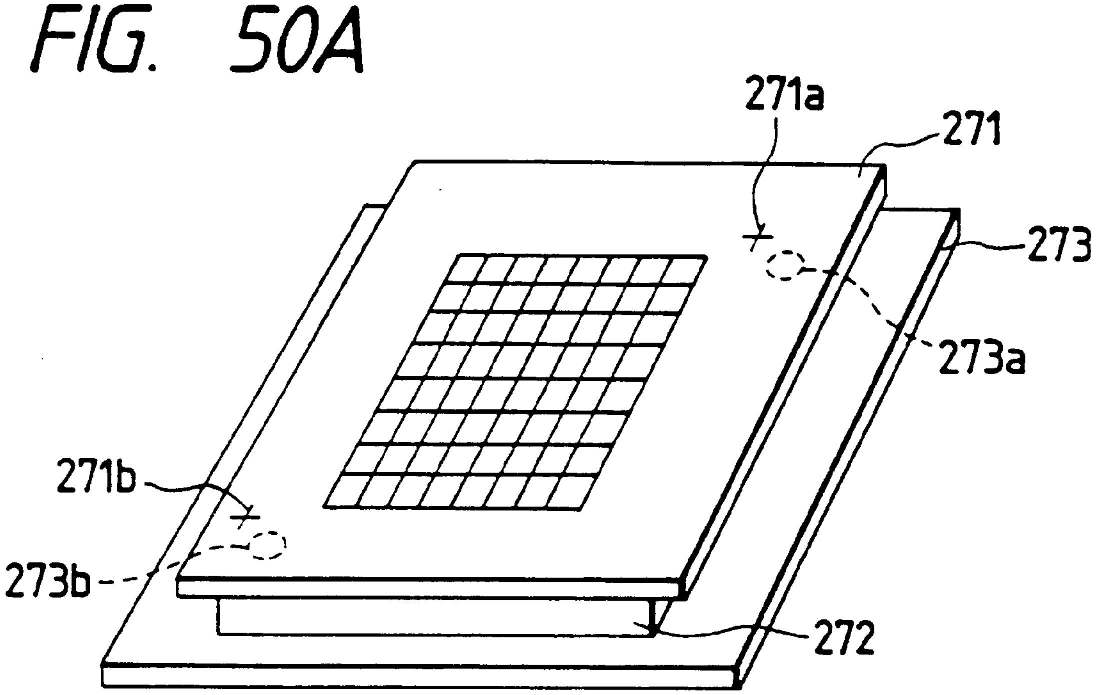
FIGS. 50A and 50B are respectively a perspective view and a side view showing the assembled state of the image display apparatus shown in FIG. 49.
Figure 50B:
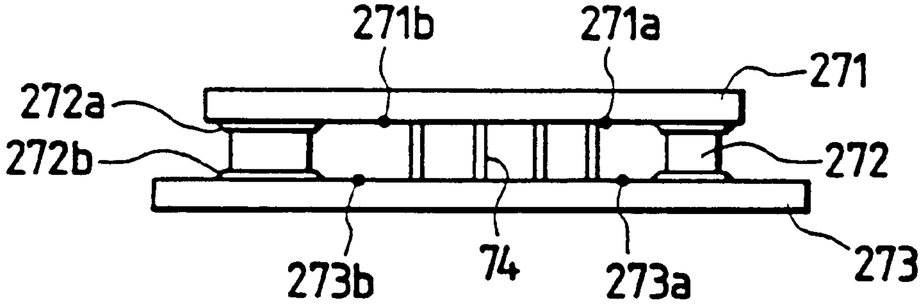

A first holding means 16 holds a first glass plate (glass-face plate) 2 of a display unit shown in FIG. 49, and is constituted by a first up-down table 18, a first heating plate (upper heating plate) 20, a holding mechanism 22 for holding the upper heating plate 20 in the suspended state from the first up-down table 18, and the like. The first holding means 16 will be described in detail later.

A second holding means 24 (to be described in detail later) holds a plurality of spacers 4 consisting of a glass material. The second holding means 24 is constituted by a second heating plate (lower heating plate) 26, an axis adjustment table 28 (XYθ table) for adjusting the X-, Y-, and θ-axes of the lower heating plate 26, a holding mechanism 30 for holding the lower heating plate 26 on the axis adjustment table 28, and the like, as will be described in detail later.

A temperature control means (temperature controller) 32 energizes heating members (heaters) built in the upper and lower heating plates 20 and 26 to control their temperatures, and is connected to a control means 34 for controlling the entire apparatus. The heaters are arranged on regions that divide the area of each of the upper and lower heating plates 20 and 26 into a plurality of portions, and can realize a uniform temperature distribution. CCD cameras 36A and 36B are attached to the lower heating plate 26, and constitute a position alignment means (position alignment controller 38) used for performing position alignment between the glass-face plate 2 held on the upper heating plate and the spacers 4 held by the lower heating plate 26, as will be described in detail later (see FIG. 13). The upper and lower heating plates 20 and 26 consist of aluminum, and have a thermal expansion coefficient of $200\times10^{-7}$ mm/°C. Alternatively, the upper and lower heating plates 20 and 26 may consist of stainless steel.

As shown in FIG. 2, an up-down means 40 drives the first up-down table 18 upward/downward in the Z-axis direction, and is constituted by a motor M1, a Z-axis ball screw 42, and the like.

Description of Arrangements of Respective Portions

The arrangements of the respective portions of the apparatus of this embodiment will be described below.

Description of Arrangement of Z-axis Up-down Drive Means 40 for Up-down Table 18

A flange member 40*a* is attached to the column 12. The Z-axis motor M1, and the Z-axis ball screw 42 coupled to the driving shaft of the motor is attached to the flange member 40*a*.

An encoder E1 is connected to the motor M1, and is also connected to a control means 34 (to be described later). A ball screw nut 40*b* is inserted on the distal end portion of the Z-axis ball screw 42, and a Z-axis housing 40c is attached to the ball screw nut 40b. The up-down table 18 is fixed to the Z-axis housing 40c via a Z-axis cylinder 40d and a driving bar 40e.

A first origin (Z-axis origin) sensor 12A for detecting the upper origin position of the housing 40c is attached to the upper position of the column 12, and a signal output from the sensor 12A is supplied to the control means 34.

The up-down table 18 is guided along the column 12 in the Z-axis direction by a linear guide member 40f fixed to the column 12 and linear guide nuts 40g and 40h fixed to the up-down table 18. The pulley attachment member (driving bar) 14 is attached to the upper portion of the column 12, and comprises pulleys 14A and 14B on its two end portions. One end of a wire 14c is coupled to the first up-down table 18, and the other end thereof is coupled to a counterweight 14d via the pulley 14B.

With this pulley mechanism, when the upper and lower heating plates 20 and 26 are in press contact with each other via the glass-face plate and the spacers, the weights of the up-down table 18 and the upper heating plate can be removed. A weight 14g for pressing the heating plate is attached onto the up-down table 18.

Description of First Holding Mechanism 22

Suspension metal member columns 22a and 22b each having an L-shaped section are attached to the ends of the lower surface of the up-down table 18, and heating plate suspension metal members 22c and 22d are attached to the upper surface of the upper heating plate 20 to face the suspension metal member columns 22a and 22b.

The suspension metal member columns 22a and 22b and the suspension metal members 22c and 22d have hook portions to engage with each other. The hook portions of the suspension metal member columns 22a and 22b and the suspension metal members 22c and 22d respectively engage with each other via ceramic balls 22e and 22f, thus holding the up-down table 18 in the suspended state. Note that a ceramic spring 22i for pressing a stopper pin 22h for biasing the heating plate suspension member 22d is attached to a spring support member 22j of the suspension metal member column 22b, thereby biasing the upper heating plate 20 toward the suspension metal member column 22a. A ceramic ball 22k is attached to the heating plate suspension metal member 22c.

Figure 3:
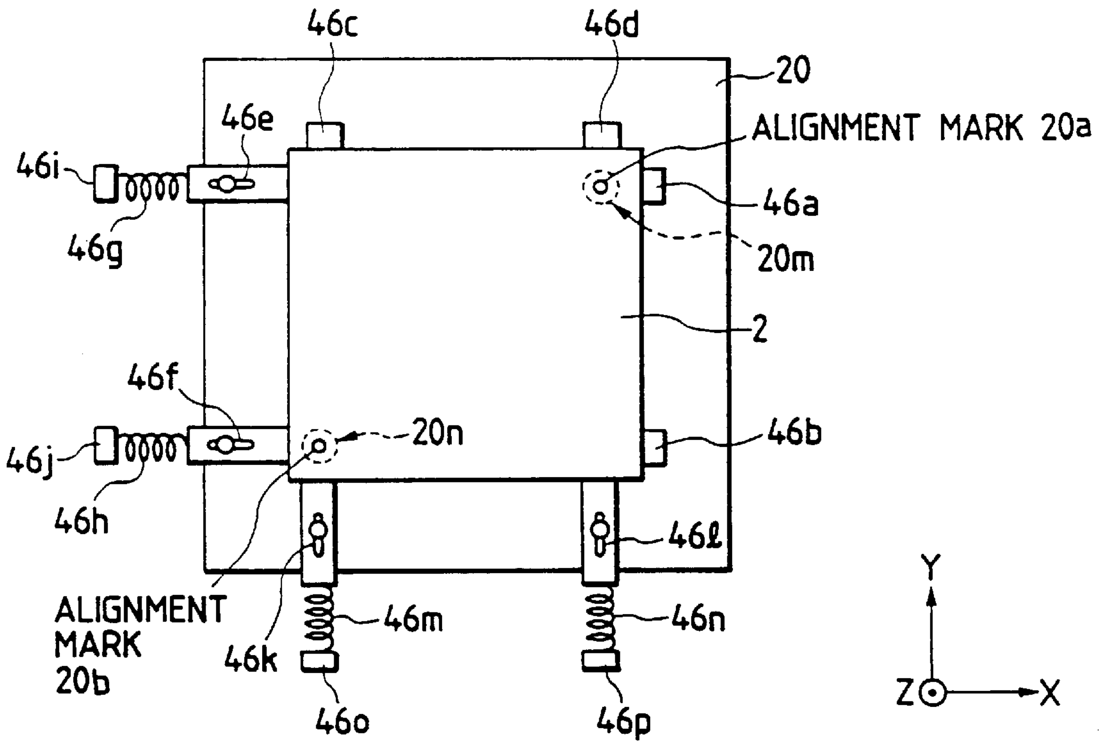
FIG. 3 is a view for explaining a glass plate holding means of an upper heating plate.

Glass Plate Biasing Mechanism (see FIG. 3)

The lower surface of the upper heating plate 20 comprises a biasing mechanism 46 for aligning the glass-face plate 2 held by the upper heating plate 20 in the X- and Y-axis directions. Position alignment members 46a and 46b in the X-axis direction are attached to the lower surface of the upper heating plate 20, and position alignment members 46c and 46d in the Y-axis direction are similarly attached to the lower surface of the upper heating plate 20.

Pressing members 46e and 46f press the glass-face plate 2 in the X-axis directions, and are respectively biased by spring members 46g and 46h. These spring members 46g and 46h are held by spring holding members 46i and 46j. Likewise, the glass-face plate 2 is biased in the Y-axis direction by pressing members 46k and 46e, which are biased by springs 46m and 46n held by holding members 46o and 46p.

Description of Position Alignment Marks and Through Holes

Figure 9:
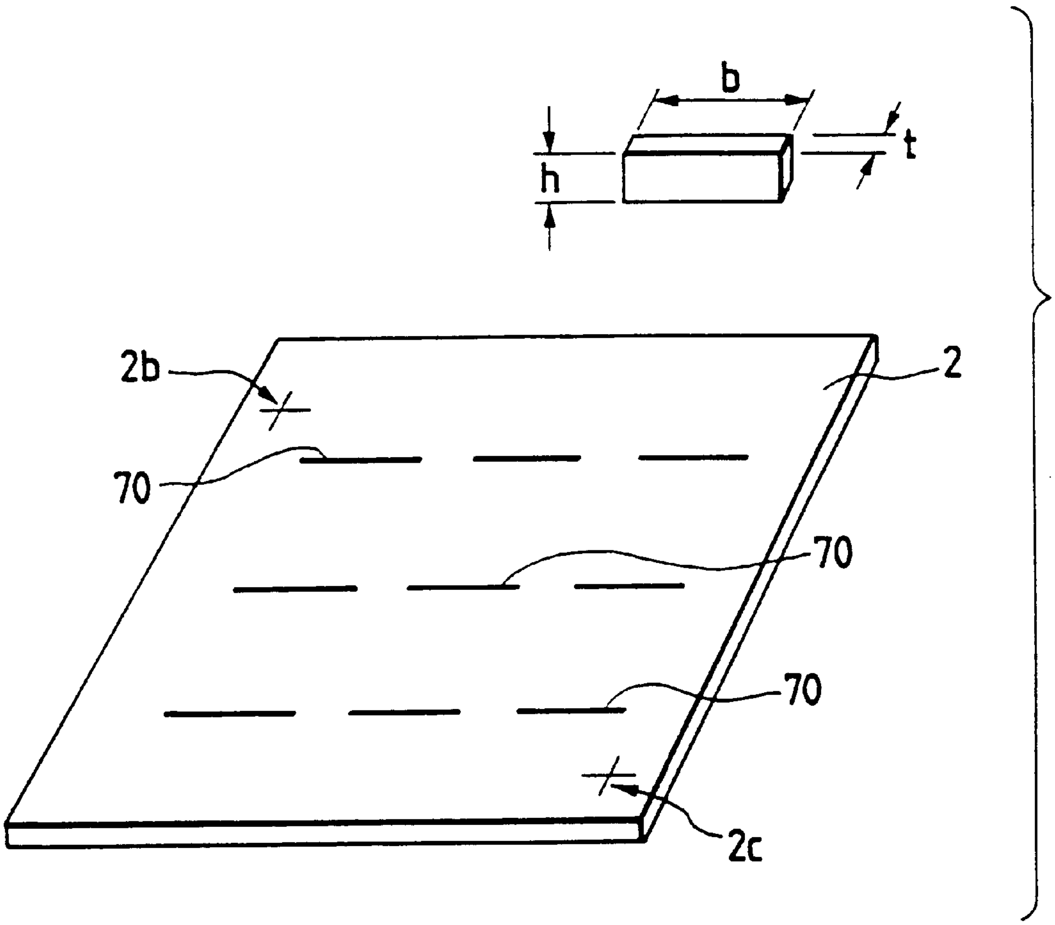
FIG. 9 is an explanatory view of the glass-face plate.

As shown in FIG. 9, the glass-face plate 2 is formed with position alignment marks 2c and 2b. These marks are located at the positions of through holes 20a and 20b, as shown in FIG. 3, formed on the upper heating plate 20 when the glass-face plate 2 is placed on the upper heating plate 20. These through holes 20a and 20b have a diameter of about 10 mm, and are formed to be relatively large so as to allow easy displacement adjustment even when the glass-face plate 2 and the upper heating plate 20 undergo thermal expansion upon heating.

Also, a spacer jig 68 is formed with alignment marks 68p and 68q. Through holes 26a and 26b are formed on the lower heating plate 26 (not shown), so that coincidence with the alignment marks 2c and 2b on the glass-face plate 2 can be observed while the spacer jig 68 is placed on the lower heating plate 26. Note that the spacer jig 68 shown in FIG. 2 corresponds to a spacer jig shown in FIG. 15.

Figure 4:
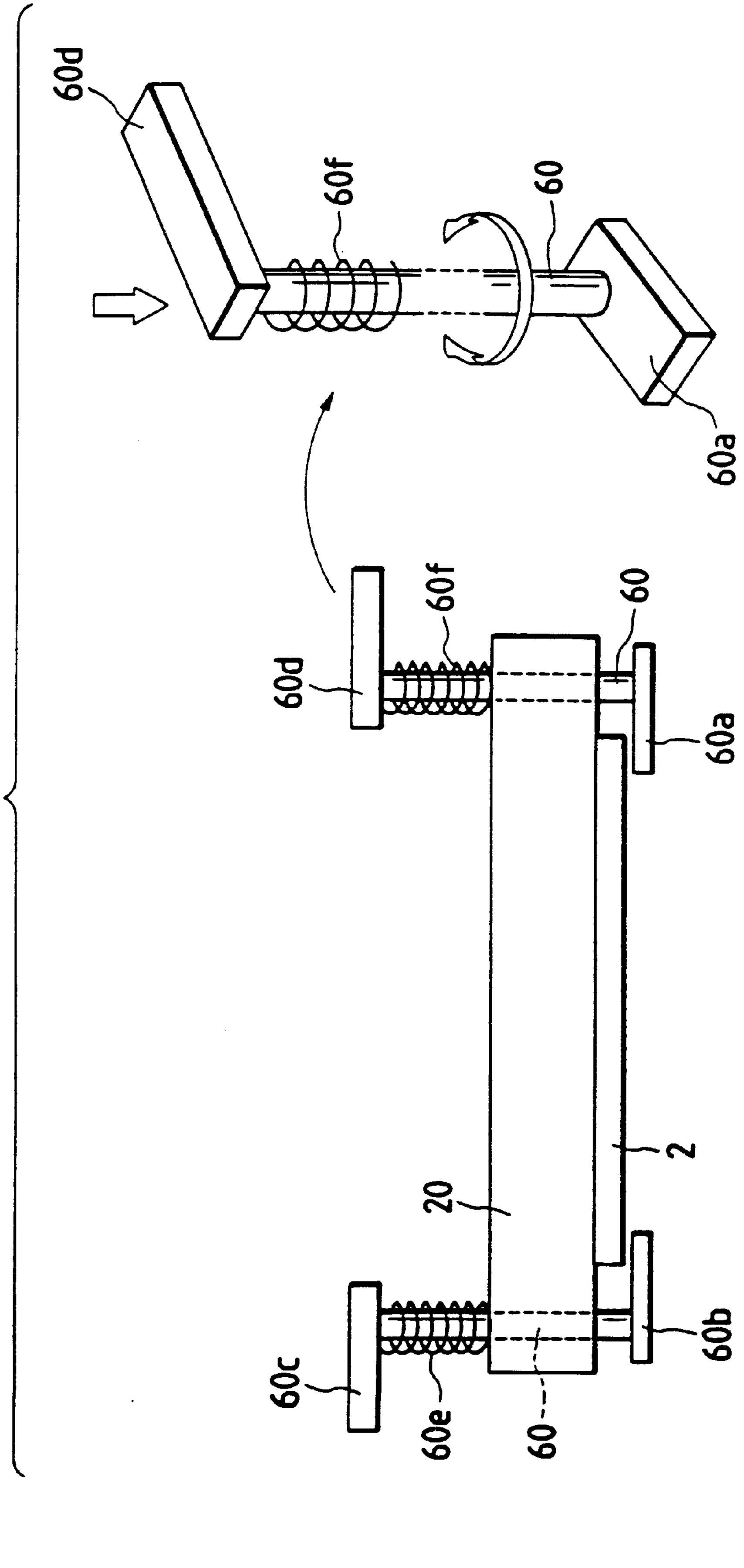
FIG. 4 is a view for explaining a holding means of a glass-face plate.

First Glass Holding Means (see FIG. 4)

FIG. 4 shows the holding means of the glass-face plate 2 to be attached to the lower surface of the upper heating plate 20. This holding means is constituted by attaching locking pawl members 60a and 60b to one-end portions of holding shaft members (plate chucks) 60 and attaching turn knobs 60c and 60d to the other-end portions, so that the pawl members 60a and 60b are pressed against the upper heating plate 20 by ceramic springs 60e and 60f.

Description of Second Holding Means (to Hold Lower Heating Plate 26) (see FIG. 2)

Support metal members 48a and 48b each having an L-shaped section are attached to the lower surface of the lower heating plate 26, and column support members 50a and 50b are fixed to the ends of the upper surface of the adjustment table 28. These column support members 50a and 50b have flange portions for supporting the support metal members 48a and 48b, and support the lower heating plate 26 via ceramic balls 52.

Figure 5:
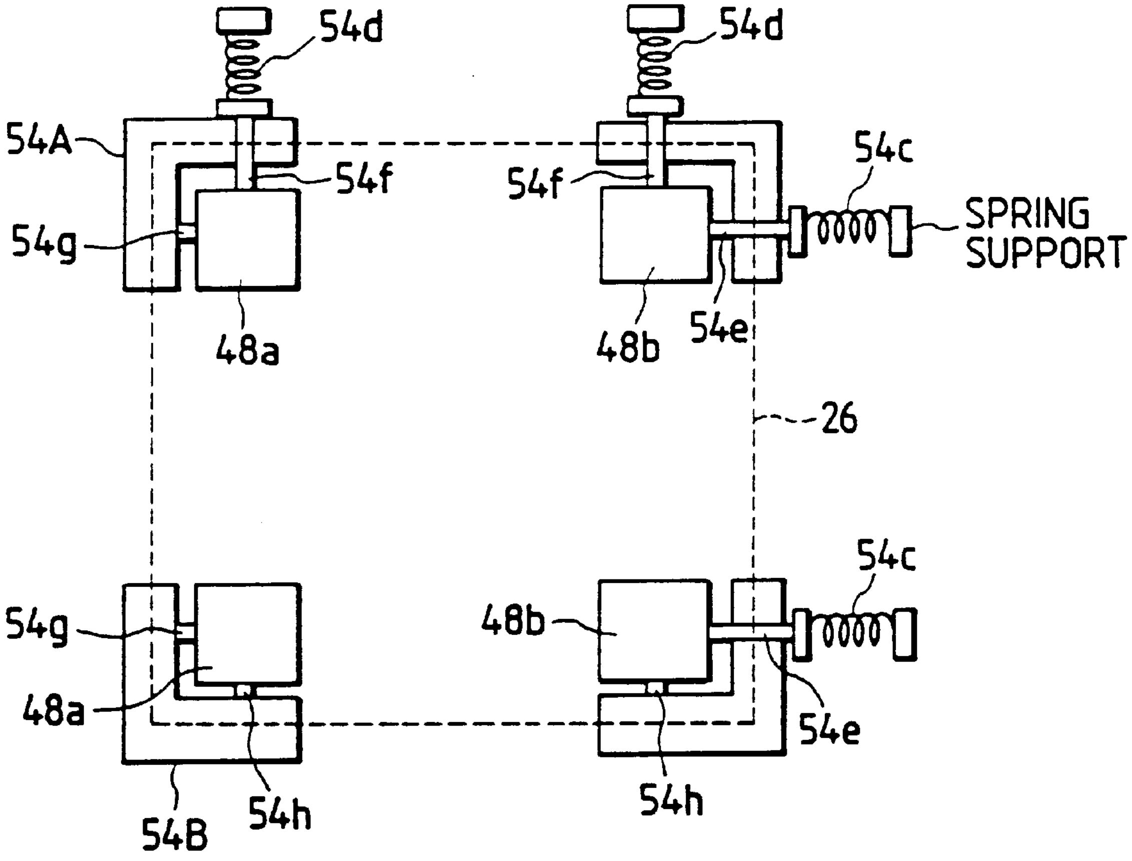
FIG. 5 is a view for explaining a holding means of a lower heating plate.

Description of Biasing Mechanism for Lower Heating Plate (see FIG. 5)

Referring to FIG. 5, position alignment members 54A and 54B for position alignment are attached to the end portions of the lower surface of the lower heating plate 26, and pressing pins 54e and 54f biased by springs 54c and 54d are attached to the position alignment members 54A and 54B. With this arrangement, the lower heating plate is biased and pressed against the reference position side by the pressing pins 54e and 54f via ceramic balls 54g and 54h.

Description of Position Alignment Means of Upper and Lower Heating Plates (See FIG. 2)

As will be described in detail later, the apparatus of this embodiment comprises the position alignment means 38 for aligning the positions of the members held by the upper and lower heating plates 20 and 26.

The CCD cameras (image monitoring means) 36A and 36B are used for aligning the positions of the glass-face plate 2 and the spacers 4 which are respectively held by the holding means of the upper and lower heating plates 20 and 26. These cameras 36A and 36B are arranged at the positions below the lower heating plate 26 by means of columns 62a, attachment members 62b, and the like, and they sense the images of alignment marks (to be described later), and transmit signals to the position alignment means 38. Illumination means 66A and 66B attached to the lower portions of the up-down table 18 illuminate the alignment marks. The arrangement of these members will be described in detail later.

Figure 6:
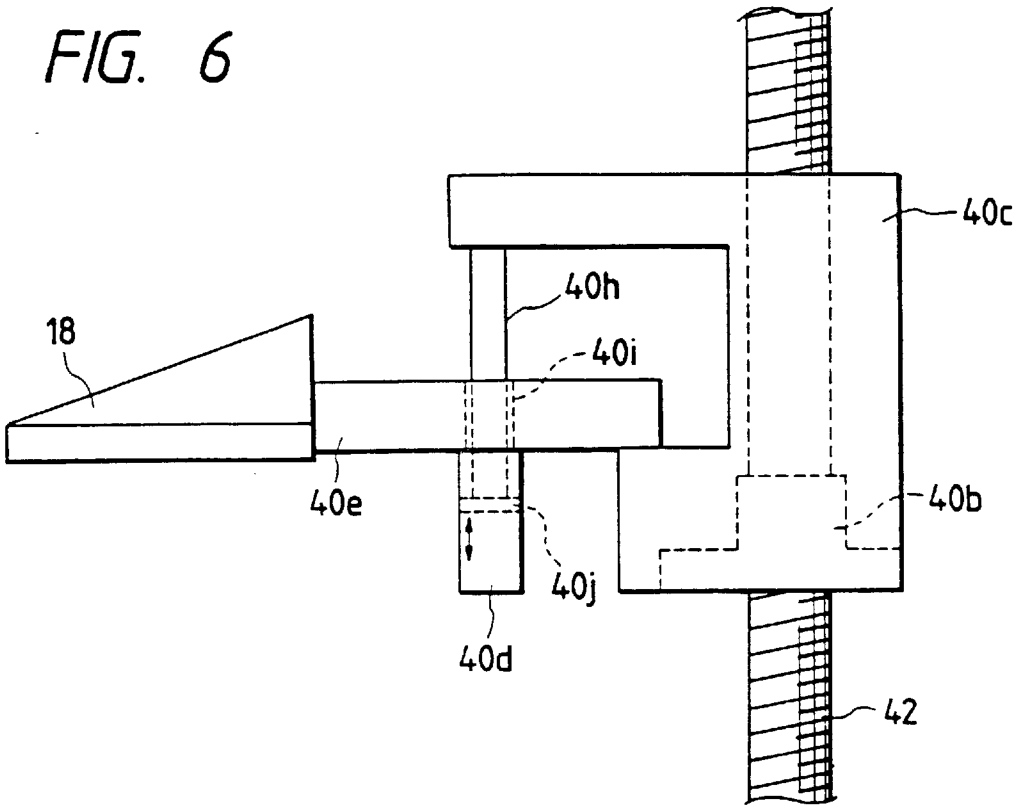
FIG. 6 is an explanatory view of a Z-axis moving mechanism.

FIG. 6 shows the arrangement of principal part of the up-down-means of the up-down table 18. The Z-axis housing 40c has a nearly U-shaped section, and is attached with the Z-axis ball screw nut 40b on its lower portion. The ball screw 42 threadably engages with the nut 40b, extends upward through the housing 40c, and is held by a bearing (not shown) attached to the column 12.

A Z-axis air cylinder 40*d* is attached to the column 12, and a cylinder rod 40*h* extends through a through hole 40*i* formed on the driving bar 40*e*. When no air is supplied into the Z-axis air cylinder, a piston 40*j* is located at its lower position, and the driving bar 40*e* is also located at its lower position. When air is supplied into the Z-axis air cylinder 40*d*, the driving bar 40*e* moves upward upon upward movement of the piston 40*j*, and is locked by the piston 40*j*.

Figure 7:
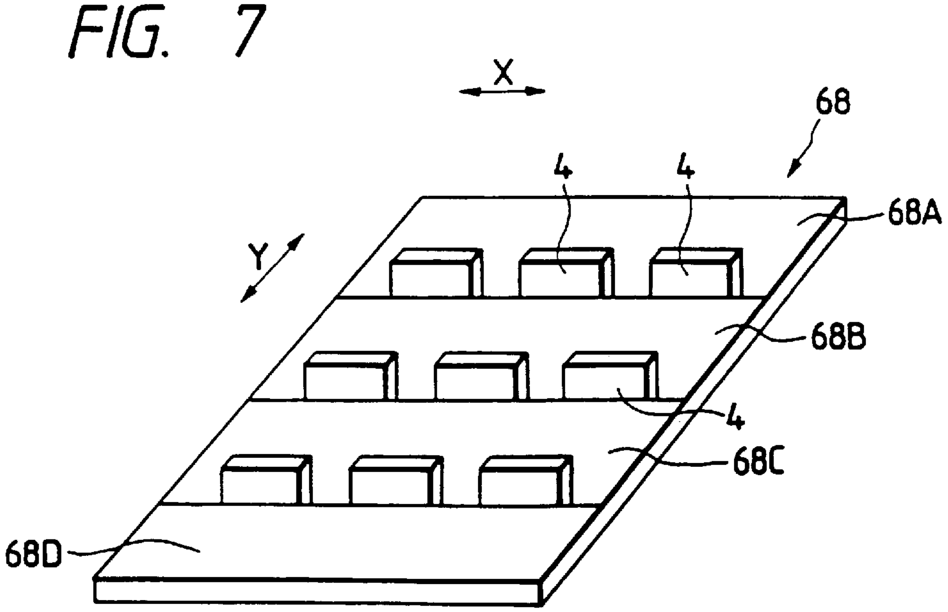
FIG. 7 is a view for explaining the holding state by a division holding means.
Figure 8:
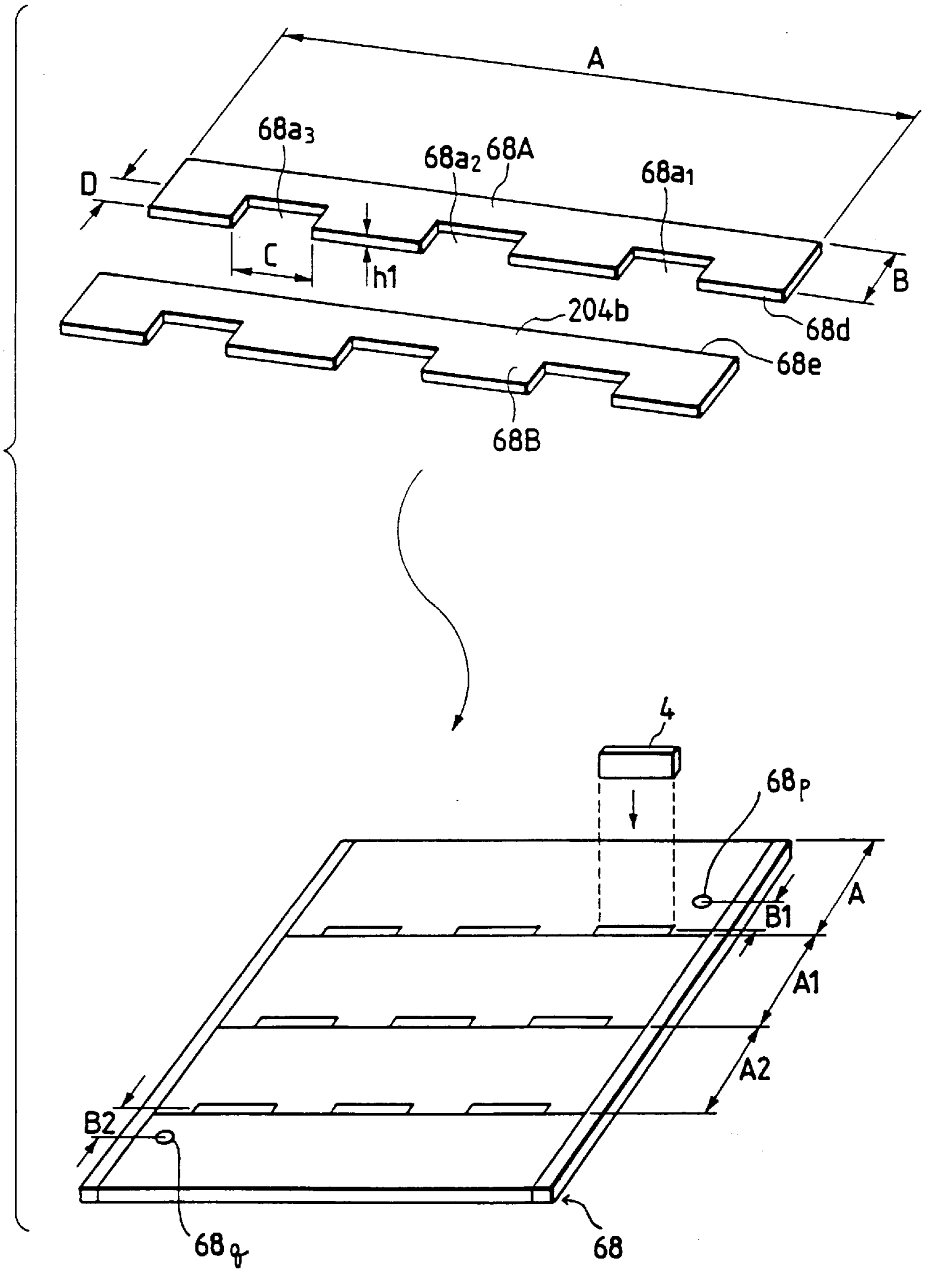
FIG. 8 is an explanatory view of the division holding means.

Description of Holding Jig of Spacers (See FIGS. 7 and 8)

FIGS. 7 and 8 show the holding jig (spacer jig) 68 for holding the planar spacers 4 on the holding means of the lower heating plate 26. Note that the shape of each spacer 4 is not limited to the planar shape shown in FIGS. 7 and 8.

FIG. 7 shows the state wherein a plurality of spacers 4 are divisionally held in a matrix of a plurality of rows (three rows)×a plurality of columns (three columns), and FIG. 8 shows the shapes of division holding members 68, 68A, 68B, 68C, and 68D.

Referring to FIG. 7, the spacer jig 68 holds the spacers 4 arranged in a 3×3 matrix to separate them by predetermined distance intervals using the four division holding members 68A to 68D. The spacer jig 68 has a strip shape, and is formed with storage portions $68a_1$, $68a_2$, and $68a_3$, which are notched to store the spacers 4, on its one side in the longitudinal direction. An opposite side 68*d* of the first division holding member 68A contacts a linear side edge portion 68*e* of the neighboring second division holding member 68B, and holds the spacers 4 in cooperation with the side edge portion 68*e* when the spacers 4 are stored in the storage portions $68a_1$, $68a_2$, and $68a_3$. No storage portions are formed on the fourth division holding member 68D.

The division holding member (spacer jig) 68A to 68D are divided into a plurality of members to control the interval (B or A, A1, and A2 in FIG. 8), in the Y-direction, of the spacers in FIG. 7 to be a desired interval.

Normally, in the case of a color image, black lines (or matrix) are formed between adjacent red, green, and blue phosphors that constitute the light-emitting members, so as to improve the contrast. Therefore, when the spacers 4 are arranged in the image display region, they are arranged on the black lines (or matrix) so that their shapes are not seen by the user when an image is displayed. Even when the interval between adjacent black lines (or matrix) varies upon forming the black lines (or matrix), the plurality of spacers 4 are divisionally arranged so that they are reliably arranged on the black lines (or matrix). Also, B in FIG. 8 is appropriately selected in correspondence with the interval between adjacent black lines (or matrix), and the interval between adjacent spacers can be changed like A, A1, and A2. Note that the spacers may be arranged on all the black lines (or matrix) formed between adjacent phosphors, or may be arranged on some selected black lines (or matrix) in place of all the black lines (or matrix).

FIG. 9 shows the glass-face plate 2 used in the present invention. The glass-face plate 2 consists of soda-lime glass, and low-melting point frit glass 70 serving as an adhesive (bonding material) is applied to the prospective bonding portions on the surface of the glass-face plate 2 so as to bond the spacers 4. Alternatively, the frit glass may be applied to the spacer side. The alignment marks 2*b* and 2*c* are respectively formed on the upper right corner portion and the lower left corner portion of the glass-face plate 2.

Figure 10:
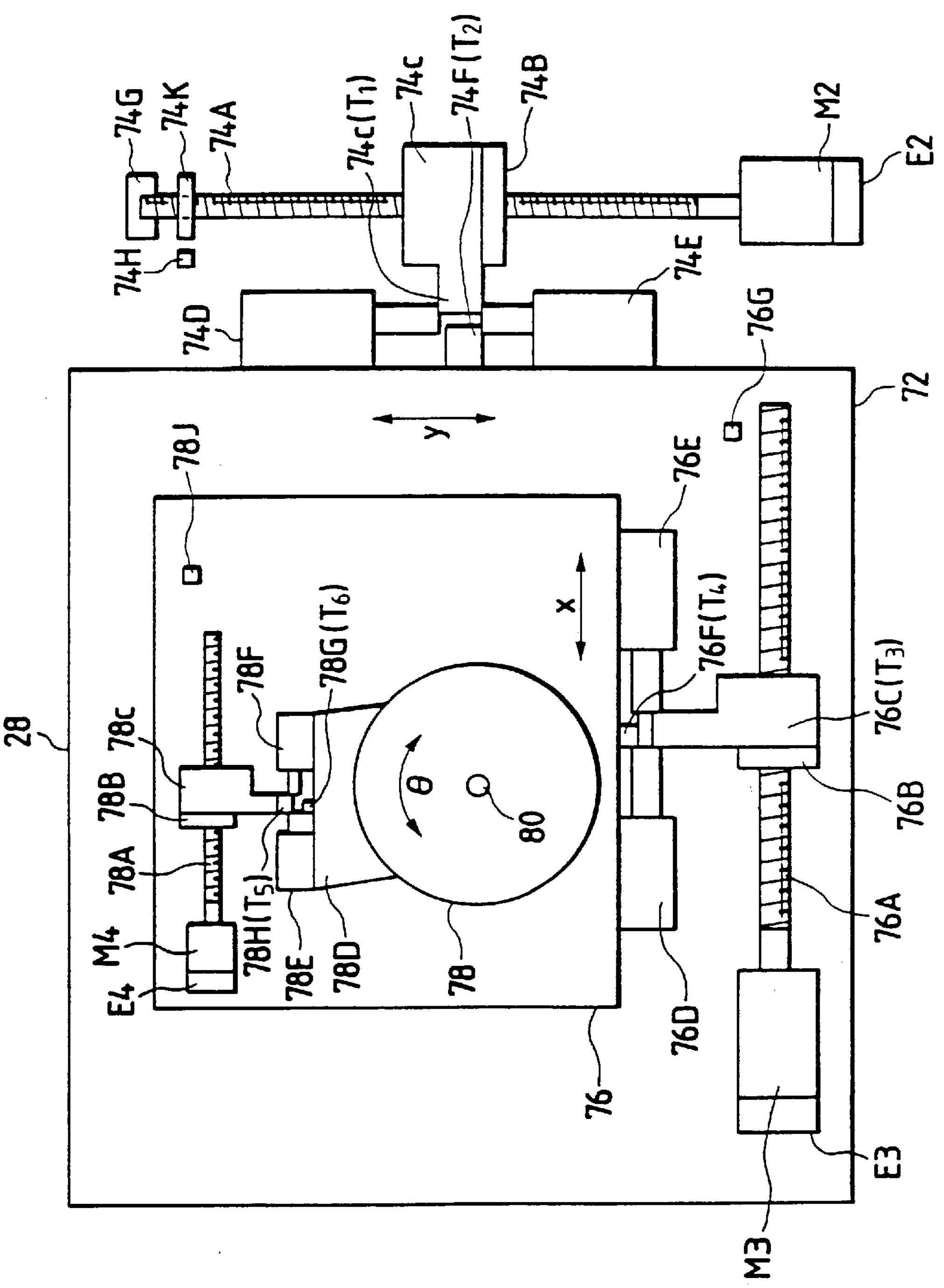
FIG. 10 is a plan view for explaining an XYθ table shown in FIG. 2.

Description of XYθ Table (see FIGS. 2 and 10)

Referring to FIG. 10, a Y-axis table 72 is attached onto the base 10 (not shown), and is movable along a Y-axis guide rail (not shown) arranged on the base 10. A Y-axis driving means 74 drives the Y-axis table 72 in the Y-axis direction. The Y-axis driving means 74 has the following arrangement.

In the Y-axis driving means 74, a Y-axis ball screw 74A is coupled to the output shaft of a Y-axis motor M2 fixed on the base 10, and a Y-axis ball nut 74B threadably engages with the Y-axis ball screw 74A. A Y-axis encoder E2 for detecting the Y-axis position is connected to the Y-axis motor M2, and a signal output from the encoder E2 is input to the control means 34.

A Y-axis flange member 74C is fixed to the Y-axis ball nut 74B, and its distal end portion 74*c* projects toward the Y-axis table side. First and second Y-axis air cylinders 74D and 74E are attached to the side surface of the Y-axis table 72, and their cylinder rods are arranged so that they move forward/backward to oppose each other in a direction parallel to the side surface of the Y-axis table 72.

A Y-axis stopper block 74F is fixed to the Y-axis table 72 at the middle position between the Y-axis air cylinders 74D and 74E.

The width (T1) of the distal end portion (projecting portion) 74*c* of the Y-axis flange member 74C is set to be larger than the width (T2) of the Y-axis stopper block 74F. The end portion of the Y-axis ball screw 74A is held by a bearing member 74G. A Y-axis origin sensor 74H detects the origin position in the Y-axis direction using a sensor dog 74K.

An X-axis table 76 is movable in the X-axis direction along a guide rail (not shown) attached onto the Y-axis table 72. An X-axis motor M3 is fixed on the Y-axis table 72, and an encoder E3 is connected to the motor M3. A signal output from the encoder E3 is input to the control means 34.

An X-axis ball screw 76A is coupled to the output shaft of the motor M3, and a ball screw nut 76B threadably engages with the X-axis ball screw 76A. An X-axis flange member 76C is fixed to the nut 76B. The distal end portion of the flange member 76C points to the X-axis table 76.

First and second X-axis air cylinders 76E and 76D are attached to the side surface of the X-axis table 76, and the pistons of the cylinders 76E and 76D have opposite stroke directions. An X-axis stopper block 76F is attached to the X-axis table at the middle position between the X-axis air cylinders 76E and 76D.

The width (T3) of the distal end portion of the X-axis flange member 76C is set to be larger than the width (T4) of the X-axis stopper block 76F.

An X-axis origin sensor 76G is attached to the Y-axis table 72.

A θ-axis table 78 is pivotal about a shaft member 80 attached to the X-axis table 76. A θ-axis motor M4 is fixed on the X-axis table 76, and an encoder E4 is connected to the motor M4. A signal output from the encoder E4 is input to the control means 34. The output shaft of the θ-axis motor M4 is coupled to a θ-axis ball screw 78A, and a ball nut 78B threadably engages with the ball screw 78A. A θ-axis flange member 78C is fixed to the ball nut 78B.

A plate 78D is fixed to the θ-axis table 78, and has a parallel surface parallel to the X-axis direction. First and second θ-axis air cylinders 78E and 78F are attached to the parallel surface of the plate 78D. The pistons of the cylinders 78E and 78F have opposite stroke directions. A θ-axis stopper block 78G is attached to the plate 78D at the middle position between the cylinders 78E and 78F.

A cam follower 78H is attached to the distal end portion of the θ-axis flange member 78C, and the width (T5) of the distal end portion of the cam follower 78H is set to be larger than the width (T6) of the θ-axis stopper block 78G. An θ-axis origin sensor 78J is attached onto the X-axis table 76.

Arrangement of Devices for Image Processing

The arrangement of devices for image processing including the above-mentioned CCD cameras will be described below with reference to FIGS. 11 and 12.

Figure 11:
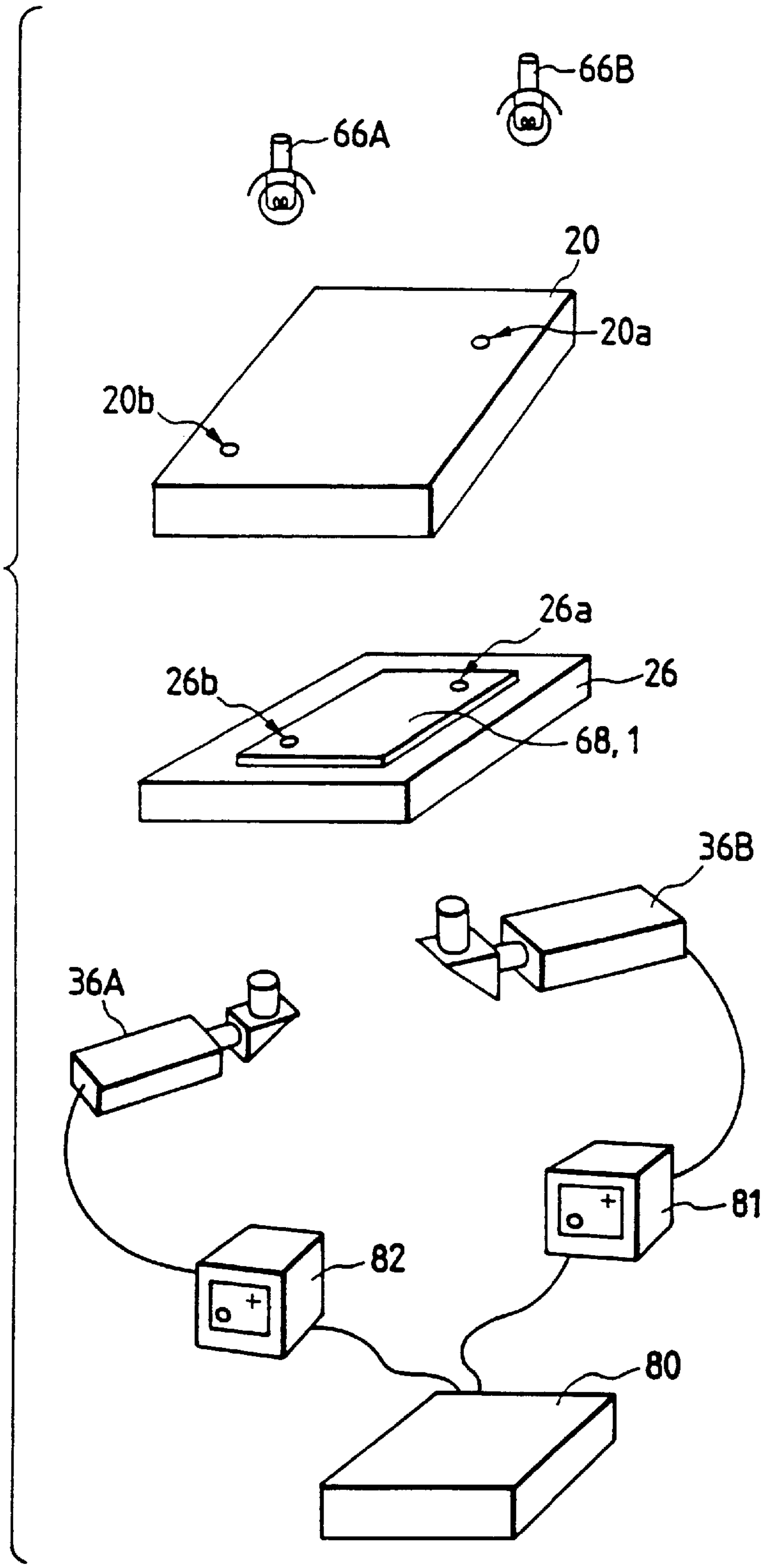
FIG. 11 is an exploded view showing the arrangement of devices for image processing.
Figure 12:
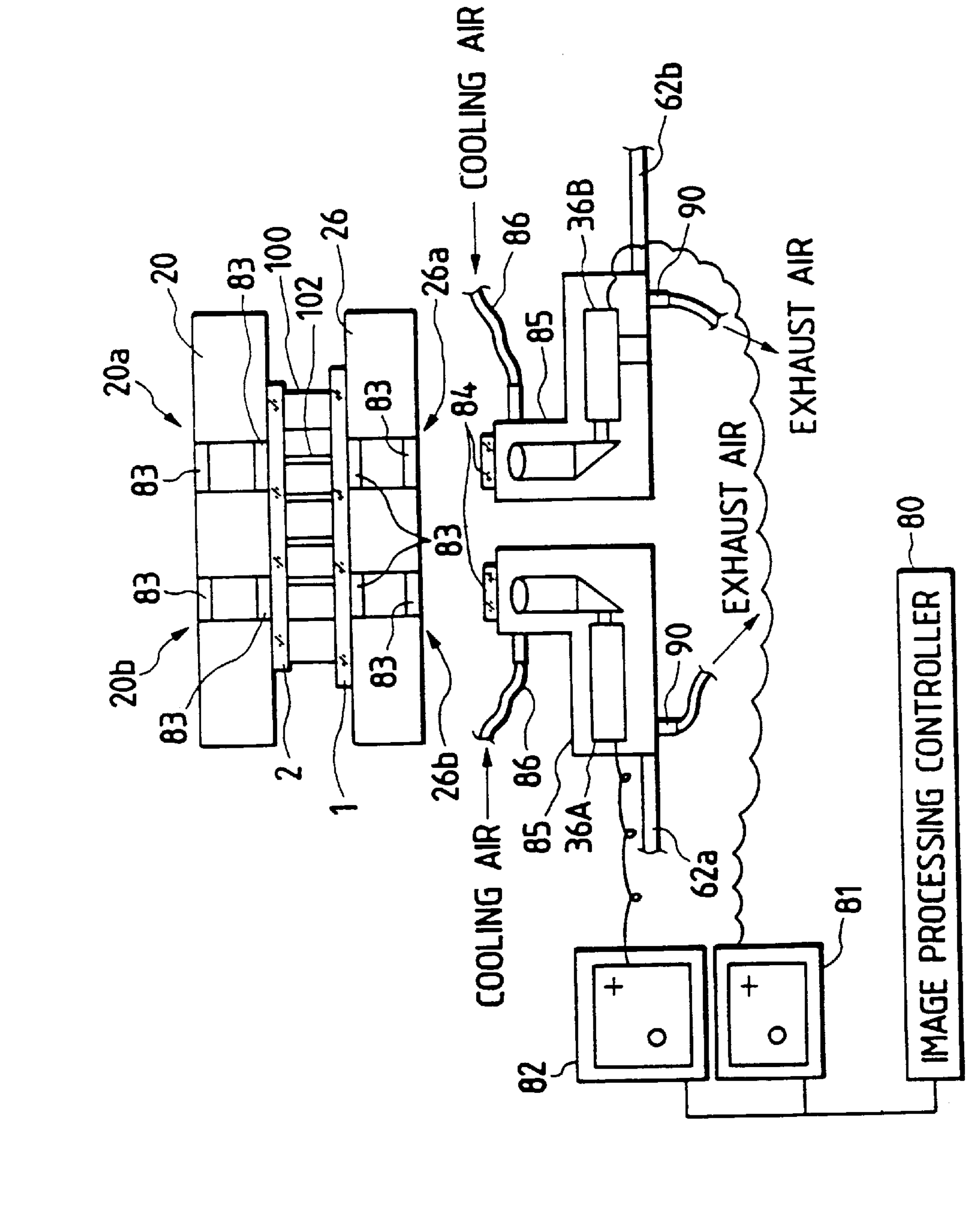
FIG. 12 is an enlarged side view showing the positional relationship among the devices for image processing shown in FIG. 11 in the measurement mode.

FIG. 11 is an exploded view showing the arrangement of the devices for image processing, and FIG. 12 is an enlarged side view showing the positional relationship among the devices for image processing shown in FIG. 11 in the measurement mode.

Referring to FIG. 11, through holes 20*a* and 20*b* are formed on the upper heating plate 20, and through holes 26*a* and 26*b* are formed on the lower heating plate 26 at the same positions on the upper heating plate 20. The CCD cameras 36A and 36B for sensing images are arranged below the lower heating plate 26, and images sensed by the CCD cameras 36A and 36B are displayed on image monitors 81 and 82 after they are processed by an image processing controller 80. The illumination devices 66A and 66B are attached to the lower portion of the up-down table 18 in correspondence with the positions of the through holes 20*a* and 20*b*, and can provide illuminance high enough to allow the CCD cameras 36A and 36B to sense images.

Referring to FIG. 12, the through holes 20*a* and 20*b* of the upper heating plate 20, and the through holes 26*a* and 26*b* of the lower heating plate 26 are respectively closed by quartz glass plates 83. The alignment marks 2*a* and 2*b* on the glass-face plate 2 attached to the upper heating plate 20, and alignment marks 68*p* and 68*q* (or 1*a* and 1*b*) on a spacer jig (or glass-rear plate 1) attached to the lower heating plate 26 are arranged at positions that match with those of the through holes 20*a* and 20*b* of the upper heating plate 20 and the through holes 26*a* and 26*b* of the lower heating plate 26, respectively.

The CCD cameras 36A and 36B are housed in camera covers 85 which are fixed to camera attachment plates 62*a* and 62*b* and have a substantially sealed structure. Cooling air for cooling the CCD cameras 36A and 36B is supplied into the camera covers 85 via cooling pipes 86. The cooling air used for cooling the cameras is exhausted via exhaust pipes 90. Heat ray absorption glass plates 84 are attached to the upper portions of the camera cover 85, and the CCD cameras 36A and 36B sense the images of the alignment marks obtained via the heat ray absorption glass plates 84.

Figure 13:
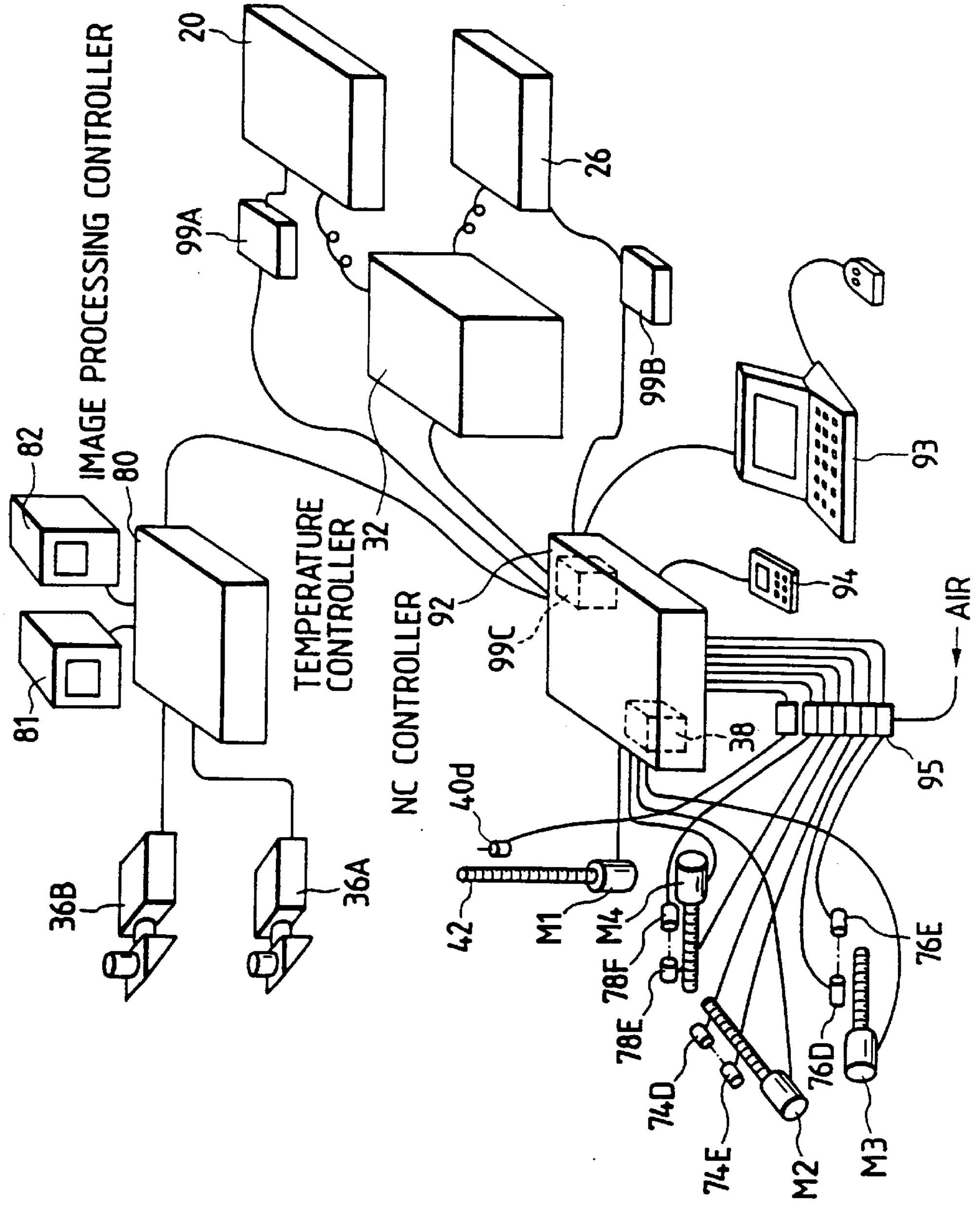
FIG. 13 is a block diagram showing the arrangement of a control system of a manufacturing apparatus for an image display apparatus according to the present invention.

FIG. 13 is a block diagram showing the arrangement of a control system of the manufacturing apparatus for an image display apparatus according to the present invention.

Referring to FIG. 13, an NC controller 92 (control means 34) is connected with the temperature controller 32 for controlling the temperatures of the upper and lower heating plates 20 and 26 by energizing heaters (not shown) built in the upper and lower heating plates 20 and 26 in accordance with an instruction from the NC controller 92 on the basis of signals output from temperature sensors built in the upper and lower heating plates 20 and 26, the image processing controller 80 for processing images sensed by the CCD cameras 36A and 36B, and displaying the processed images on the image monitors 81 and 82, an instruction personal computer 93 for inputting start and stop commands of the operations to the NC controller 92, the X-, Y-, θ-, and Z-axis motors, and air solenoids 95 for supplying air to the X-, Y-, θ-, and Z-axis air cylinders.

The NC controller 92 is a main controller for controlling the entire apparatus in accordance with a control program, and performs control of the driving motors of the respective axes, control of the air solenoids 95, transmission/reception of data with the image processing controller 80, and transmission of the control start and stop commands to the temperature controller 32. The NC controller 92 includes the position alignment controller 38 for performing the position alignment control of the driving motors of the respective axes. When vibration control means 99A and 99B serving as vibrating means are required, they are connected to the upper and lower heating plates 20 and 26, and vibrate them in accordance with an instruction from the NC controller 92.

Description of Operation

The assembling process of the image display apparatus by the manufacturing apparatus of this embodiment will be described below with reference to the accompanying drawings, while dividing the assembling process into the assembling steps of the glass-face plate 2 and the spacers 4, and the assembling steps of the assembly of the glass-face plate 2 and the spacers 4, and the glass-rear plate 1.

Preparation Step

Prior to the assembling/adhering operation of this apparatus, the origin positions of the up-down table 18, and the Y-, X-, and θ-axis tables (72, 76, and 78) are adjusted.

More specifically, the Z-axis motor M1 is energized to rotate the Z-axis ball screw 42, thereby moving the nut 40*b* upward. The Y-axis sensor 12A detects the sensor dog and supplies a detection signal to the control means 34, thereby resetting the position signal of the encoder E1. Likewise, the origin positions of the Y-, X-, and θ-axis tables 72, 76, and 78 are adjusted.

As for the up-down table 18, in the initial state of the operation, the Z-axis air cylinder 40*d* operates, and the cylinder rod 40*h* holds the driving bar 40*e* in the locked state.

In the normal temperature state, before the glass-face plate 2 is fixed to the heating plate 20, frit glass (LS0206, available from Nippon Electric Glass Co., Ltd.) 70 serving as an adhesive is applied at the prospective fixing positions of the spacers 4 on the glass-face plate 2. The melting point of the frit glass is 450° C. Note that the frit glass may be applied to the spacer side, and its melting point is not limited to 450° C. above.

The glass-face plate 2 of this embodiment has sides of 350x300 mm and a thickness of 2.8 mm, consists of soda-lime glass, and has a thermal expansion coefficient of $81\times10^{-7}$ mm/°C.

Step 1

The glass-face plate 2 is attached to the flat portion of the upper heating plate 20 by the attachment means shown in FIG. 4.

Step 2

The division holding members 68A to 68D shown in FIGS. 7 and 8 are placed on the upper surface portion of the lower heating plate 26 shown in FIG. 2, and the spacers 4 are fitted in the spacer storage portions $\mathbf{68}a_1$, $\mathbf{68}a_2$, and $\mathbf{68}a_3$ of these division holding members.

Note that, in this embodiment, the dimensions of the respective portions of the division holding member 68A are defined as follows (see FIG. 8):

total length (A): 350 mm width (B): 15 mm cutout width (C): 42 mm cutout depth (D): 0.21 mm thickness (h1): 3 mm The dimensions of the respective portions of the spacer are as follows (See FIG. 9):

length (b): 40 mm height (h): 4 mm thickness (t): 0.2 mm

The glass composition of the spacer is soda-lime glass, and its thermal expansion coefficient is $81\times10^{-7}$ mm/°C.

Step 3

The control means 34 energizes the Z-axis motor M1 so that the up-down table 18 falls. The upper heating plate 20 is moved until the distance between the surface, opposing the lower heating plate 26, of the face plate 2 fixed to the upper heating plate 20, and the distal end portions, opposing the upper heating plate 20, of the spacers 4 fixed to the lower heating plate 26 via the division holding member 68 becomes 1 mm (first moving step).

Step 4

The lower end position of the upper heating plate 20 is detected based on the output signal from the Z-axis encoder E1. Upon detecting the distance based on the signal from the encoder E1, the NC controller 92 outputs a heater energization signal to the temperature controller 32 to energize the heaters in the upper and lower heating plates 20 and 26. As a result, the temperatures of the heating plates 20 and 26 rise.

Step 5

The heaters in the upper and lower heating plates 20 and 26 are controlled based on the outputs from the temperature sensors (not shown) built in the heating plates 20 and 26, so that the temperatures of the heating plates 20 and 26 rise at a predetermined rate in step 4.

In this embodiment, the surface temperature of each heating plate is raised up to 450° C. During this heating process, position alignment adjustment between the upper and lower heating plates 20 and 26 is performed by the position alignment means 38.

The position adjustment operation will be described below with reference to FIGS. 14 and 15.

Figure 14:
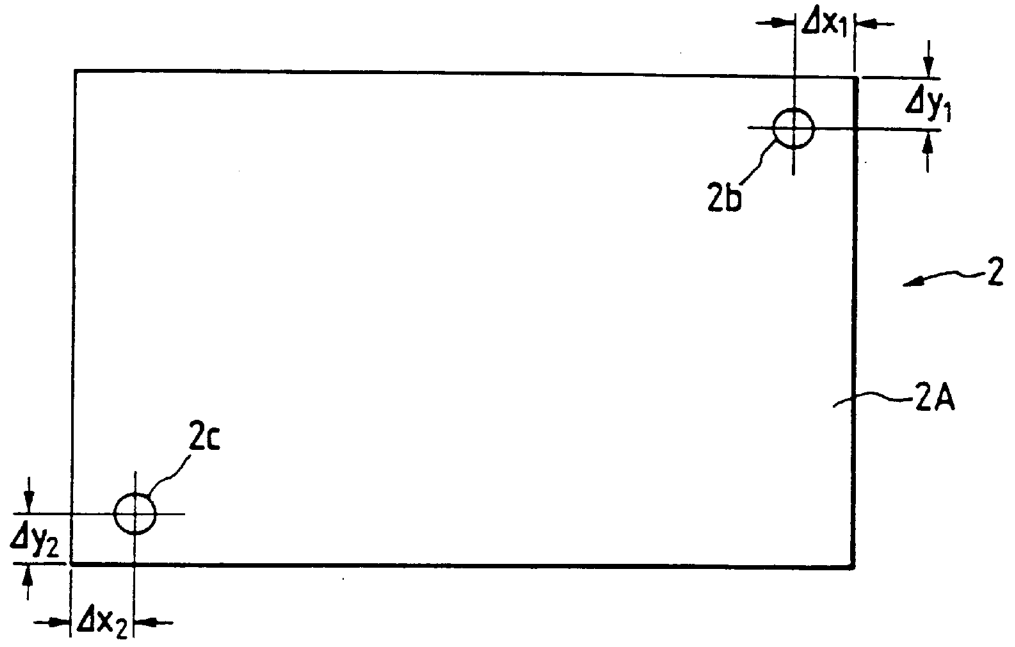
FIG. 14 is an explanatory view of alignment marks on the glass plate.
Figure 15:
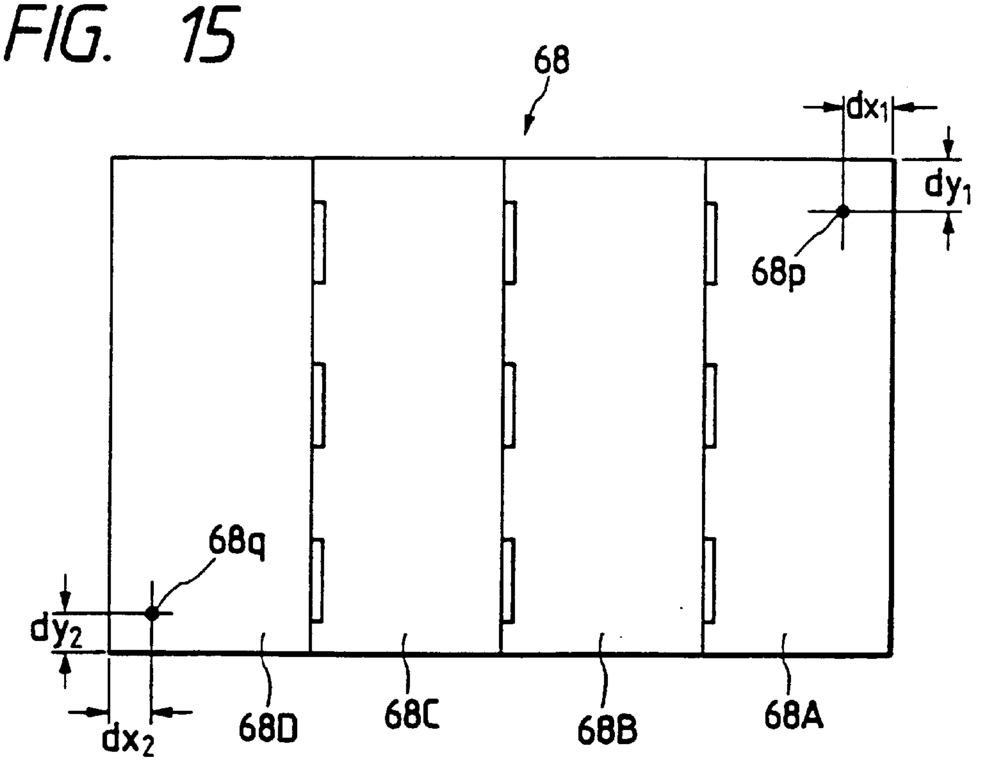
FIG. 15 is an explanatory view of alignment marks on the division holding member.
Figure 16:
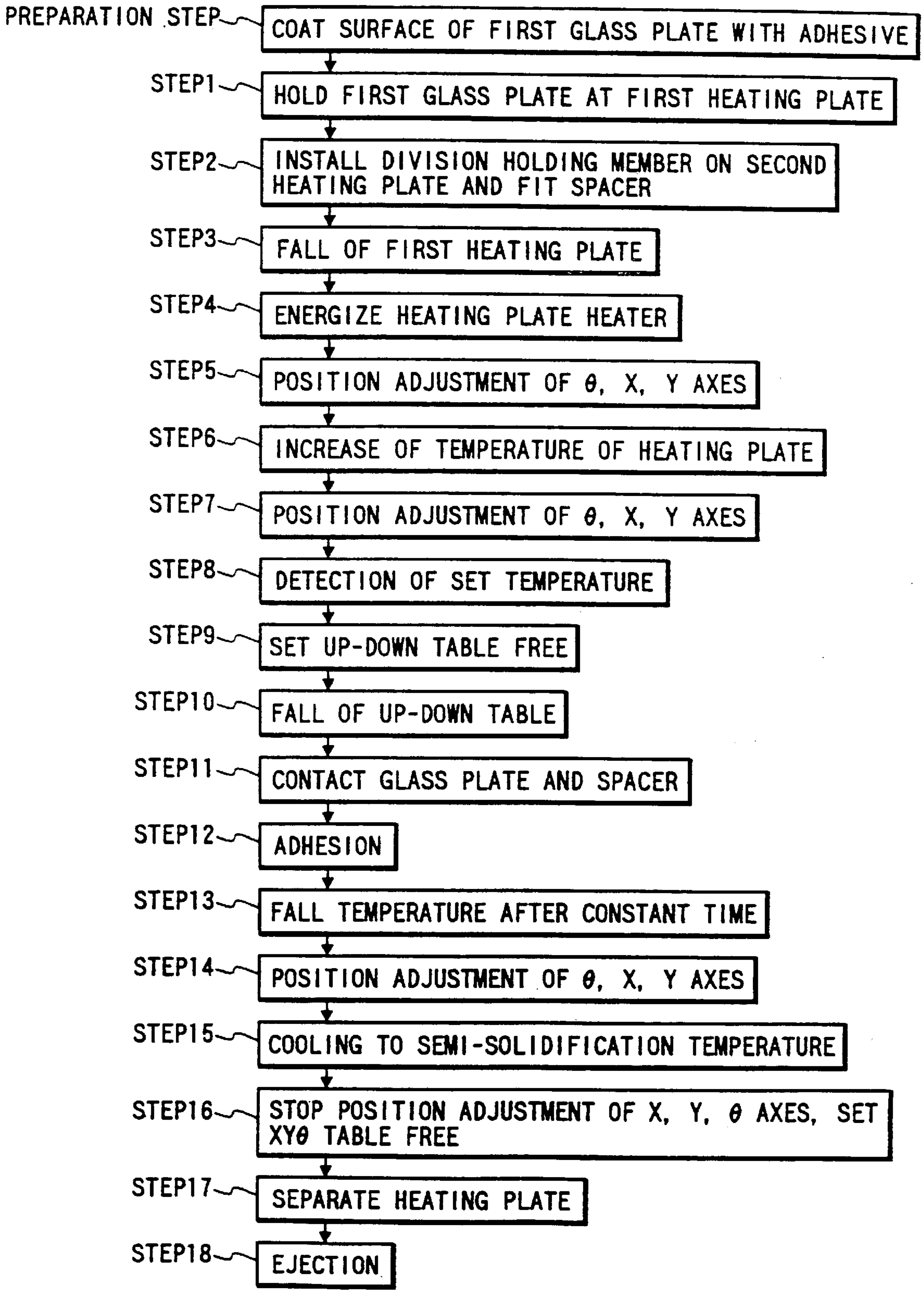
FIG. 16 is a flow chart showing the operation process.

FIG. 14 shows a surface 2A of the glass-face plate 2. Open circular marks (alignment marks) 2*b* and 2*c* are respectively printed on the upper right corner and the lower left corner in FIG. 14 on the surface 2A. The coordinate positions (Δx1, Δy1) and (Δx2, Δy2) of these circular marks 2*b* and 2*c* have been determined in the normal temperature state (room temprature).

On the other hand, full circular marks (alignment marks) 68*p* and 68*q* are printed on the upper right corner and the lower left corner of the division holding members 68A and 68D at the two ends of the spacer jig 68 set on the lower heating plate 26 at the positions corresponding to the marks 2*b* and 2*c* on the glass-face plate 2. The coordinate positions (dx1, dy1) and (dx2, dy2) of the full circular marks 68*p* and 68*q* have also been determined in the normal temperature state. Note that the positional relationship between the open circular marks 2*b* and 2*c* on the glass-face plate 2, and the full circular marks 68*p* and 68*q* on the spacer jig 68 can be shifted by a predetermined amount, so that the marks do not overlap each other due to thermal expansion during the heating process.

In the preparation step in the normal temperature state, initial position adjustment is performed. This operation is performed as follows.

The θ-axis direction is adjusted in the normal temperature state in such a manner that the illumination devices 66A and 66B are controlled by the NC controller 92 to emit irradiation light in the state wherein the upper and lower heating plates 20 and 26 are moved toward each other to a distance of 1 mm, as described above.

The upper and lower heating plates 20 and 26 are formed with the through holes 20*a*, 20*b*, 26*a*, and 26*b* which pass the irradiation light, and the irradiation light illuminates the open circular marks 2*b* and 2*c* on the glass-face plate 2 and the full circular marks 68*p* and 68*q* on the spacer jig 68.

The CCD cameras 36A and 36B sense the image information of the marks formed by the illumination light.

The position alignment upon assembling will be described below. Prior to the description of the position alignment, the control system will be briefly described.

Description of Control System

Figure 17:
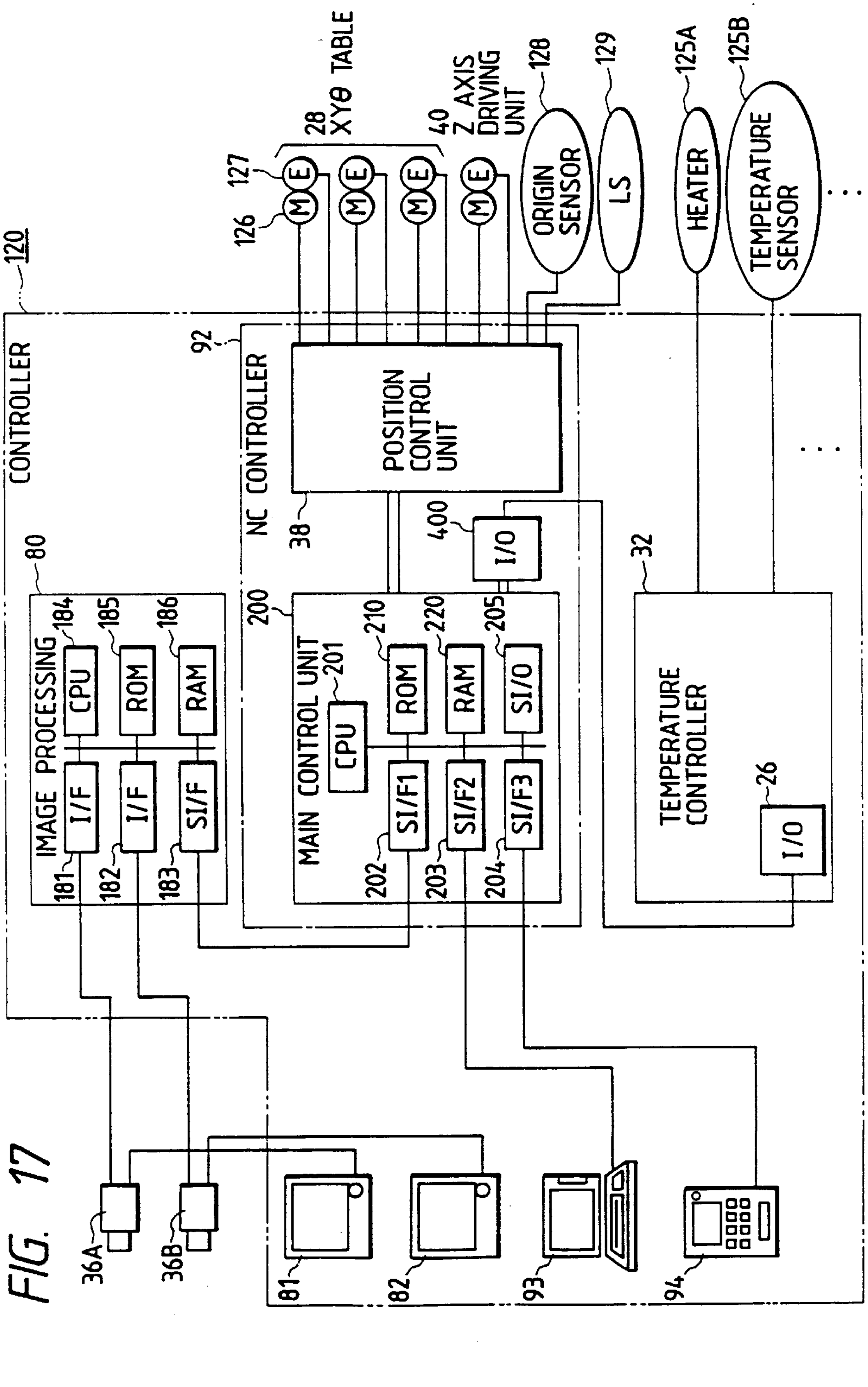
FIG. 17 is a block diagram for explaining a control system for controlling an assembling apparatus according to an embodiment of the present invention.

A control system 120 for controlling the above-mentioned assembling apparatus will be explained below with reference to FIG. 17.

The control system 120 comprises the two monitors 81 and 82 for receiving image data from the two cameras 36A and 36B, and displaying the image data, the image processing controller 80 for extracting the images of alignment marks R1 and R2 (corresponding to the above-mentioned marks 2*b* and 2*c* and 68*p* and 68*q*) from the image data, calculating the displacement amount between the glass-face plate 2 and the spacer jig 68 or the glass-rear plate 1 (to be described later), and obtaining the correction amount, the NC controller 92 for performing the position alignment control of the lower-heating plate 26 and the adhesion (vertical driving) control of the upper heating plate 20, the personal computer 93 for editing and executing the operation program of the NC controller 92, and performing the teaching operation, and the temperature controller 32 for performing the temperature control of the upper and lower heating plates 20 and 26.

The two cameras 36A and 36B are arranged in the assembling apparatus to avoid the XYθ table 28 and are located at diagonal positions to face up from the positions immediately below the lower heating plate 26. These cameras 36A and 36B are connected to the monitors 81 and 82 for displaying the sensed images, and are also connected to the input terminals of the image processing controller 80. Image data input to the image processing controller 80 are converted into those on the X-Y coordinate system on the XYθ table 28 using coordinate conversion coefficients and correction (calibration) values, and the converted data are subjected to arithmetic processing in accordance with an image processing program.

The image processing controller 80 receives commands from the NC controller 92 via serial I/Fs 202 and 183, and a CPU 184 performs the arithmetic processing of image data corresponding to the received commands on the basis of data on a RAM 186 in accordance with a program written on a ROM 185. The image input processing to the data processing is performed in correspondence with processing commands supplied from the NC controller 92 via serial communications.

The NC controller 92 comprises a main control unit 200 which is connected to the XYθ table 28 and NC motors 126 in the Z-axis driving unit (up-down means) 40, and controls the entire operation procedure, the position alignment controller (position control unit) 38 for performing the position control of the assembling apparatus in accordance with an instruction from the main control unit 200, and a serial I/O board 400 for performing serial I/O communications with an I/O board 26 in the temperature controller 32.

In the main control unit 200, a CPU 201 executes a program stored in a ROM 210 to control the operation of the entire system on the basis of data on a RAM 220. Also, the main control unit 200 exchanges processing commands and processing results with the image processing controller 80 via serial communications. Note that the contents of the ROM 210 and the RAM 220 will be described in detail later.

Serial I/Fs 202, 203, and 204 are interfaces for performing communications with the personal computer 93 for editing the operation program, the operation point, and the like, a teaching pendant (TP) 94, and communications with the image processing controller 80.

A serial I/O 205 is an interface for receiving the outputs from the sensors in the assembling apparatus, performing the ON/OFF control of LEDs, solenoids, and the like, and performing communications with the temperature controller 32.

The position alignment controller 38 is connected to the NC motors 126 (corresponding to the motors M1 to M4) as driving units in the assembling apparatus, and encoder detectors 127 (corresponding to the encoders E1 to E4) of the motors 126, and rotates the motors 126 by required amounts in accordance with an instruction from the main control unit 200. The position alignment controller 38 also performs origin detection and processing in an abnormal state on the basis of information from sensors such as an origin sensor 128, an overrun sensor (limit switch LS) 129, and the like.

The temperature controller 32 is connected to heaters 125A and temperature sensors 125B built in the upper and lower heating plates 20 and 26, and performs heating/cooling control from the normal temperature to about 500° C. while maintaining the temperature distributions in the upper and lower heating plates 20 and 26 to be ±5° C. or less.

Figure 18A:
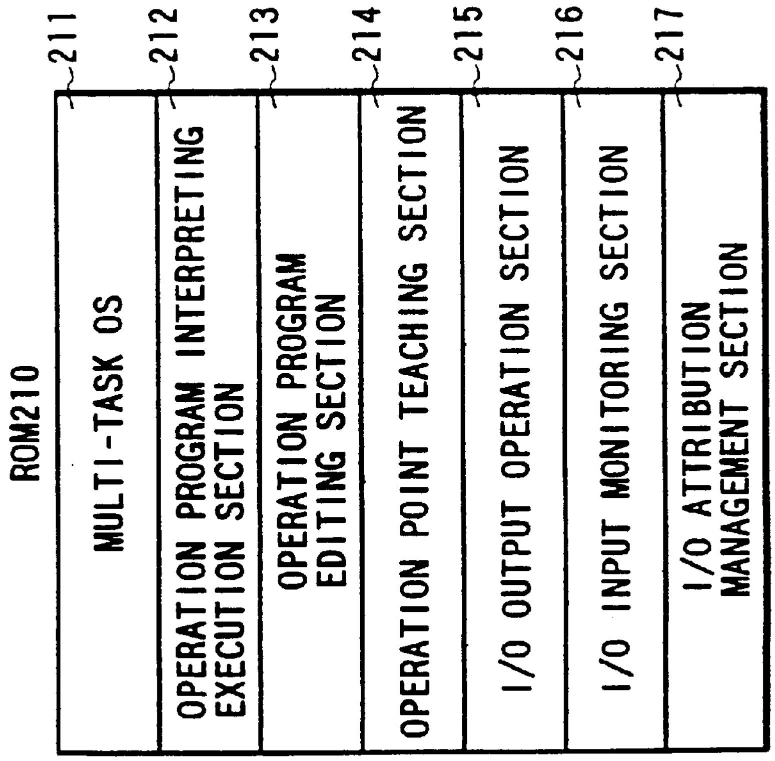

The contents of the ROM 210 and the RAM 220 arranged in the main control unit 200 of the NC controller 92 will be described below with reference to FIGS. 18A and 18B. FIG. 18A shows the architecture of programs stored in the ROM 210.

A multi-task OS 211 corresponds to a multi-task operating system program portion.

An operation program interpreting execution section 212 is a program portion which interprets and executes an operation program that describes the operations of the assembling apparatus using a high-level language. This embodiment adopts a Basic-like robot language as the high-level language.

An operation program editing section 213 is a program portion which edits the operation program of the assembling apparatus input by the personal computer 93 and the TP 94, which serve as input/output devices.

An operation point teaching section 214 is a program portion for teaching the operation point of the assembling apparatus or editing point data input by the input/output devices 93 and 94.

An I/O output operation section 215 is a program portion for manipulating the ON/OFF states of the outputs from the I/O units by the input/output devices 93 and 94.

An I/O input monitoring section 216 is a program portion for monitoring information input from the I/O units by the input/output devices 93 and 94.

An I/O attribute management section 217 is a portion for managing the attributes of I/Os.

The programs described above are respectively processed by one CPU 201 with the multi-task OS 211.

Figure 18B:
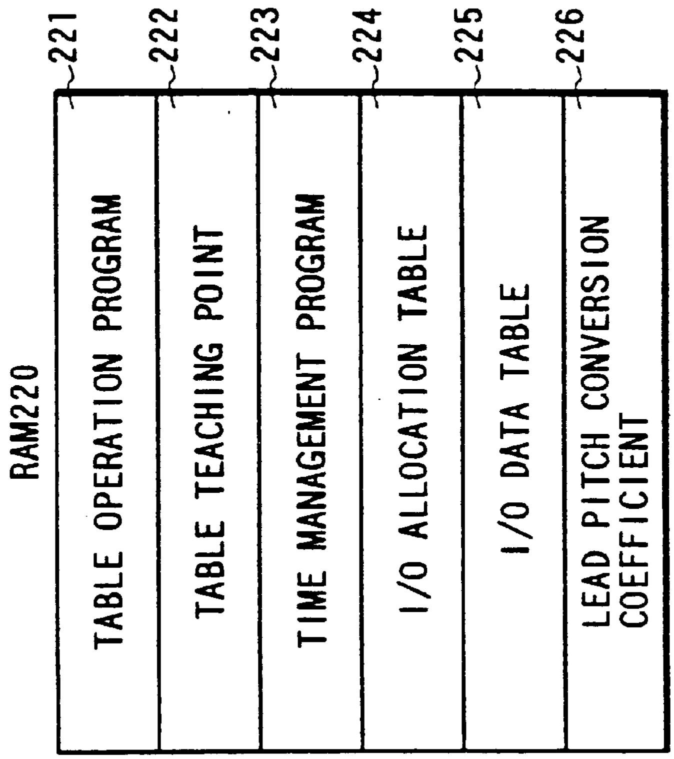

FIG. 18B shows the architecture of programs stored in the RAM 220.

A table operation program storage area 221 stores the operation program of the assembling apparatus.

A table teaching point storage area 222 stores the teaching point data of the assembling apparatus.

A time management program storage area 223 stores the time management program.

An I/O allocation table storage area 224 stores the I/O allocation state.

An I/O data table storage area 225 stores input/output information data of the I/O units and the input/output attribute table for selecting and designating an input or output.

A lead pitch conversion coefficient storage area 226 stores the lead pitch conversion coefficients for the X-, Y-, θ-, and Z-axes.

Description of Method of Correcting Assembling Apparatus

The correction method of the assembling apparatus will be described below with reference to FIGS. 19A to 22. The correction includes:

(1) lead pitch correction of the XYθ table 28;

(2) calculation of the coordinate conversion coefficients used for converting the X-Y coordinate systems of the two cameras 36A and 36B to that of the XYθ table 28;

(3) calculation of the positional relationship between the two cameras 36A and 36B on the table coordinate system;

(4) calculation of the gradient correction coefficients used for correcting the gradients of the upper heating plate 20 to which the glass-face plate 2 that serves as a reference of position alignment is attached with respect to the X- and Y-axes of the XYθ table 28; and (5) calculation of the gradient correction coefficients of the optical axes of the cameras 36A and 36B.

Figure 19A:
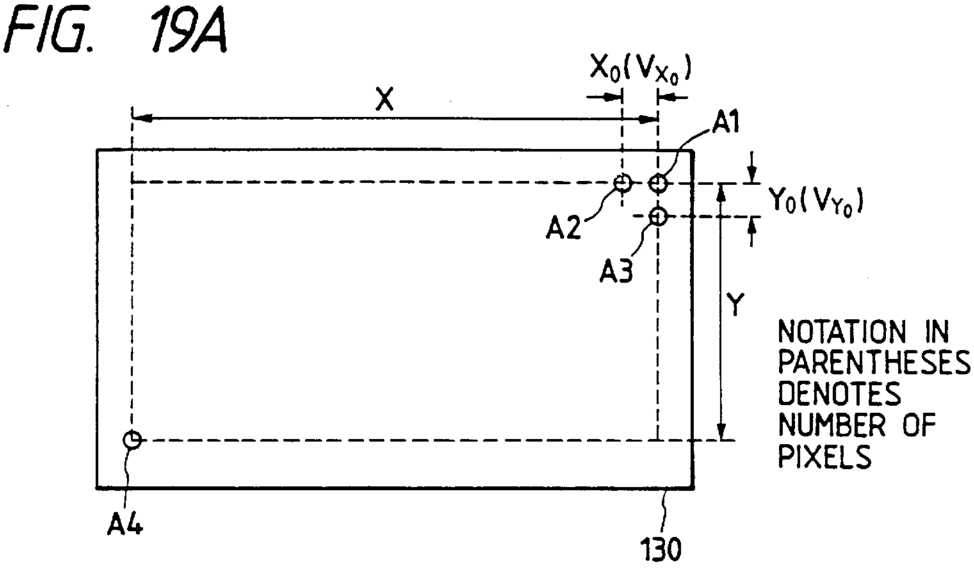
FIG. 19A is a view showing a correction jig 130.

FIG. 19A shows a correction jig 130 used for performing the correction. The correction jig 130 has four round holes A1 to A4, as shown in FIG. 19A. The positional relationship among these holes A1 to A4 is determined in advance using a measuring device. The three holes A1 to A3 are formed to fall within the field view range of the camera 36B. The two holes A1 and A4 located at the diagonal positions have the same positional relationship therebetween as that of the alignment marks on an actual glass-face plate (or a glass-rear plate or spacer holding jig), and the positions of the cameras 36A and 36B are roughly adjusted so that the holes A1 and A4 fall within the field view ranges of these cameras.

(1) Lead Pitch Correction of XYθ Table 28

The positions of the three holes A1 to A3 of the correction jig 130 are sensed by the CCD camera 36B, and distances $S_X$ and $S_Y$ per CCD pixel are calculated using equations (1) below on the basis of the three image data. Subsequently, the moving amount upon moving the XYθ table 28 by a predetermined distance ($T_X$, $T_Y$) is obtained by the image data, and lead pitch conversion coefficients $LP_X$ and $LP_Y$ are derived using equations (2) and (3) below on the basis of the ratio of the moving amount to the movement command value:

$$S_X = X_0/V_{X0},\ S_Y = Y_0/V_{Y0} \tag{1}$$

$$LP_X = T_X/(V_X \cdot S_X) \cdot LP_{X0} \tag{2}$$

$$LP_Y = T_Y/(V_Y \cdot S_Y) \cdot LP_{Y0} \tag{3}$$

where $X_0$ is the interval between the two holes A1 and A2, $Y_0$ is the interval between the two holes A1 and A3, $V_{X0}$ is the number of pixels corresponding to the interval between the two holes A1 and A2, $V_{Y0}$ is the number of pixels corresponding to the interval between the two holes A1 and A3, $LP_{X0}$ and $LP_{Y0}$ are the current X-and Y-axis lead pitch conversion coefficients, and $V_X$ and $V_Y$ are the numbers of pixels corresponding to the moving amounts obtained when the XYθ table 28 is moved by $T_X$ and $T_Y$ using the current conversion coefficients. The calculated lead pitch conversion coefficients are stored in the lead pitch conversion coefficient storage area 226 in the RAM 220 as control parameters in the NC controller 92. With this control, the moving amount, defined by the movement command value, of the XYθ table 28 matches that of image data (actually measured value).

(2) Calculation of Coordinate Conversion Coefficients

Figure 20:
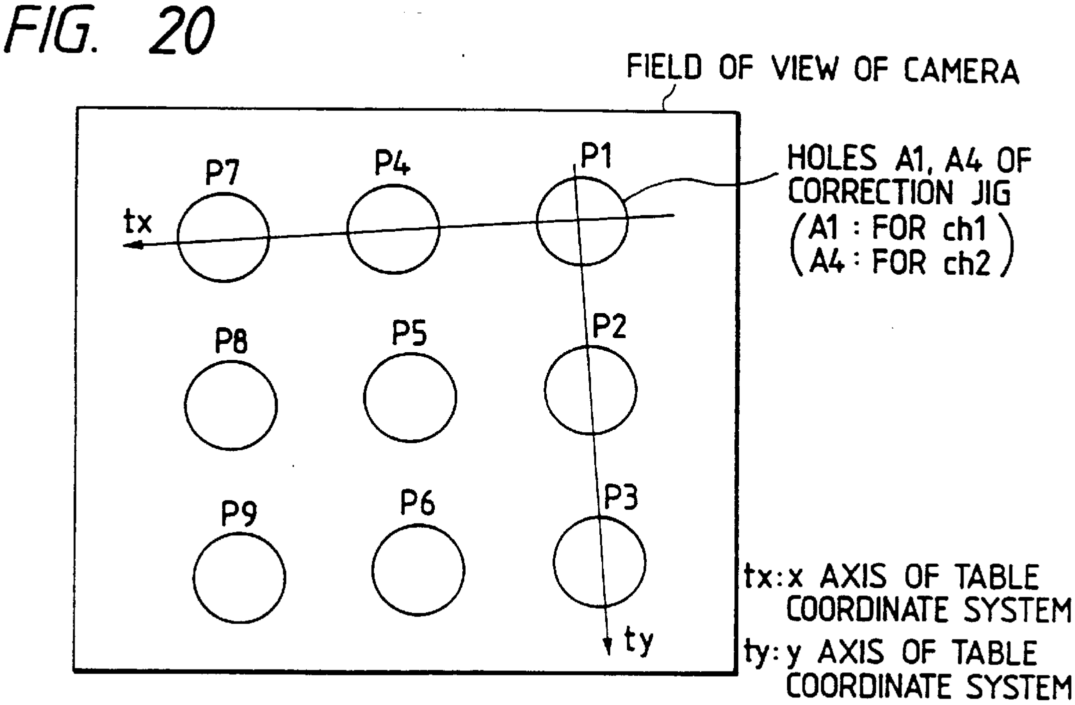
FIG. 20 is a view for explaining the calculation of coordinate conversion coefficients.

The calculation of the coordinate conversion coefficients will be described below with reference to FIG. 20. The XYθ table 28 is moved to a plurality of arbitrary points (nine points in FIG. 20), and image data of the holes A1 and A4 are acquired by the two cameras 36A and 36B at these points (P1 to P9). Thereafter, the coordinate conversion coefficients for the cameras 36A and 36B are calculated by a common method, i.e., by substituting the position data of the XYθ table 28 and image data in an equation of n-th degree and solving the equation. The calculated coordinate conversion coefficients are stored in the RAM 186 in the image processing controller 80. Subsequent image data is obtained not as the number of pixels but as actual measurements on the converted table coordinate system.

(3) Positional Relationship between Cameras 36A and 36B

Figure 19B:
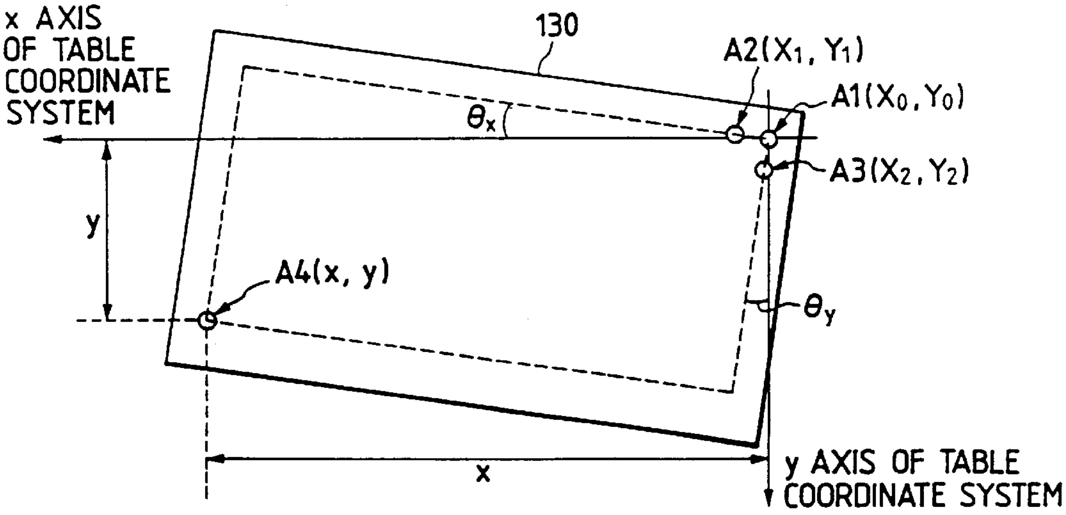
FIG. 19B is a view showing the processing method for clarifying the positional relationship between cameras 36A and 36B.

The cameras 36A and 36B are currently located at the coarsely adjusted positions. FIG. 19B shows the processing method of clarifying their positional relationship.

The correction jig 130 is set at the actual work glass face plate position on the upper heating plate 20. In this state, an image is sensed by the cameras 36A and 36B to acquire the hole positions $(X_0, Y_0)$, $(X_1, Y_1)$, and $(X_2, Y_2)$ of the holes A1 to A3.

An angle $\theta_X$ a straight line connecting A1 and A2 makes with the X-axis of the XYθ table 28 is calculated using equation (4) below. Similarly, an angle $\theta_Y$ a straight line connecting A1 and A3 makes with the Y-axis of the XYθ table 28 is calculated using equation (5) below. The camera position is calculated using equations (6) and (7) below on the basis of the calculated angles:

$$\theta_X = \mathrm{Tan}\ (-1)(Y_1 - Y_0)/(X_1 - X_0) \quad (4)$$

$$\theta_Y = \mathrm{Tan}\ (-1)(Y_2 - Y_0)/(X_2 - X_0) \quad (5)$$

$$x = X \cos(\theta_X) + Y \sin(\theta_Y) \quad (6)$$

$$y = Y \cos(\theta_Y) - X \sin(\theta_X) \quad (7)$$

The calculated position (x, y) is registered in the RAM 186 in the image processing controller 80 as the positional relationship between the two cameras on the table coordinate system. Note that x and y represent the positional relationship between the two holes A1 and A3 on the correction jig 130.

(4) Gradient Correction between Upper Heating Plate 20 and X- and Y-axes of XYθ Table 28

Figure 21:
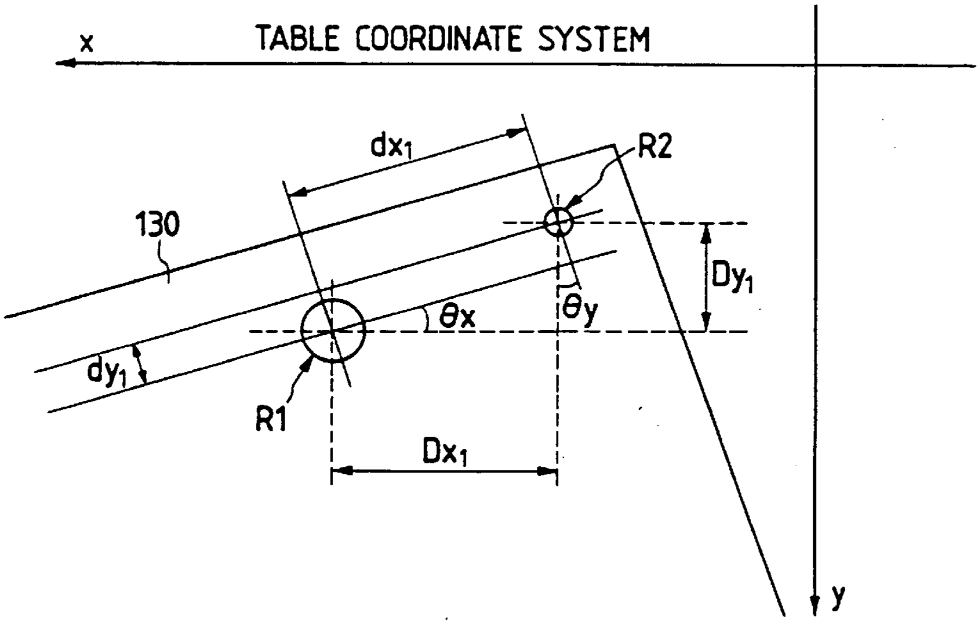
FIG. 21 is a view for explaining the gradient correction between an upper heating plate 20 and the X-and Y-axes of an XYθ table 28.

The gradient correction between the upper heating plate 20 and the X- and Y-axes of the XYθ table 28 will be described below with reference to FIG. 21. FIG. 21 exemplifies the case of camera ch1, but the same applies to camera ch2.

Using $\theta_x$ and $\theta_y$ calculated upon calculating the positional relationship between the cameras 36A and 36B, correction values of the positional relationships $(d_{x1}, d_{y1})$ and $(d_{x2}, d_{y2})$ between the alignment marks R1 and R2 on plates to be adhered (glass-face plate, glass-rear plate, or spacer holding jig), which relationships are measured in advance using a measuring device) are calculated in accordance with the following equations (8) to (11):

$$D_{x1} = d_{x1} \cdot \cos\theta_x - d_{y1} \cdot \sin\theta_y \quad (8)$$

$$D_{y1} = d_{y1} \cdot \cos\theta_y + d_{x1} \cdot \sin\theta_x \quad (9)$$

$$D_{x2} = d_{x2} \cdot \cos\theta_x - d_{y2} \cdot \sin\theta_y \quad (10)$$

$$D_{y2} = d_{y2} \cdot \cos\theta_y + d_{x2} \cdot \sin\theta_x \quad (11)$$

When the upper heating plate 20 rotates due to thermal expansion during the assembling process, the rotation amount is added to $\theta_x$ and $\theta_y$.

(5) Gradient Correction of Optical Axes of Cameras 36A and 36B

Figure 22:
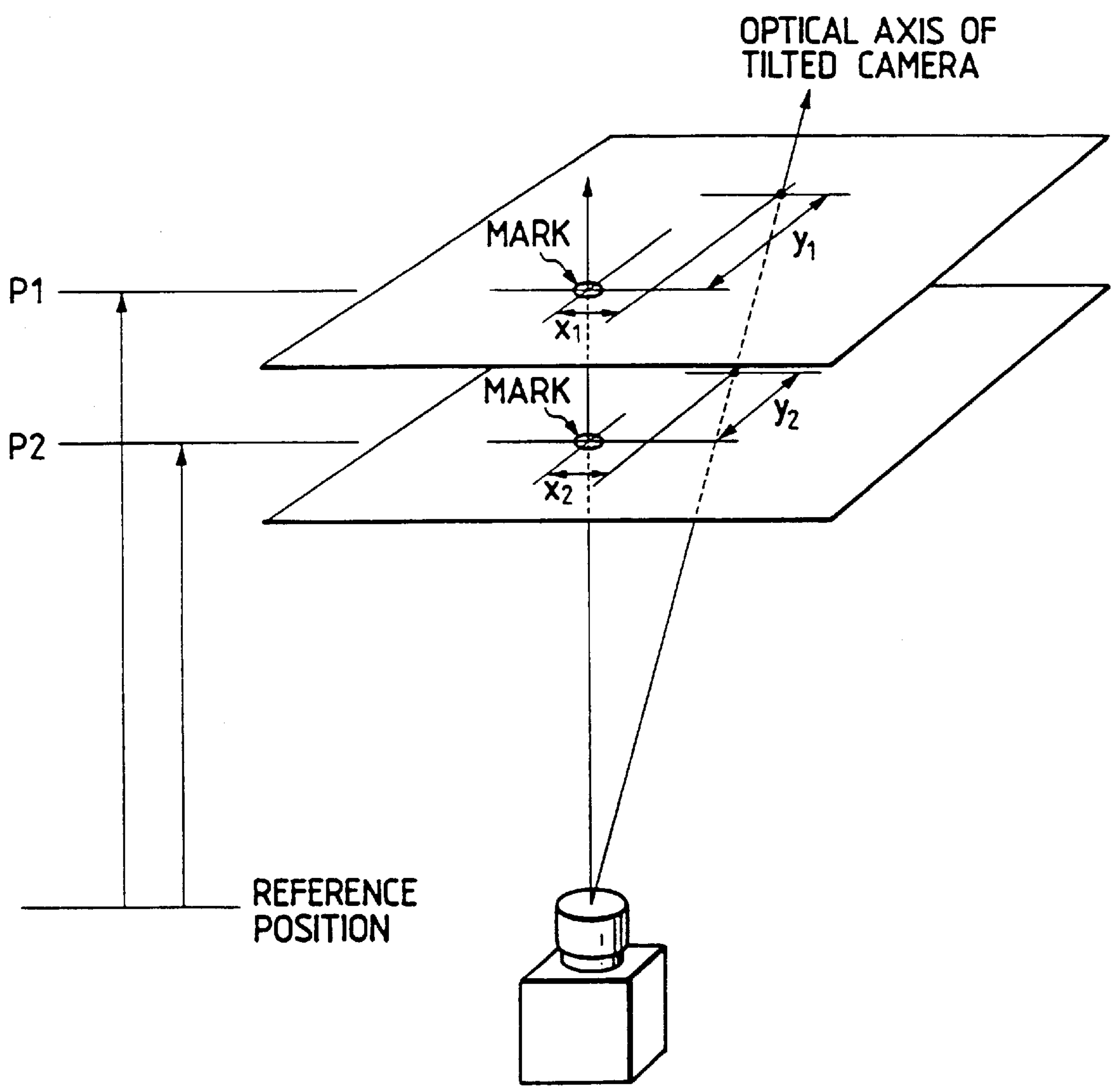
FIG. 22 is a view for explaining the gradient correction of the optical axis of each of the cameras 36A and 36B.

The gradient correction of the optical axes of the cameras 36A and 36B will be described below with reference to FIG. 22. In FIG. 22, only one camera 36B is corrected. However, both the cameras 36A and 36B are corrected by the same operation.

The cameras 36A and 36B must be attached perpendicularly to the plates (two of the glass-face plate, glass-rear plate, and spacer holding jig), but are attached to be slightly tilted in practice. In order to correct errors caused by the tilt angles, the upper heating plate 20 to which the correction jig 130 is attached is driven to at least two points in the vertical direction. The gradients $\theta_x$ and $\theta_y$ of the optical axis of the camera are calculated using equations (12) and (13) below on the basis of position data P1 and P2 of the upper heating plate 20 obtained at that time and image data $(X_1, Y_1)$ and $(X_2, Y_2)$ at these points, and are registered in the RAM 186 as image data correction values:

$$\tan\theta_x = (X_1 - X_2)/(P_1 - P_2) \quad (12)$$

$$\tan\theta_y = (Y_1 - Y_2)/(P_1 - P_2) \quad (13)$$

Upon execution of adhesion, the interval h between the objects to be adhered is detected, and is substituted in equations (14) below to calculate correction values $X_h$ and $Y_h$ of image data. Then, corrected image data to which $X_h$ and $Y_h$ are added are output:

$$X_h = h \cdot \tan\theta_x,\ Y_h = h \cdot \tan\theta_y \quad (14)$$

As a means for detecting the position of the upper heating plate 20, detection using a distance sensor, the encoder outputs of the NC motors, conversion based on the area of the acquired image, and the like may be used. However, the present invention is not limited to any specific method.

Figure 23:
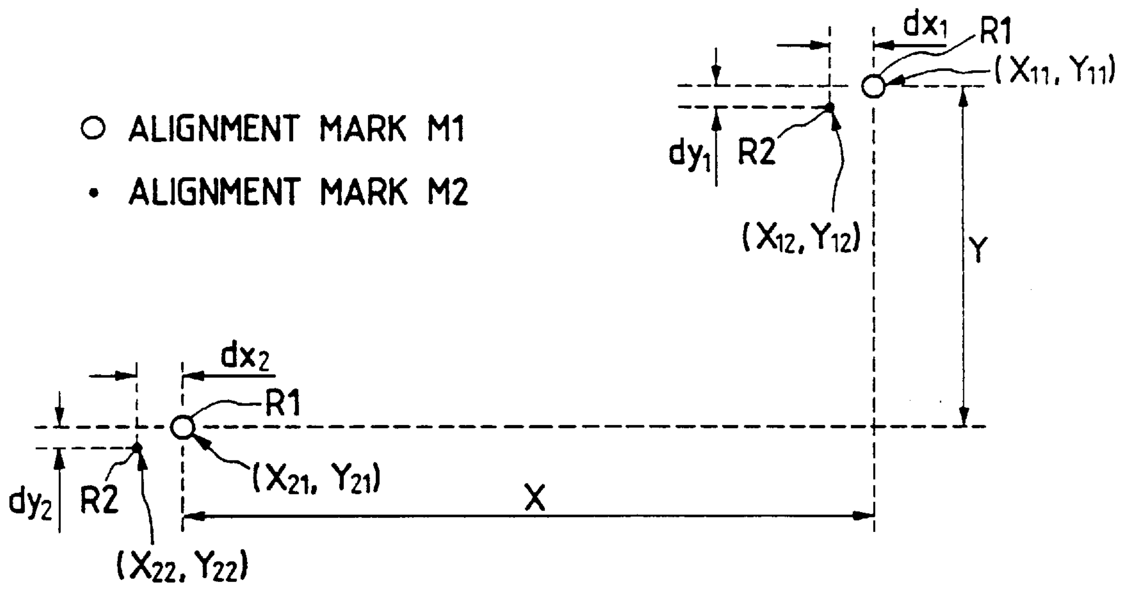
FIG. 23 is a view showing the positional relationship between alignment marks R1 and R2.

FIG. 23 shows the (center) positional relationships between the alignment marks R1 and R2 on two upper and lower works (two of the glass-face plate, glass-rear plate, and spacer holding jig). The positional relationships between the marks R1 and R2 may vary with respect to the positions of pixels. In this case, the positions of the marks R1 and R2 are measured by a measuring device. The positional relationships $(d_{X1}, d_{Y1})$ and $(d_{X2}, d_{Y2})$ between the two pairs of upper and lower marks are calculated from the positions $(X_{11}, Y_{11})$, $(X_{12}, Y_{12})$, $(X_{21}, Y_{21})$, and $(X_{22}, Y_{22})$ of the marks R1 and R2, and are registered in the RAM 186 in the image processing controller 80. Thereafter, position alignment is performed based on the registered positional relationships. Note that in this embodiment, the two pairs of alignment marks R1 and R2 are formed at positions shifted by a predetermined amount so as not to overlap each other.

Description of Position Alignment Step

The initial position alignment before the temperature is raised and processes from the temperature rise to completion of adhesion will be described below.

Figure 24A:
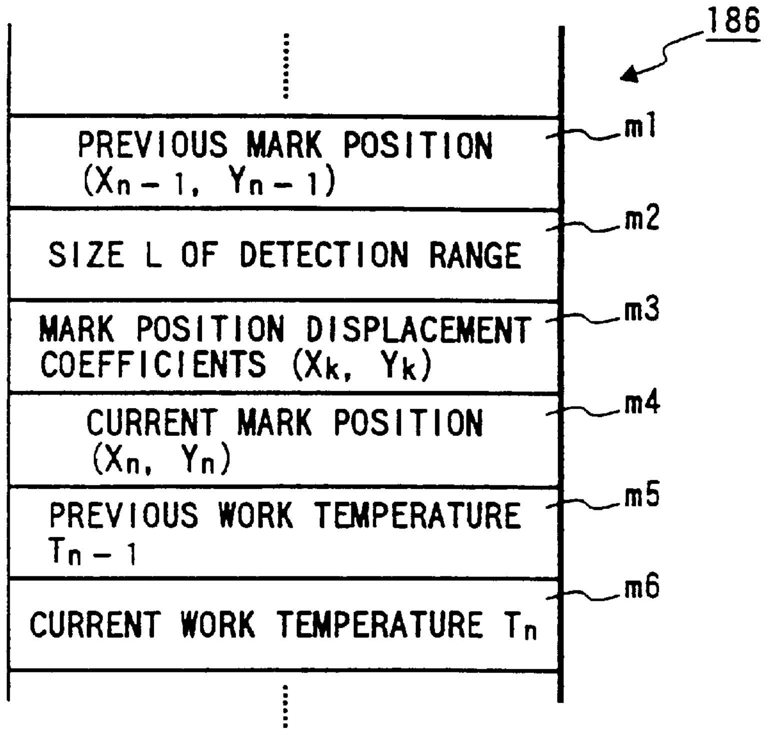
FIG. 24A is a view for explaining the storage area of a RAM 186 in an image processing apparatus 23.
Figure 24B:
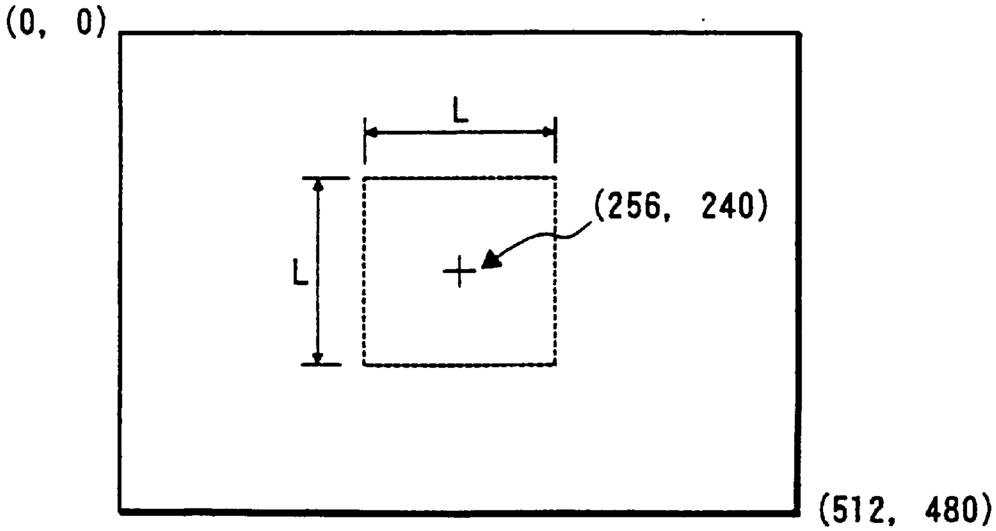
FIG. 24B is a view for explaining the size L of the detection range as one of data stored in the RAM 186.

The storage areas in the RAM 186 in the image processing controller 80 shown in FIG. 24A will be described below. The RAM 186 has a storage area m1 for the previous positions $(X_{n-1}, Y_{n-1})$ of the marks R1 and R2, a storage area m2 for the size L of the detection range (shown in FIG. 24B; a maximum value=480 in this embodiment), a storage area m3 for position displacement coefficients $(X_n, Y_k)$ of the marks R1 and R2 with respect to the temperature, and a storage area m4 for the current positions $(X_k, Y_n)$ of the marks R1 and R2. These areas store data of the respective channels and alignment marks. As common storage areas, a storage area m5 for the previous work temperature $T_{n-1}$, and a storage area m6 for the current work temperature $T_n$ are allocated.

The initial values in the respective storage areas are as follows: (256, 240), the area m1; 480, the area m2; (0, 0), the areas m3 and m4; and 0, the areas m5 and m6. The initial values (256, 240) in the area m1 represent the central coordinates of 512 pixels in the horizontal direction and 480 pixels in the vertical direction that define the processing range of the frame acquired from the cameras 36A and 36B. In the initial state, since the positions of the alignment marks R1 and R1 are unknown, the value stored in the area m2 is the maximum value (480) of the processing range of the frame that can be set.

Initial Position Alignment

Figure 25:
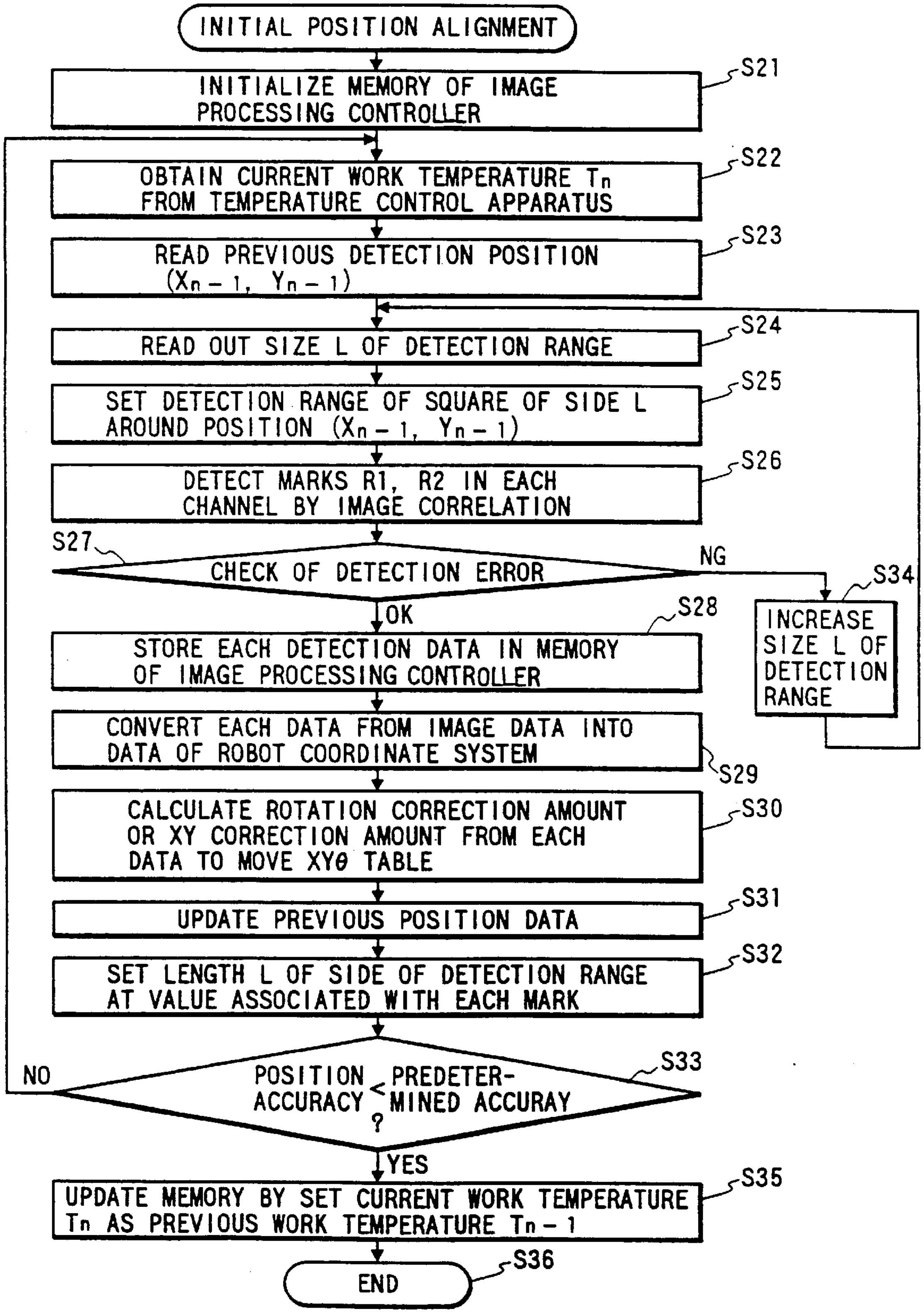
FIG. 25 is a flow chart for explaining initial position alignment.

The initial position alignment will be described below with reference to FIG. 25. Note that the processing to be described below is basically performed by the CPU 184 in the image processing controller 80.

Step S21: The storage areas m1 to m6 of the RAM 186 in the image processing controller 80 are initialized.

Step S22: The current work temperature $T_n$ is obtained from the temperature controller 32 via the NC controller 92.

Step S23: The previous position data ($X_{n-1}$, $Y_{N-1}$) is read out from the area m1.

Step S24: The size L of the detection range is read out from the area m2.

Step S25: The range of a square having a side of L and the previous data position ($X_{n-1}$, $Y_{n-1}$) as the center is set as the detection range.

Step S26: The positions (pixel data) of the alignment marks R1 and R2 are detected by image correlation in channels ch1 and ch2.

Step S27: Checking for detection errors is performed. If errors are found, the flow advances to step S32; otherwise, the flow advances to step S28.

Step S28: The detected position data are stored in the storage area m4 in the RAM 186.

Step S29: The position data are coordinate-converted from image data to data of the robot coordinate system.

Step S30: The rotation correction values or X-and Y-axis correction values are calculated based on the position data converted to those of the robot coordinate system, and the XYθ table 28 is moved in accordance with the calculated correction values. Moving control of the XYθ table 28 is performed by the NC controller 92. This control will be described in more detail later in the paragraphs of [initial position correction method].

Step S31: The previous position data stored in the area m1 are updated.

Step S32: The size L of the detection range stored in the area m2 is set to be a value associated with each of the marks R1 and R2.

Step S33: It is checked if the position accuracy falls within the predetermined accuracy range. If the position accuracy falls within the predetermined accuracy range, the flow advances to step S35; otherwise, the flow returns to step S23.

Step S34: The size L of the detection range is increased to a predetermined size, and the flow returns to step S24.

Step S35: The current work temperature $T_n$ is stored as the previous work temperature $T_{n-1}$ to update the contents of the area m5.

Step S36: The initial position alignment ends.

Initial Position Correction Method

The displacement amount correction method in step S30 in FIG. 25 will be explained in detail below with reference to FIGS. 28A and 28B, and FIGS. 29A and 29B. Note that FIG. 28A shows the state wherein rotation correction of the mark positional relationship is performed from the state before correction, FIG. 28B shows the state wherein Y-axis correction is performed, FIG. 29A shows the state wherein X-axis correction is performed, and FIG. 29B shows the positional relationship between the alignment marks upon completion of the position correction.

Before the adhesion operation, the glass-face plate 2 and the spacer jig 68 or the glass-rear plate 1 are attached to the upper and lower heating plates 20 and 26, and are mechanically aligned to have a predetermined positional relationship therebetween. Thereafter, correction is performed in turn in units of processes in step S30.

Figures 28A, 28B:
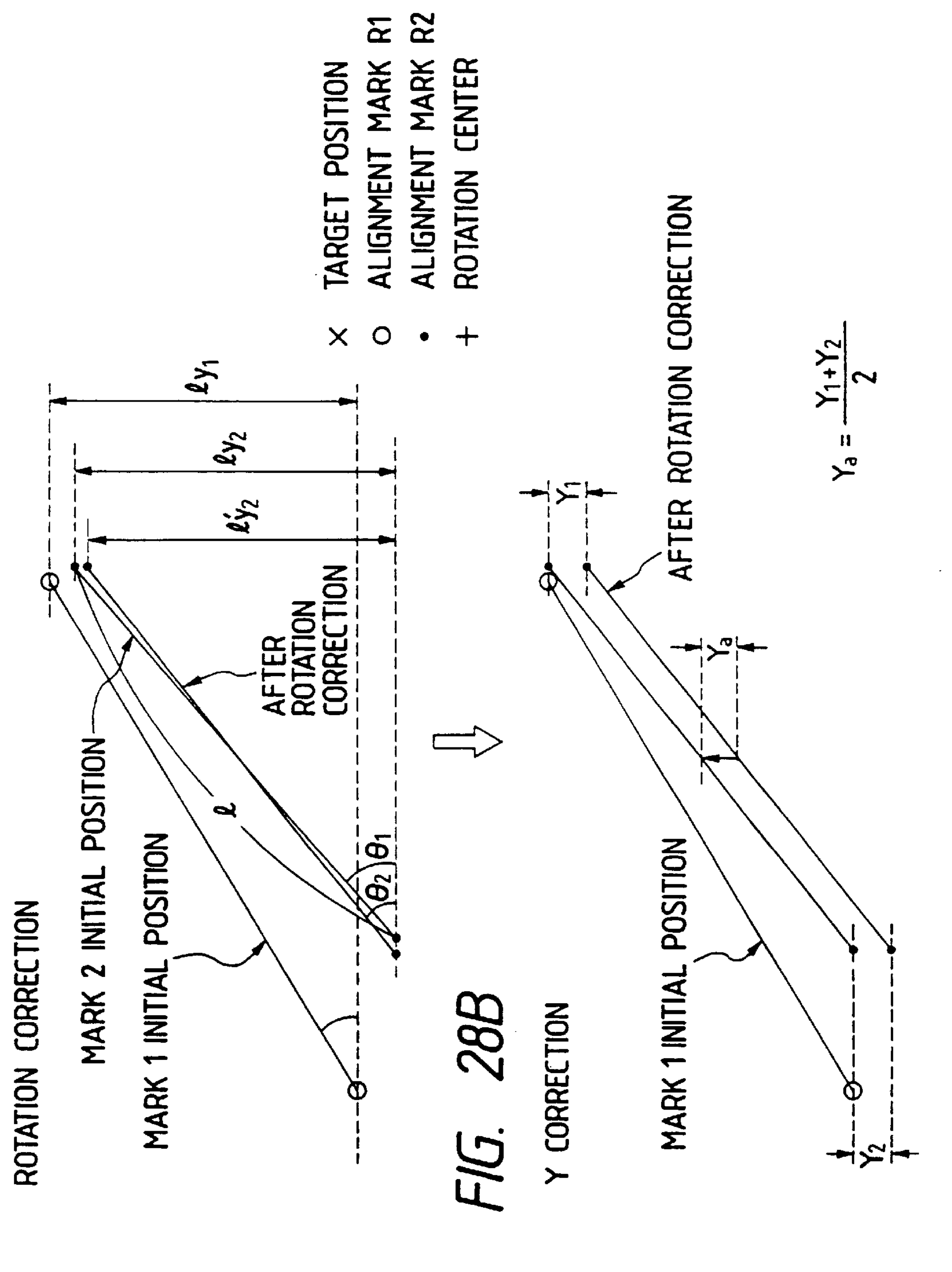
Figure 29A:
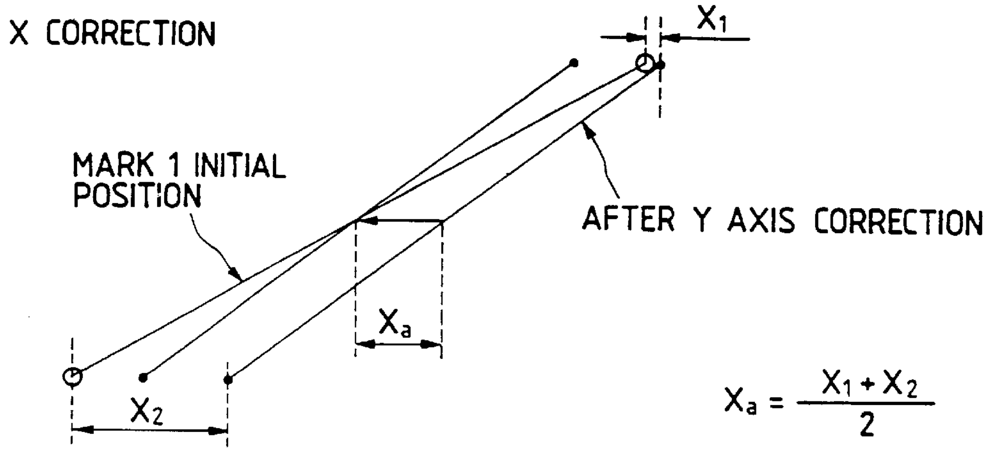
Figure 29B:
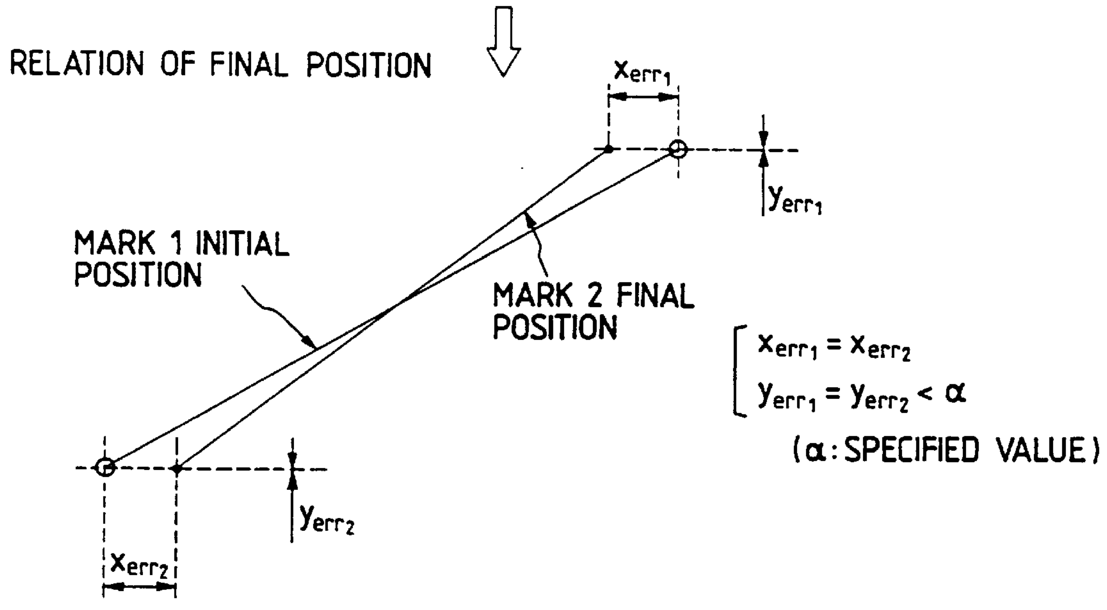

In step S30 (first time), rotation correction is performed, as shown in FIG. 28A.

In channel ch1, the positions ($X_{11}$, $Y_{11}$) and ($X_{12}$, $Y_{12}$) of the two alignment marks R1 and R2, which are registered in advance, are detected. These data have been obtained until step S29 in FIG. 25.

The distance h between the glass-face plate 2 and the member (spacer jig 68 or the glass-rear plate 1) attached to the lower heating plate 26 is detected, and the correction values $X_h$ and $Y_h$ for the gradient of the optical axis of the camera are calculated using equations (14) above. Values ($X_{11}-X_{h1}$, $Y_{11}-Y_{h1}$) obtained by subtracting the correction values for the gradient of the optical axis of the camera from the position data detected in advance of the mark R1 are stored, and values ($X_{12}-D_{X1}$, $Y_{12}-D_{Y1}$) obtained by subtracting the angle-corrected values corresponding to the initial displacement amount from the position data of the mark R2 are stored. These data are stored in the working area on the RAM 186. The same applies to the storage operation in similar processing to be described below.

Likewise, in channel ch2, the positions ($X_{21}$, $Y_{21}$) and ($X_{22}$, $Y_{22}$) of the two alignment marks R1 and R2 are obtained. As in channel ch1, values ($X_{21}-X_{h2}$, $Y_{21}-Y_{h2}$) obtained by subtracting the correction values for the gradient of the optical axis of the camera from the data of the mark R1 are calculated, and the angle-corrected values corresponding to the initial displacement are subtracted from the data of the mark R2. Furthermore, offset values ($X_0$, $Y_0$) for channel ch2, which are calculated in advance, are added to the calculated values to store ($X_{21}-X_{h2}+X_0$, $Y_{21}-Y_{h2}+Y_0$) and ($X_{22}+X_0-D_{X2}$, $Y_{22}+Y_0-D_{Y2}$). From the stored position data, a Y-component $L_{y1}$ of a line segment that connects the alignment marks R1 is calculated using the following equation (15):

$$l_{y1}=(Y_{21}-Y_{h2}+Y_0)-(Y_{11}-Y_{h1}) \tag{15}$$

Subsequently, a rotation amount θ required for making a Y-component $l_{y2}$ of a line segment that connects the alignment marks R2 equal to the value $l_{y1}$ calculated using equation (15) above is calculated using the following equations (16) to (19):

$$l=\{((X_{22}+X_0-D_{X2})-(X_{12}-D_{X1}))^2+((Y_{22}+Y_0-D_{Y2})-(Y_{12}-D_{Y1}))^2\}^{1/2} \tag{16}$$

$$\theta_1=\mathrm{Sin}^{-1}(((Y_{22}+Y_0-D_{Y2})-(Y_{12}-D_{Y1}))/l) \tag{17}$$

$$\theta_2=\mathrm{Sin}^{-1}(l_{Y2}/l)=\sin^{-1}(l_{y1}/l) \tag{18}$$

$$\theta=\theta_2-\theta_1 \tag{19}$$

where l is the length of the line segment that connects the two points of the two alignment marks R2, $\theta_1$ is the current gradient of the line segment with respect to the X-axis of the XYθ table, and $\theta_2$ is the gradient of the line segment after correction.

When the positions of the alignment marks R1 and R2 which are moved by the calculated correction amounts fall within the detection ranges of the cameras 36A and 36B, the data of the rotation amount θ is supplied to the NC controller 92 via a serial transmission line. The NC controller 92 rotates the XYθ table 28 by the received data, i.e., the rotation correction amount. On the other hand, when the positions of the marks fall outside the corresponding detection ranges, an error signal is transmitted to the NC controller 92. In response to the error signal, the NC controller 92 operates a warning device, suspends the automatic operation, and switches the operation mode to the manual mode. The subsequent position correction is performed by the operator. Thereafter, the flow advances to step S31 in FIG. 25.

In the next (second time) step S30, Y-axis correction is performed, as shown in FIG. 28B.

In channel ch1, the positions ($X_{11}$, $Y_{11}$) and ($X_{12}$, $Y_{12}$) of the two alignment marks R1 and R2, which are registered in advance, are detected. The distance h between the glass-face plate 2 and the member (spacer jig 68) attached to the lower heating plate 26 is detected, and the correction value $Y_h$ for the gradient of the optical axis of the camera is calculated using one of equations (14) above. A value ($Y_{11}-Y_{h1}$) obtained by subtracting the correction value for the gradient of the optical axis of the camera from the position data detected in advance of the mark R1 is stored, and a value ($Y_{12}-D_{Y1}$) obtained by subtracting the angle-corrected value corresponding to the initial displacement amount from the position data of the mark R2 is stored.

Likewise, in channel ch2, the positions ($X_{21}$, $Y_{21}$) and ($X_{22}$, $Y_{22}$) of the two alignment marks R1 and R2 are obtained. As in channel ch1, a value ($Y_{21}-Y_{h2}$) obtained by subtracting the correction values for the gradient of the optical axis of the camera from the data of the mark R1 is stored, and a value ($Y_{22}-D_{y2}$) obtained by subtracting the angle-corrected value corresponding to the initial displacement from the data of the mark R2 is stored. Differences Y1 and Y2 between the marks R1 and R2 in identical channels are calculated based on the stored position data, and the average Ya of displacement amounts of the Y-components is calculated using the following equation (20):

$$\begin{aligned} Ya &= (Y1 + Y2)/2 \qquad (20) \\ &= (((Y_{12} - D_{Y1}) - (Y_{11} - Y_{h1})) + ((Y_{22} - D_{Y2}) - (Y_{21} - Y_{h2})))/2 \end{aligned}$$

As in the rotation correction, the positions corrected based on the calculated correction amount are checked, and the data of the correction amount is supplied to the NC controller 92 via the serial transmission line. Upon reception of the data, the NC controller 92 moves the XYθ table 28 in the Y-direction. Thereafter, the flow advances to step S31 in FIG. 25.

The above-mentioned two correction methods are repetitively executed until the position accuracy in the Y direction falls within the predetermined accuracy range α. The position alignment can be made even if the predetermined accuracy is 0.

Upon completion of the Y-axis correction, the positional relationship between the marks is obtained, and the next target positions are calculated. The values $d_{X1}$ and $d_{X2}$ remain the same, and as the values $d_{Y1}$ and $d_{Y2}$, the results of the following equations are used as the target positions.

$$d_{Y1}=Y_{err1}\ (=Y_{12}-Y_{11}) \qquad (21)$$

$$d_{Y2}=Y_{err2}\ (=Y_{22}-Y_{21}) \qquad (22)$$

The angle correction values $D_{Y1}$ and $D_{Y2}$ of the positional relationships $d_{Y1}$ and $d_{Y2}$ obtained using the above equations are calculated using equations (9) and (11) above. ($D_{X1}$, $D_{Y1}$) and ($D_{X2}$, $D_{Y2}$) define the next target mark positional relationships.

Upon completion of the above two corrections, X-axis correction is performed in the final step S30, as shown in FIG. 29A.

In channel ch1, the positions ($X_{11}$, $Y_{11}$) and ($X_{12}$, $Y_{12}$) of the two alignment marks R1 and R2, which are registered in advance, are detected.

The distance h between the glass-face plate 2 and the member (spacer jig 68 or rear plate) attached to the lower heating plate 26 is detected, and the correction value $X_h$ for the gradient of the optical axis of the camera is calculated using one of equations (14) above. A value ($X_{11}-X_{h1}$) obtained by subtracting the correction value for the gradient of the optical axis of the camera from the position data detected in advance of the mark R1 is stored, and a value ($X_{12}-D_{X1}$) obtained by subtracting the angle-corrected value corresponding to the initial displacement amount from the position data of the mark R2 is stored.

Likewise, in channel ch2, the positions ($X_{21}$, $Y_{21}$) and ($X_{22}$, $Y_{22}$) of the two alignment marks R1 and R2 are obtained. As in channel ch1, a value ($X_{21}-X_{h2}$) obtained by subtracting the correction value for the gradient of the optical axis of the camera from the data of the mark R1 is stored, and a value ($X_{22}-D_{x2}$) obtained by subtracting the angle-corrected value corresponding to the initial displacement from the data of the mark R2 is stored. Differences X1 and X2 between the marks R1 and R2 in identical channels are calculated based on the stored position data, and the average Xa of displacement amounts of the X-components is calculated using the following equation (23):

$$\begin{aligned} Xa &= (X1 + X2)/2 \qquad (23) \\ &= (((X_{12} - D_{X1}) - (X_{11} - X_{h1})) + ((X_{22} - D_{X2}) - (X_{21} - X_{h2})))/2 \end{aligned}$$

The same checking operation as in the above correction is performed, and data is supplied to the NC controller 92 via the serial transmission line. Upon reception of the data, the NC controller 92 moves the XYθ table 28 in the X-direction. Thereafter, the flow advances to step S31 in FIG. 25.

Upon completion of the X-axis correction, the positional relationship between the marks is obtained, and the next target positions are calculated. The values $d_{Y1}$ and $d_{Y2}$ remain the same, and as the values $d_{X1}$ and $d_{X2}$, the results of the following equations are used as the target positions.

$$d_{X1}=X_{err1}\ (=X_{12}-X_{11}) \qquad (24)$$

$$d_{X2}=X_{err2}\ (=X_{22}-X_{21}) \qquad (25)$$

The angle correction values $D_{X1}$ and $D_{X2}$ of the positional relationships $d_{X1}$ and $d_{X2}$ calculated using the above equations are calculated using equations (8) and (10) above. ($D_{X1}$, $D_{Y1}$) and ($D_{X2}$, $D_{Y2}$) define the target mark positional relationships of the next position alignment.

FIG. 29B shows the positional relationship between the marks R1 and R2 after the position correction. The displacement amount ($X_{err1}$, $Y_{err1}$) on the channel ch1 side and the displacement amount ($X_{err2}$, $Y_{err2}$) on the channel ch2 side are:

$$X_{err1}=X_{err2},\ Y_{err1}=Y_{err2}\leqq\alpha$$

Step 6

The temperature controller 32 successively executes the heating operation.

Step 7

Even during execution of the temperature rising process in step 6, the position adjustment operation between the glass-face plate 2 and the spacer jig 68 on the basis of the mark positions in step 5 is performed at predetermined time intervals. In this embodiment, position adjustment is repetitively executed at intervals of about 30 sec. This operation will be described in detail below.

Position Alignment During Heating/Cooling Process

Figure 26:
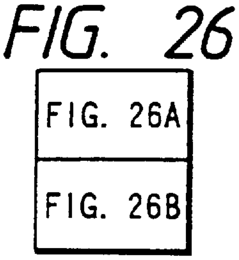
FIG. 26 is comprised of FIGS. 26A and 26B showing flow charts for explaining the position correction method during the heating/cooling process.
Figure 26A:
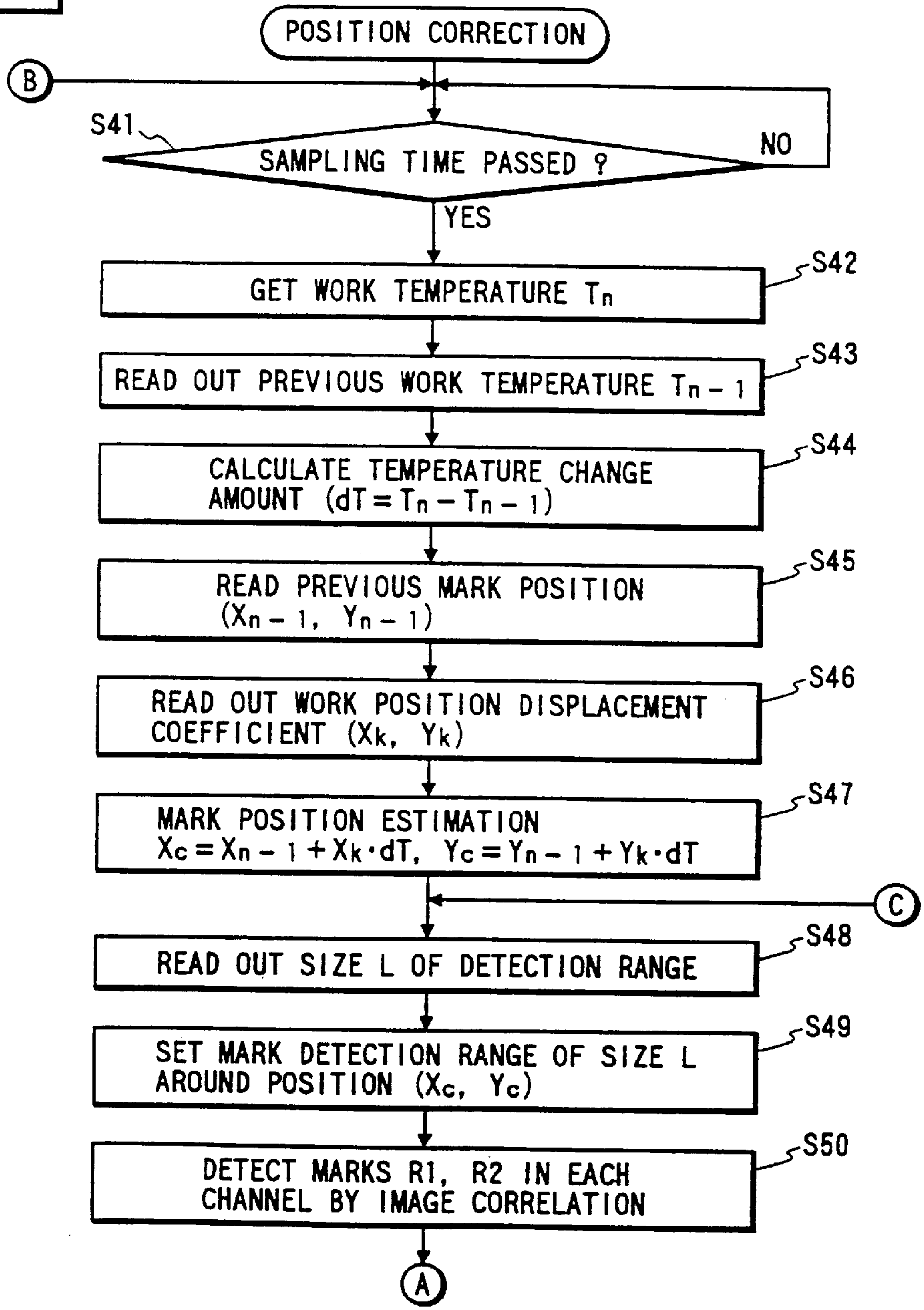
Figure 26B:
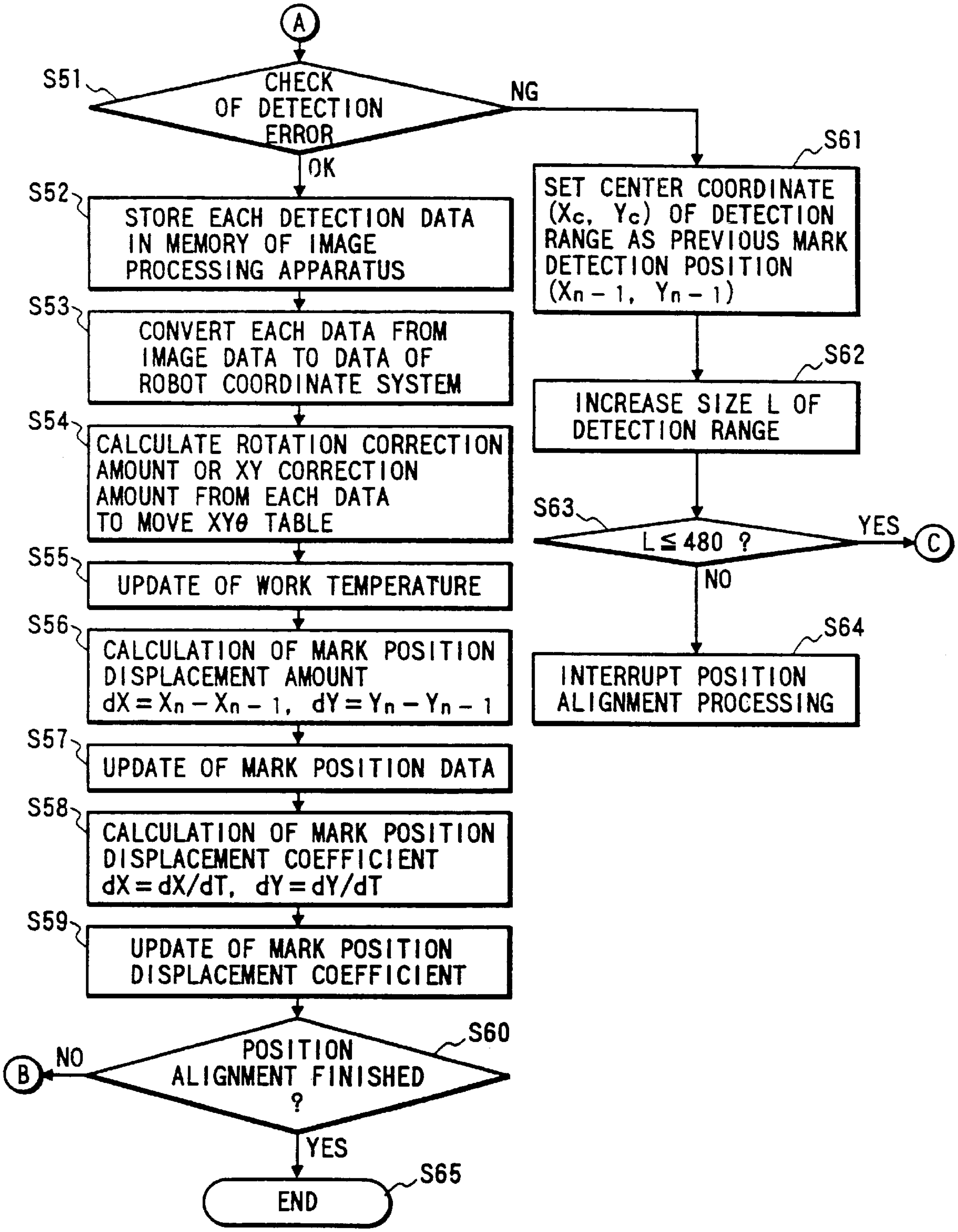

The position alignment during the heating/cooling process will be described below with reference to FIGS. 26A, 26B, 27A, 27B, 27C and 27D. FIGS. 26A and 26B are flow charts showing the position correction method during the heating/cooling process, and FIGS. 27A, 27B, 27C and 27D illustrate the processing contents. In this case as well, the processing is basically performed by the CPU 184 in the image processing controller 80.

The frit glass 70 is temporarily caused to melt, and then allowed to solidify to bond the spacers 4 to the glass-face plate 2. The glass-face plate 2 in this state is attached to the glass-rear plate 1. For this purpose, the upper and lower heating plates 20 and 26 are heated by the temperature controller 32 to heat the plates 1 and 2 or the spacer jig 68. During the heating/cooling process, the works (plates 1 and 2), the spacer jig 68, and the assembling apparatus inevitably experience thermal expansion and thermal shrinkage. Since the direction of the thermal expansion or shrinkage is not uniform, the upper and lower plates 1 and 2 give rise to a displacement with respect to each other. Also, the center of rotation of the XYθ table 28 deviates from the original position. For this reason, such position displacement must be corrected as needed during the assembling process. The position correction method will be described below with reference to FIGS. 26A, 26B, 27A, 27B, 27C and 27D. In this case as well, the processing is basically performed by the CPU 184 in the image processing controller 80.

Step S41: The processing in step S42 and the subsequent steps is executed at every predetermined sampling time. Note that the sampling time is measured in the NC controller 92, and the respective processing commands are transmitted to the image processing controller 80.

Step S42: The current work temperature $T_n$ is obtained from the temperature controller 32 via the NC controller 92.

Step S43: The previous temperature $T_{n-1}$ stored in the area m5 in the RAM 186 in the image processing controller 80 is read out.

Step S44: A temperature change amount $dT\ (=T_n-T_{n-1})$ is calculated.

Step S45: The previous mark position $(X_{n-1}, Y_{n-1})$ is read out.

Step S46: The work position displacement coefficients $(X_k, Y_k)$ are read out from the area m3.

Step S47: As can be understood from FIG. 27A, the current positions of the alignment marks are estimated by $Xc=X_{n-1}+X_k \cdot dT$ and $Yc=Y_{n-1}+Y_k \cdot dT$.

Step S48: The size L of the detection range is read out from the area m2.

Figure 27A:
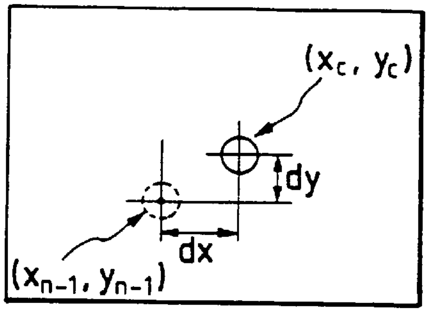
FIGS. 27A, 27B, 27C and 27D are views illustrating the processing contents.
Figure 27B:
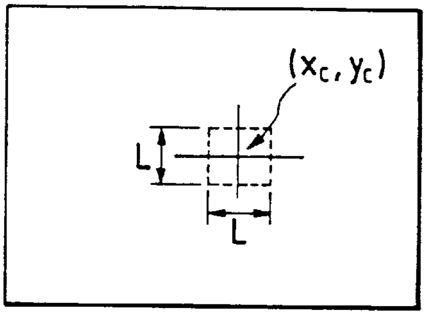
Figure 27C:
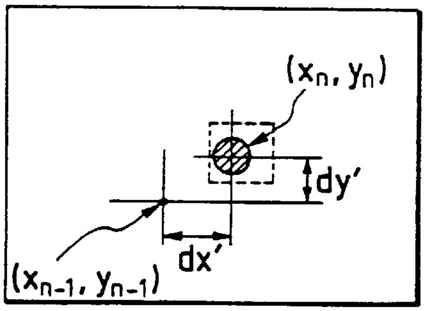

Step S49: As shown in FIG. 27B, a predetermined range L having the estimated position (Xc, Yc) as the center is set as the detection range.

Step S50: The positions of the alignment marks R1 and R2 are detected as pixel data by image correlation in the set detection range.

Step S51: Checking for detection errors is performed. If errors are found, the flow advances to step S61; otherwise, the flow advances to step S52.

Step S52: The detected position data are stored in the area m4 in the RAM 186.

Step S53: The position data are coordinate-converted from image data to data of the robot coordinate system.

Step S54: From the converted position data, the rotation correction values or X- and Y-axis correction values are calculated, and the XYθ table 28 is moved in accordance with the calculated correction values. Moving control of the XYθ table 28 is performed by the NC controller 92. This control will be described in detail later in the paragraphs of [position correction method during position alignment process (during heating/cooling process)].

Step S55: The current work temperature $T_n$ is stored as the previous work temperature $T_{n-1}$ to update the contents of the area m5.

Step S56: The work position displacement amounts are calculated by $dX=X_n-X_{n-1}$ and $dY=Y_n-Y_{n-1}$.

Step S57: The previous position data in the area m1 are updated.

Step S58: As can be understood from FIG. 27C, the mark position displacement coefficients are calculated by $X_k=dX/dT$ and $Y_k=dY/dT$.

Step S59: The mark position displacement coefficients in the area m3 are updated.

Step S60: It is checked if the position alignment process is finished. If the process is finished, the flow advances to step S65; otherwise, the flow returns to step S41.

Figure 27D:
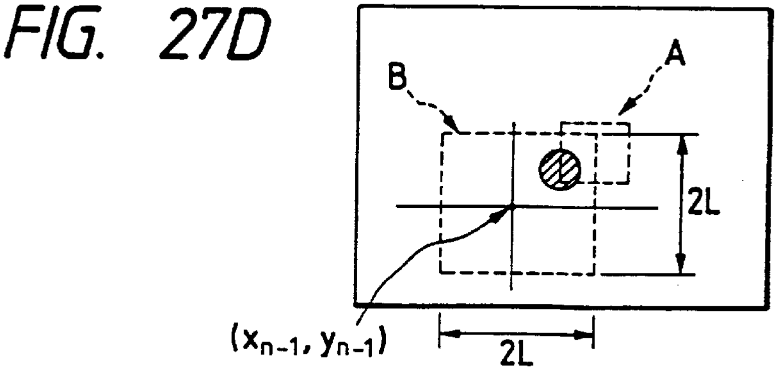

Step S61: As shown in FIG. 27D, the central coordinate position (Xc, Yc) of the detection range is stored as the previous mark detection position $(X_{n-1}, Y_{n-1})$.

Step S62: The size L of the detection range is increased (e.g., L=L×2).

Step S63: If the size L of the detection range has exceeded the maximum value (480), it is determined that detection cannot be performed, and the flow advances to step S64; otherwise, the flow returns to step S48.

Step S64: The position alignment processing is interrupted.

Step S65: The position alignment processing ends.

Whether or not the position alignment process is finished may be determined by a plurality of methods, e.g., on the basis of the elapsed time from the beginning of the position alignment and/or a stop command supplied from the temperature controller 32 when the work temperature becomes equal to or lower than a predetermined temperature, or when the NC control correction ceases to be effective. However, the present invention is not limited to any specific discrimination method.

The work temperature may be obtained by receiving temperature data from the temperature controller 32 or by checking the elapsed time. The present invention can use either of these methods.

Position Correction Method During Position Alignment Process (During Heating/Cooling Process)

The position displacement correction method in step S53 in FIG. 26B will be described in detail below.

Figure 30:
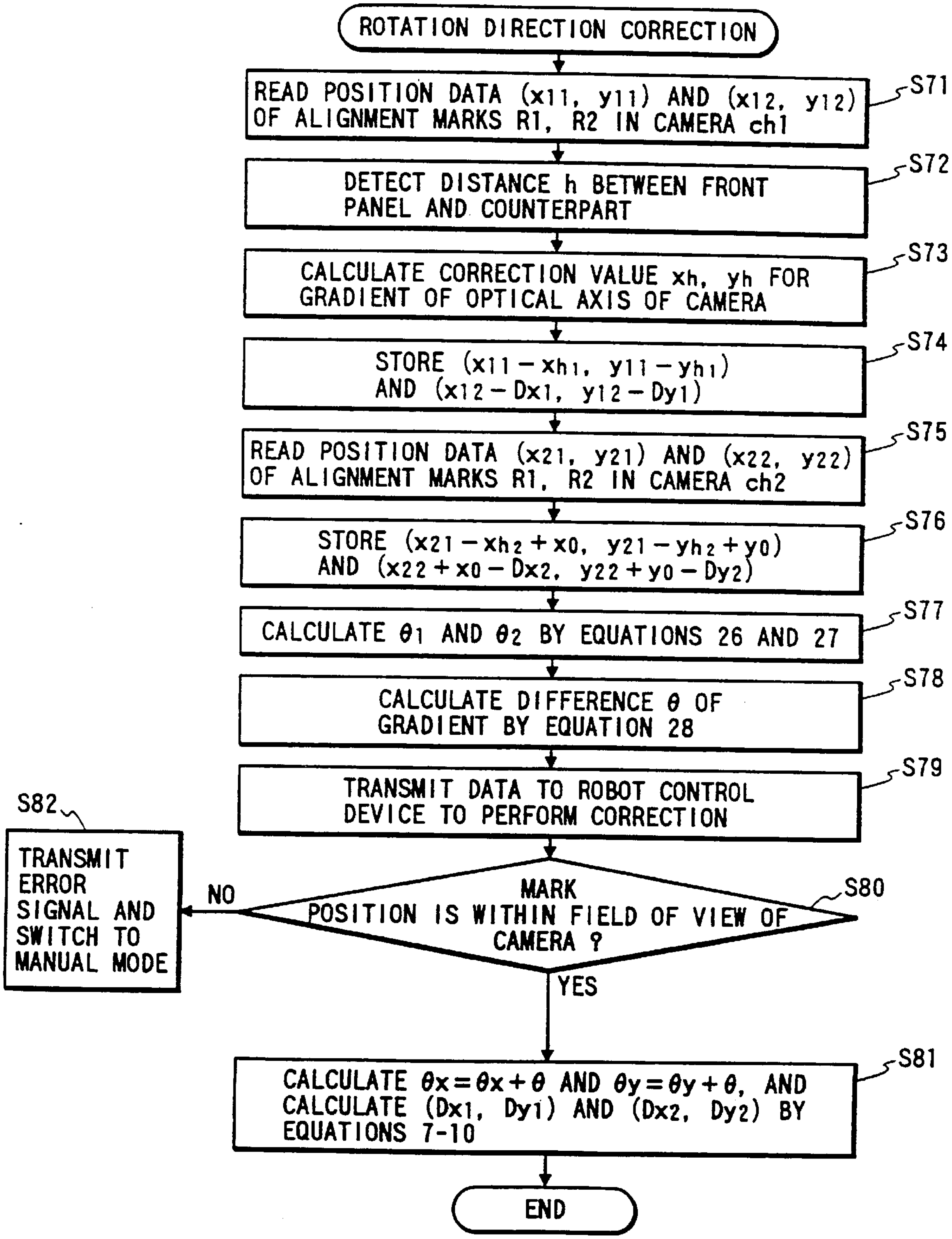
FIG. 30 is a flow chart for explaining the correction of th e rotation direction components.

First, the correction of components, in the rotation direction, of the position displacement amount will be described below. FIG. 30 is a flow chart associated with the correction of components in the rotation direction.

Step S71: In channel ch1, the positions $(X_{11}, Y_{11})$ and $(X_{12}, Y_{12})$ of the two alignment marks R1 and R2, which are registered in advance, are detected. These data are obtained until step S52 in FIG. 26B.

Step 72: The distance h between the glass-face plate 2 and the member (spacer jig 68 or the glass-rear plate 1) attached to the lower heating plate 26 is detected.

Step S73: The correction values $X_h$ and $Y_h$ for the gradient of the optical axis of the camera are calculated using equations (14) above.

Step S74: Values $(X_{11}-X_{h1}, Y_{11}-Y_{h1})$ obtained by subtracting the correction values for the gradient of the optical axis of the camera from the position data detected in advance of the mark R1 are stored, and values $(X_{12}-D_{X1}, Y_{12}-D_{Y1})$ obtained by subtracting the angle-corrected values corresponding to the initial displacement amount from the position data of the mark R2 are stored.

Step S75: In channel ch2 as well, the positions $(X_{21}, Y_{21})$ and $(X_{22}, Y_{22})$ of the two alignment marks R1 and R2 are obtained.

Step S76: As in channel ch1, values $(X_{21}-X_{h2}, Y_{21}-Y_{h2})$ obtained by subtracting the correction values for the gradient of the optical axis of the camera from the data of the mark R1 are calculated, and the angle-corrected values corresponding to the initial displacement are subtracted from the data of the mark R2. Furthermore, offset values $(X_0, Y_0)$ for channel ch2, which are calculated in advance, are added to the calculated values to store $(X_{21}-X_{h2}+X_0, Y_{21}-Y_{h2}+Y_0)$ and $(X_{22}+X_0-D_{X2}, Y_{22}+Y_0-D_{Y2})$.

Step S77: The gradients of straight lines that connect the corresponding alignment marks with respect to the X-axis on the table coordinate system are calculated on the basis of the stored position data using equations (26) and (27) below. The gradient of each alignment mark R1, i.e., the gradient of the glass-face plate 2, is calculated as $\theta_1$, and the gradient of each alignment mark R2, i.e., the gradient of the spacer jig 68 (or rear plate), is calculated as $\theta_2$.

$$\theta_1=\mathrm{Tan}^{-1}(((Y_{21}-Y_{h2}+Y_0)-(Y_{11}-Y_{h1}))/((X_{21}-X_{h2}+X_0)-(X_{11}-X_{h1}))) \quad (26)$$

$$\theta_2=\mathrm{Tan}^{-1}(((Y_{22}+Y_0-D_{Y2})-(Y_{12}-D_{Y1}))/((X_{22}+X_0-D_{X2})-(X_{12}-D_{X1}))) \quad (27)$$

Step S78: The difference $\theta$ $(=\theta_2-\theta_1)$ between the gradients is calculated using the following equation (28):

$$\theta=\theta_2-\theta_1 \quad (28)$$

Step S79: The data of the difference $\theta$ is supplied to the NC controller 92 via the serial transmission line. The NC controller 92 rotates the XYθ table 28 by the received data, i.e., the difference (correction amount) between the gradients.

Step S80: If the positions of the alignment marks R1 and R2 fall within the detection ranges of the cameras 36A and 36B upon movement by the calculated correction amount, the flow advances to step S81; otherwise, the flow advances to step S82.

Step S81: The rotation amount $\theta$ is added to the gradients $\theta_x$ and $\theta_y$ between the glass-face plate 2 and the table coordinate system to attain angle correction of the initial position displacement amounts $(d_{X1}, d_{Y1})$ and $(d_{X2}, d_{Y2})$, and the angle-corrected values $(D_{X1}, D_{Y1})$ and $(D_{X2}, D_{Y2})$ of the initial position displacement amounts are calculated using equations (8) to (11) above. The values $(D_{X1}, D_{Y1})$ and $(D_{X2}, D_{Y2})$ define the next target positional relationships. Thereafter, the flow advances to step S54 in FIG. 26B.

Step S82: An error signal is transmitted to the NC controller 92. The NC controller 92 operates a warning device, suspends the automatic operation, and switches the operation mode to the manual mode. The subsequent position correction is performed by the operator.

Figure 31:
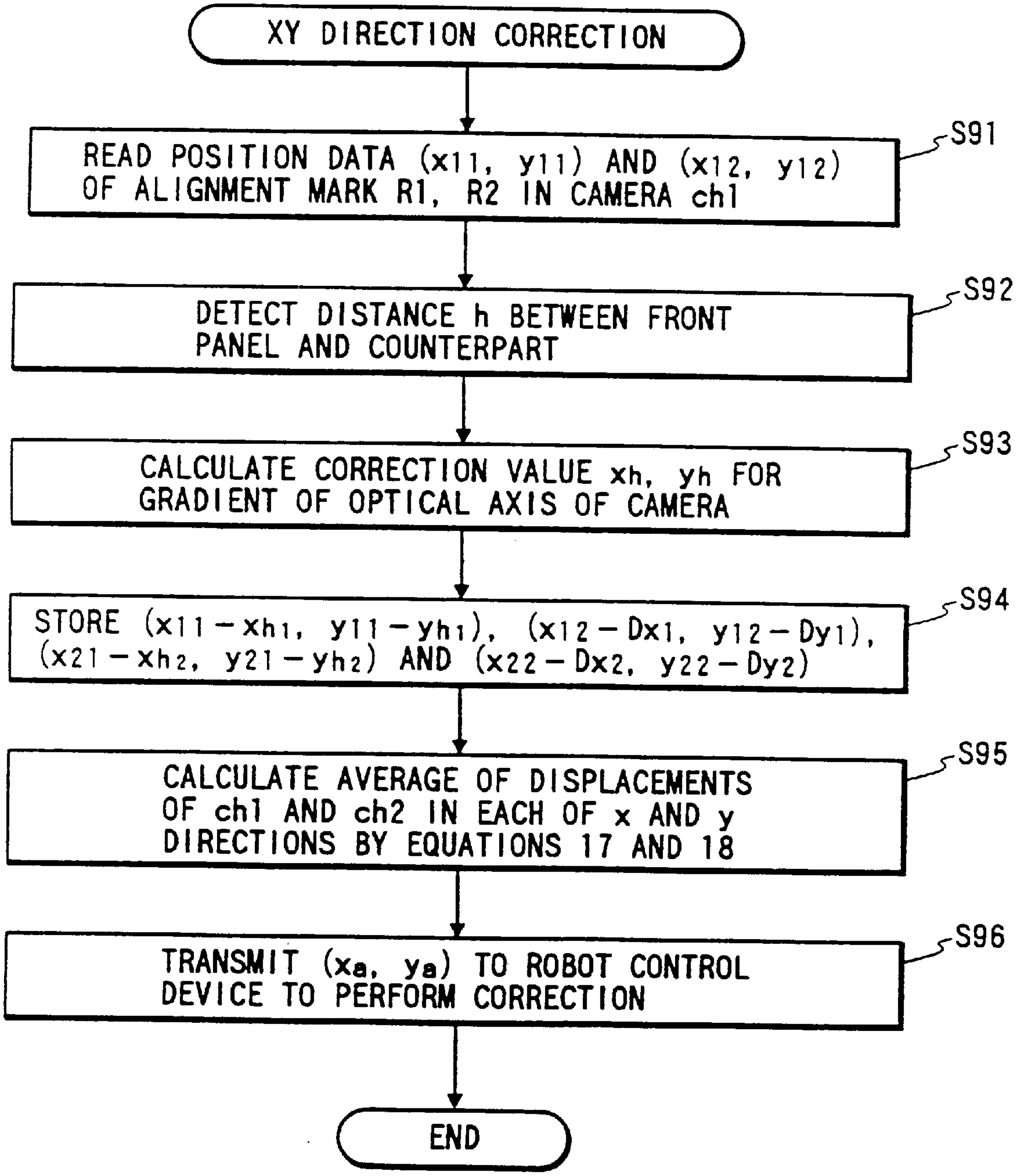
FIG. 31 is a flow chart for explaining the correction of X- and Y-components.

The correction of the X- and Y-components of the position displacement amount will be explained below. FIG. 31 is a flow chart associated with the correction of the X- and Y-components.

Step S91: In channel ch1, the positions $(X_{11}, Y_{11})$ and $(X_{12}, Y_{12})$ of the two alignment marks R1 and R2, which are registered in advance, are detected. These data are obtained until step S52 in FIG. 26B.

Step S92: The distance h between the glass-face plate 2 and the member (spacer jig 68 or rear plate) attached to the lower heating plate 26 is detected.

Step S93: The correction values $X_h$ and $Y_h$ for the gradient of the optical axis of the camera are calculated using equations (14) above.

Step S94: Values $(X_{11}-X_{h1}, Y_{11}-Y_{h1})$ obtained by subtracting the correction values for the gradient of the optical axis of the camera from the position data detected in advance of the mark R1 are stored, and values $(X_{12}-D_{X1}, Y_{12}-D_{Y1})$ obtained by subtracting the angle-corrected values corresponding to the initial displacement amount from the position data of the mark R2 are stored. Similarly, in camera ch2 as well, the positions $(X_{21}, Y_{21})$ and $(X_{22}, Y_{22})$ of the two alignment marks R1 and R2 are obtained. As in channel ch1, values $(X_{21}-X_{h2}, Y_{21}-Y_{h2})$ obtained by subtracting the correction values for the gradient of the optical axis of the camera from the data of the mark R1 are stored, and values $(X_{22}-D_{X2}, Y_{22}-D_{Y2})$ obtained by subtracting the angle-corrected values corresponding to the initial displacement amount from the position data of the mark R2 are stored.

Step S95: Differences (X1, Y1) and (X2, Y2) between the marks R1 and R2 in identical channels are calculated from the stored position data, and the averages of the X- and Y-components of the displacement amount are calculated using the following equations (29) and (30):

$$\begin{aligned} Xa &= (X1 + X2)/2 \\ &= (((X_{12} - D_{X1}) - (X_{11} - X_{h1})) + ((X_{22} - D_{X2}) - (X_{21} - X_{h2})))/2 \end{aligned} \quad (29)$$

$$\begin{aligned} Ya &= (Y1 + Y2)/2 \\ &= (((Y_{12} - D_{Y1}) - (Y_{11} - Y_{h1})) + ((Y_{22} - D_{Y2}) - (Y_{21} - Y_{h2})))/2 \end{aligned} \quad (30)$$

Step S96: The obtained data are checked in the same manner as in the above correction, and are then supplied to the NC controller 92 via the serial transmission line. Upon reception of these data, the NC controller 92 concurrently moves the XYθ table 28 in the X- and Y-directions. After this correction, the next target position need not be changed. Thereafter, the flow advances to step S54 in FIG. 26B.

In this embodiment, the positions of the alignment marks R1 and R2 are detected based on image correlation with the patterns of the marks, which are registered in advance. However, the present invention is not limited to this specific method. For example, when the above-mentioned detection range is considered as a binarization barycentric position calculation target range, the positions of the alignment marks may be detected by calculating the barycentric position. In this case, checking for detection errors can be performed by comparing the area of the binarized object with a value registered in advance in units of alignment marks.

In calculating the mark position displacement coefficients upon an increase in work temperature, the average of coefficients obtained by a predetermined number of previous sampling operations may be calculated to prevent an abrupt displacement.

When the glass-face plate and the division holding members (or rear plate) can be set at positions where the CCD cameras can sense the alignment marks, steps 5 to 7 need not always be performed.

Step 8

When the temperature sensor built in each heating plate detects the set temperature of 450° as a result of the heating operation, the temperature controller 32 adjusts the temperature so that it falls within the range of 450° C.±5° C. in accordance with the detection signal from the sensor.

Step 9

The operation of the Z-axis air cylinder 40*d* is canceled in response to the set temperature signal in step 8 so as to unlock the driving bar. Consequently, the up-down table 18 is set in the free state.

Step 10

When the up-down table 18 is set in the free state in step 9, the up-down table 18 begins to fall owing to the weight 14*g* set on the table and having a weight of 20 kg.

Step 11

When the up-down table 18 falls, the upper heating plate 20 falls together, and compresses in the direction of the interval between the heating plates, i.e., applies the compression force, so that the glass-face plate 2 and the upper surface portions of the spacers held by the jig 68 on the lower heating plate 26 are brought into contact with each other.

Step 12

The lower end position of the upper heating plate 20 is detected by the encoder E1 for Z-axis position alignment, which is connected to the Z-axis motor M1, and the driving operation of the motor M1 is stopped at the contact position. When the glass-face plate 2 contacts the spacers 4, the heating temperature is controlled by the temperature controller 32 to fall within the range of 450° C.±5° C.

The melting point of the frit glass 70 which is applied to the glass-face plate 2 and serves as an adhesive (bonding agent) is 450° C., and the frit glass serves as an adhesive between the glass-face plate 2 and the spacers 4 during the cooling process (to be described later) when the temperature is controlled to fall within pertinent range.

Step 13

The counter in the NC controller 92 measures the time from the contact start time between the glass-face plate 2 and the spacers 4 detected by the encoder E1. After an elapse of a predetermined period of time (10 sec in this embodiment), the NC controller 92 supplies a cool signal to the temperature controller 32.

Step 14

When the temperatures of the heating plates 20 and 26 fall in step 13, the heating plates 20 and 26, the face plate, the jig 68, and the like shift from the expansion state to the shrinkage state as the temperature falls, and the respective members undergo dimensional changes accordingly. In view of this problem, in this embodiment, the above-mentioned position adjustment operation is executed during the cooling processing (especially, in the neighborhood of the semi-solidification temperature of frit glass (to be described later)). In this embodiment, the position adjustment operation is executed at time intervals of 30 sec from the beginning of the cooling process. Preferably, position alignment is performed from the softening point to the semi-solidification temperature so as to quickly attain position alignment.

Step 15

The cooling process continues while intermittently executing position adjustment operations for the θ-, Y-, and X-axes and the works are cooled to the semi-solidification temperature (410° C.) of the frit glass 70.

Note that the "semi-solidification state" in the present invention corresponds to the operation temperature range in which glass can be molded, and indicates the state having a viscosity falling within the range from $1.0\times10^4$ to $4.5\ 10^7$ poise. More specifically, in the bonding process of the spacers 4 and the glass-face plate 2, the semi-solidification state indicates the state wherein the positions of the spacers 4 and the glass-face plate 2 can be changed upon reception of a predetermined force in the solidification detection process (to be described later) without causing any destruction, deformation, or peeling.

On the other hand, the "solid state" indicates the state wherein the spacers 4 and the glass-face plate 2 are immovable or may be destroyed, deformed, or peeled upon reception of a predetermined force even if they can be moved, in the bonding process of the spacers 4 and the glass-face plate 2.

Step 16

When the semi-solidification temperature is detected based on the temperature sensors 125B in the heating plates 20 and 26, the control means 34 supplies a signal to the position control means 38 to issue an execution stop command of the position adjustment operation. In this embodiment, the solidification state is detected by the temperature sensors 125B. Alternatively, the solidification state may be detected by monitoring the torque or based on the displacement amount before and after correction. These methods will be described in detail below.

Figure 32A:
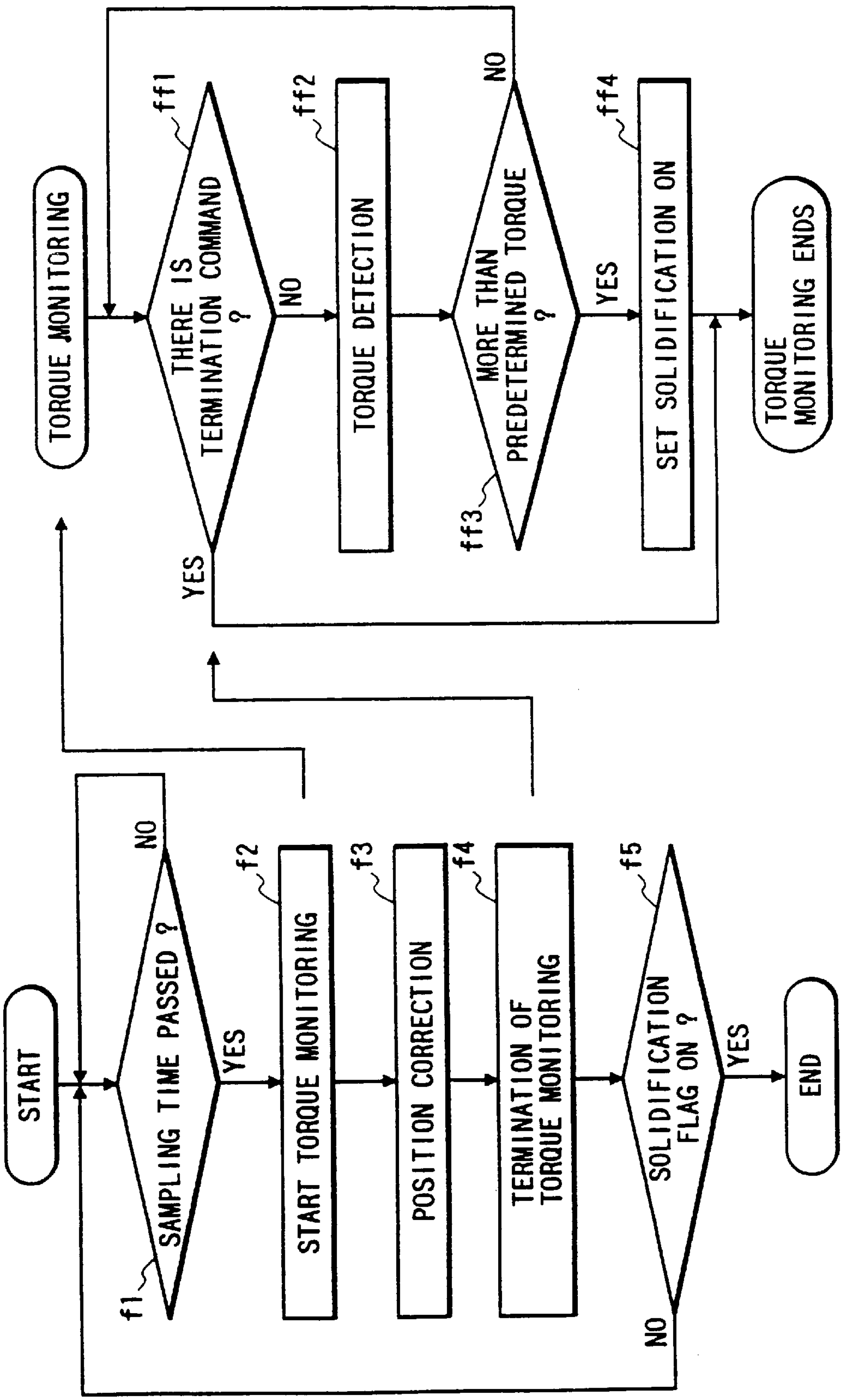

(1) Solidification State Detection By Monitoring Torque (See FIG. 32A)

The control waits until the sampling time (30 sec) passes. When the sampling time has passed (f1), the torque monitoring processing starts (f2). This torque monitoring processing is executed parallel to the main program that performs the position correction of the table. In the torque monitoring processing, torque detection continues (ff2) until a termination command is input (ff1) or until a torque equal to or more than a predetermined torque is detected (ff3). When the detected torque in each axis has exceeded the predetermined torque (ff3), a solidification flag is turned on, thus ending the torque monitoring processing (ff4).

On the other hand, the main program performs position correction based on the alignment mark once each in the rotation direction and the X- and Y-directions (f3). Thereafter, the control issues a monitoring termination command to the torque monitoring processing (f4).

Subsequently, the control checks the solidification flag set in the torque monitoring processing (f5). If the flag is OFF, the flow returns to step f1; otherwise, the flow advances to step 17.

In this case, the torque monitoring processing is performed using the position control means. Alternatively, an external force applying means may be arranged in addition to the position control means, and may apply a predetermined force to, e.g., the glass-face plate to detect the torque, thus also detecting the solidification state in the same manner as described above.

Figure 32B:
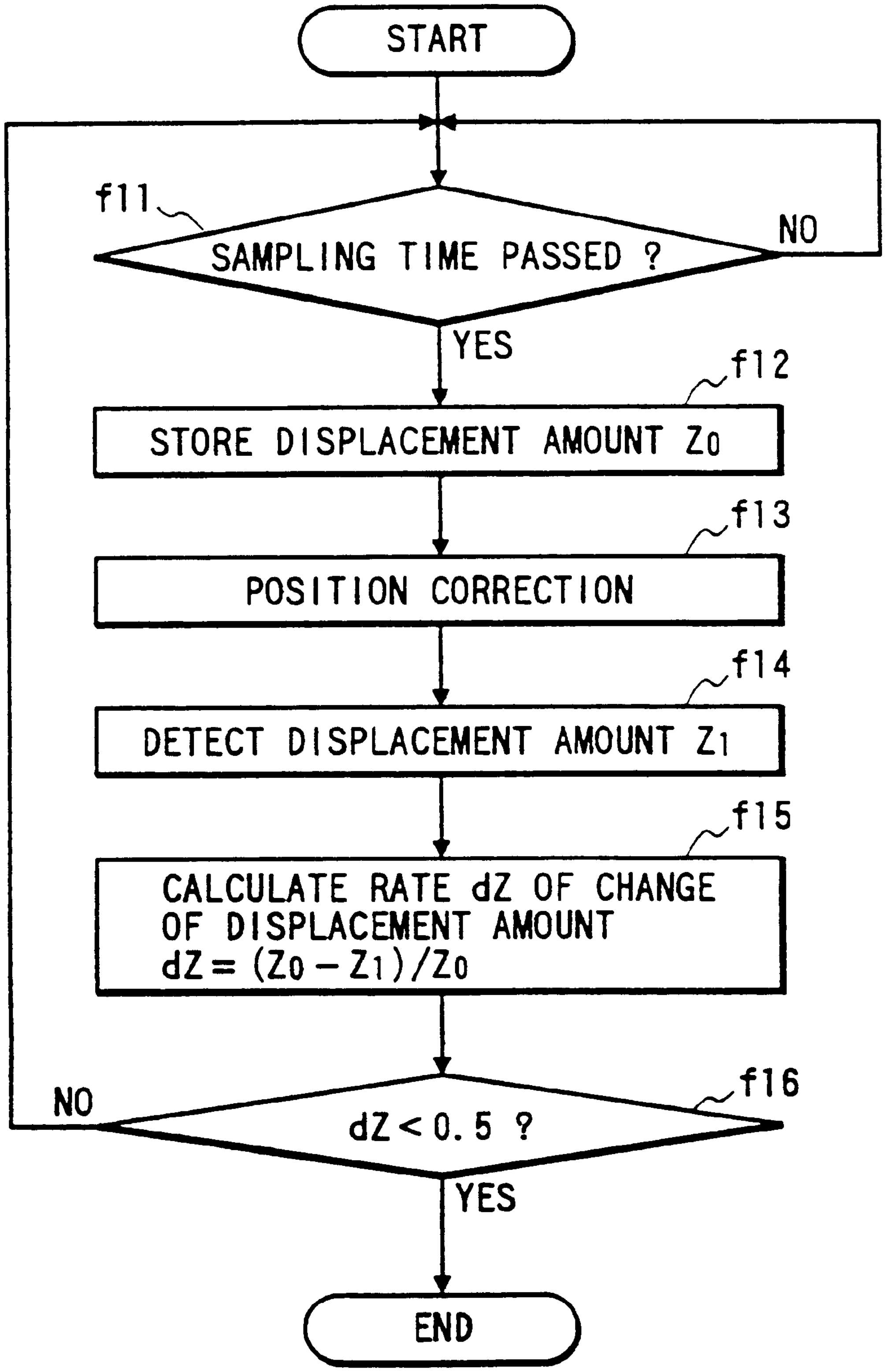

(2) Solidification State Detection Based on Displacement Amount Before and After Correction (See FIG. 32B)

After the sampling time has passed (f11), the current displacement amount $Z_0$ (before position correction) between the alignment marks formed on the two glass plates is calculated and stored (f12).

Subsequently, the position correction based on the alignment marks is performed each in the rotation direction and the X- and Y-directions (f13).

The displacement amount $Z_1$ between the alignment marks after the position correction is calculated (f14). The rate dZ of change of displacement amount is calculated based on the calculated displacement amounts $Z_0$ and $Z_1$ before and after the position correction (f15)

$$dZ=(Z_0-Z_1)/Z_0$$

If the calculated rate dZ is equal to or higher than a predetermined rate (e.g., 0.5), the flow returns to step f11; otherwise, the position adjustment ends, and the flow advances to step 17 (f16).

This detection utilizes the fact that a small ratio of the displacement amount after correction with respect to the displacement amount before correction means that the frit glass is nearly in the solid state, and hardly any position correction can be made.

Step 17

Furthermore, after step 16, an energization signal in the upward direction is supplied to the Z-axis motor M1 on the basis of the result of the detection operation of the solidification temperature, and the up-down table 18 is lifted by rotating the motor M1, so that the upper and lower heating plates 20 and 26 are separated from each other, thereby canceling the compressing force acting in the direction of the interval between the heating plates.

With this separating operation, the spacers 4 held by the jig 68 are released from the jig 68, and move upward together with the upward movement of the glass-face plate 2.

Step 18

Thereafter, the glass-face plate held by the holding means of the upper heating plate 20 is released.

In this state, the spacers 4 are fixed on the surface of the glass-face plate 2 in a substantially upright state.

Vibrating Means for Upper and Lower Heating Plates 20 and 26

Vibrating means 99A and 99B (FIG. 13) for the upper and lower heating plates 20 and 26 will be described below.

As an adhesive for adhering the glass-face plate 2 and the spacers 4 to each other in steps 1 to 18 above, a frit glass adhesive is used. For this reason, the glass-face plate 2 and the spacer 4 may shift relative to each other owing to expansion of the respective members upon temperature rise until the softened frit glass is solidified. No problem is posed if this shift state is uniform on the entire surface.

Figure 33A:
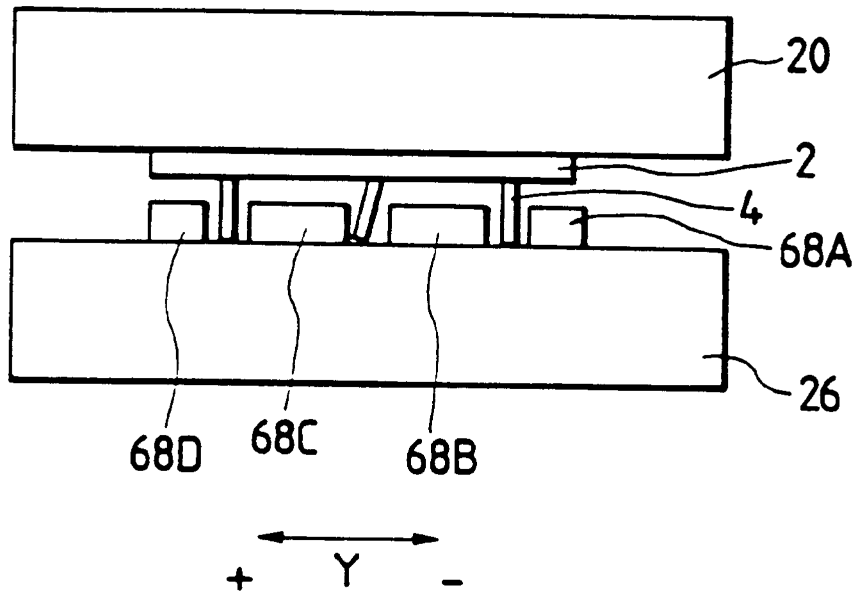
FIGS. 33A and 33B are views for explaining the drawback upon assembling the glass plates and projecting members.
Figure 33B:
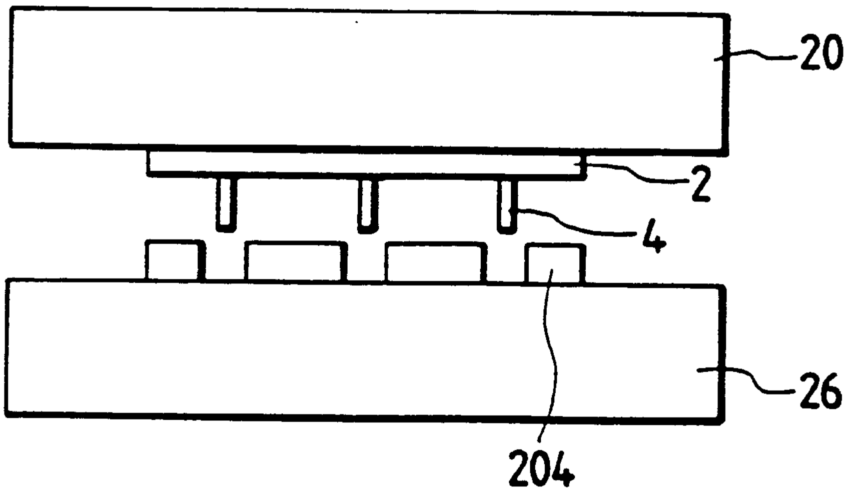

However, when the spacers 4 are fixed to the glass-face plate 2 in a state wherein the spacers 4 are not accurately translated with respect to the glass-face plate 2 due to the thermal expansion effect, e.g., the spacers 4 are fixed in the tilt state as shown in FIG. 33A, since the spacers 4 are supported by the jig 68, they are kept caught by the jig 68 during the separating operation of the heating plates 20 and 26, and may be damaged.

The vibrating means 99A and 99B offer a countermeasure against the above-mentioned problem.

Referring to FIG. 13, in order to smoothly remove the spacers 4 from the jig 68, the vibrating means 99A and 99B for vibrating the upper and lower heating plates 20 and 26 are arranged, and a controller 99C for the vibrating means 99A and 99B is arranged in the NC controller 92.

These devices and method will be explained below.

The heating process of the heating plates in steps 1 to 15 is the same as that described above. When a predetermined temperature (410° C.) of the heaters built in the heating plates is detected by the sensor in step 15, the NC controller 92 supplies a vibration start signal to the vibration controller 99C in response to the detection signal, and hence, the upper and lower heating plates 20 and 26 receive vibrations of 1 to 10 Hz.

Upon reception of the vibrations, the glass-face plate 2 and the spacers 4 also receive vibrations, and are translated. This translation is smooth since it occurs in the semi-solidification state of the adhesive at the above-mentioned temperature.

The vibrating operation is executed for a predetermined period of time (10 sec) or while the temperature of the upper and lower heating plates 20 and 26 is 410°0 C.

After the posture of the spacers 4 is corrected by executing the vibrating operation, the separating operations of the glass-face plate 2 and the spacers 4 are executed subsequently.

Problems Caused by Separating Operation

The softening temperature of the frit glass used as an adhesive in this embodiment is 450° C., and the adhesive sufficiently solidifies when its temperature becomes equal to or lower than 410° C. or after an elapse of a sufficiently long period of time. However, if the up-down table 18 is abruptly moved upward to the ejection position of the product immediately thereafter, atmospheric cold air around the upper and lower heating plates 20 and 26 flows into the surrounding portion, and rapidly cools the jig 68, face plate, spacers, etc., thus thermally damaging equipments.

In order to solve this problem, the lifting process of the up-down table 18 is executed in a plurality of steps. In the initial lifting step, the up-down table 18 is temporarily stopped when the spacers 4 are separated from the jig 68 by about 1 mm. In this state, the control waits a decrease in temperature, and thereafter, the table 18 is lifted to the predetermined ejection position at room temperature (20 to 45° C.). By modifying the lifting process, the productivity in this apparatus can be improved.

Assembling of Glass-face plate and Glass-rear Plate

The assembling process of the glass-face plate 2 and the glass-rear plate 1 will be explained below. When no spacers are used, the assembling process of the glass-face plate and the glass-rear plate does not require steps 1 to 18. In this case, the process to be described below directly applies except for the description associated with the spacers.

Initialization

First, initialization is performed as follows.

(1) The downward load of the up-down table 18 is set to be 0 due to the presence of the counterweight 14*g*, the weight 14*g* is set on the up-down table 18 as a load required for fusion-bonding the glass-face plate 2, the outer frame 272, and the glass-rear plate 1. In this case, the weight 14*g* is about 20 kg.

(2) The up-down table 18 is moved to its upper end position, and the cylinder rod 40*h* of the Z-axis air cylinder 40*d* is pushed out.

(3) Plate press pieces of the upper and lower heating plates 20 and 26 are held in a state wherein their ceramic springs are contracted (not shown).

(4) The X-, Y-, and θ-axis air cylinders are set in a state wherein their cylinder rods are pushed out.

(5) The XYθ table 28 is moved to the position where the through holes 20*a* and 20*b* of the upper heating plate 20 overlap the through holes 26*a* and 26*b* of the lower heating plate 26.

(6) By adjusting the directions of the camera columns 62*a*, the CCD cameras 36A and 36B are located at the positions of the through holes 20*a* and 20*b* of the upper heating plate 20 and the through holes 26*a* and 26*b* of the lower heating plate 26. Cooling air is supplied to the camera covers 85 that house the CCD cameras 36A and 36B, and the heights of the camera attachment plates 62*b* are adjusted, so that the cameras can be focused on the alignment marks.

(7) The control program is stored in the NC controller 92, and the image processing algorithm for detecting the images of the alignment marks and controlling the two glass plates (face plate and rear plate) to have a predetermined positional relationship therebetween is stored in the image processing controller 80. Also, the temperature adjustment program for the upper and lower heating plates 20 and 26 is stored in the temperature controller 91.

(8) Low-melting point amorphous frit glass (LS-3081; available from Nippon Electric Glass Co., Ltd.; melting point=410° C.) is applied as an adhesive to the surfaces, to be bonded with the glass-face plate 2 and the glass-rear plate 1, of the outer frame 272, and are pre-baked in advance. Also, the low-melting point frit glass may be applied to the bonding surface of the spacers attached substantially upright on the glass-face plate or surface of the glass-rear plate.

Figure 34:
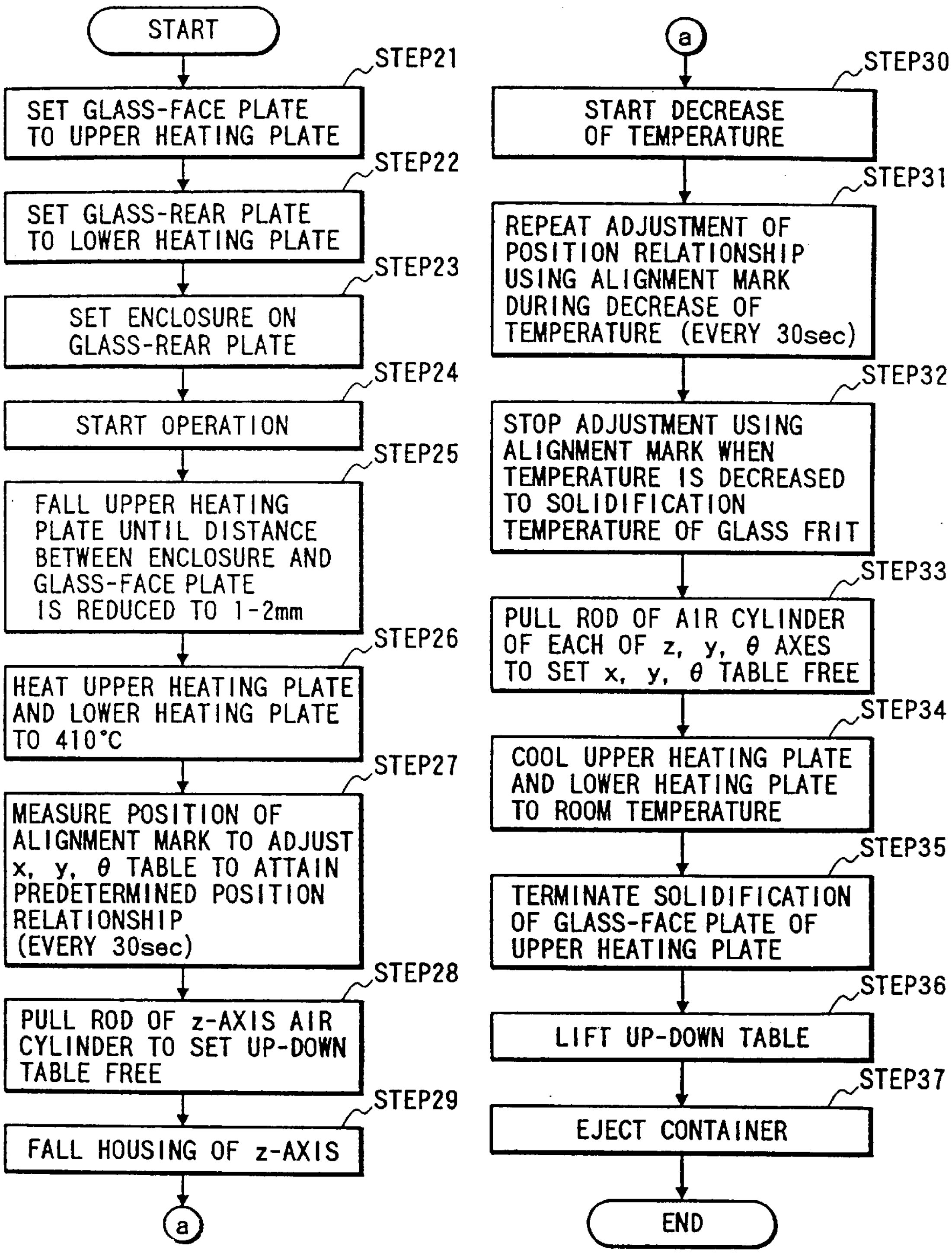
FIG. 34 is a flow chart showing an embodiment of the operation procedure upon assembling a glass-face plate and a glass-rear plate.

Upon completion of the above-mentioned initialization, the assembling process of the image display apparatus is started in accordance with the flow chart shown in FIG. 34. Note that the initialization has been exemplified in association with a case wherein the glass-face plate 2 to which the spacers 4 are fixed and the glass-rear plate 1 are to be assembled. However, when this process is executed after the process of fixing the spacers 4 to the glass-face plate 2, since the upper heating plate 20 already holds the glass-face plate 2 to which the spacers 4 are fixed, the glass-rear plate 1 need only be attached to the lower heating plate 26. In this case, the control programs are also already stored.

Step 21

The glass-face plate 2 is attached to the upper heating plate 20 via the plate chucks 60, and is biased against plate stopper pieces 46*a*, 46*b*, 46*c*, and 46*d* using plate press pieces 46*e*, 46*f*, 46*k* and 46*l*. As described above, when this assembling process is executed after the process of fixing the spacers 4 to the glass-face plate 2, since the glass-face plate 2 to which the spacers 4 are fixed has already been held on the upper heating plate 20, step 21 can be omitted.

Step 22

On the other hand, the glass-rear plate 1 is set on the lower heating plate 26, and is biased against plate stopper pieces 243 using plate press pieces 244 as in the holding mechanism of the upper heating plate 20.

Step 23

An outer frame 272 is set at the predetermined position on the glass-rear plate 1.

Step 24

Upon completion of the setting operations of the glass-face plate 2, the glass-rear plate 1, and the outer frame 272, the instruction personal computer 93 transmits a control start command to the NC controller 92, which starts the processing in accordance with the control program.

Step 25

Figure 35:
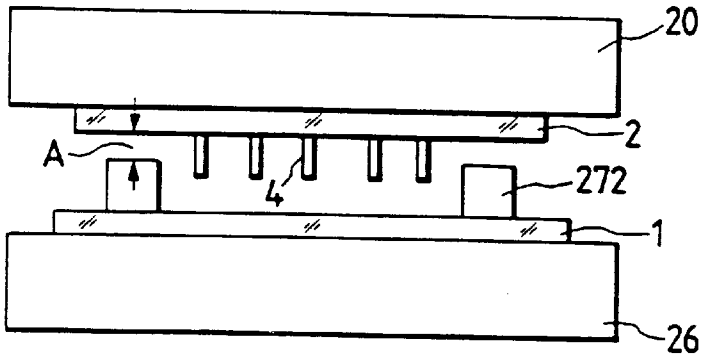
FIG. 35 is a side view showing the principal part of the positional relationship between the upper and lower heating plates shown in FIG. 1 before the temperature rise.

The NC controller 92 moves the up-down table 18 downward, and stops it to assure a gap A (0.5 mm to 2 mm) between the lower surface (opposing the glass-rear plate) of the glass-face plate 2 and the upper surface of the outer frame 272, as shown in FIG. 35.

Step 26

The NC controller 92 starts the operation of the temperature controller 91. The temperature controller 32 heats the upper and lower heating plates 20 and 26 to 410° C. at a gradient of 10° C./min. When the temperature of the upper and lower heating plates 20 and 26 has reached 410° C., the controller 32 maintains this temperature for 30 min.

Figure 36:
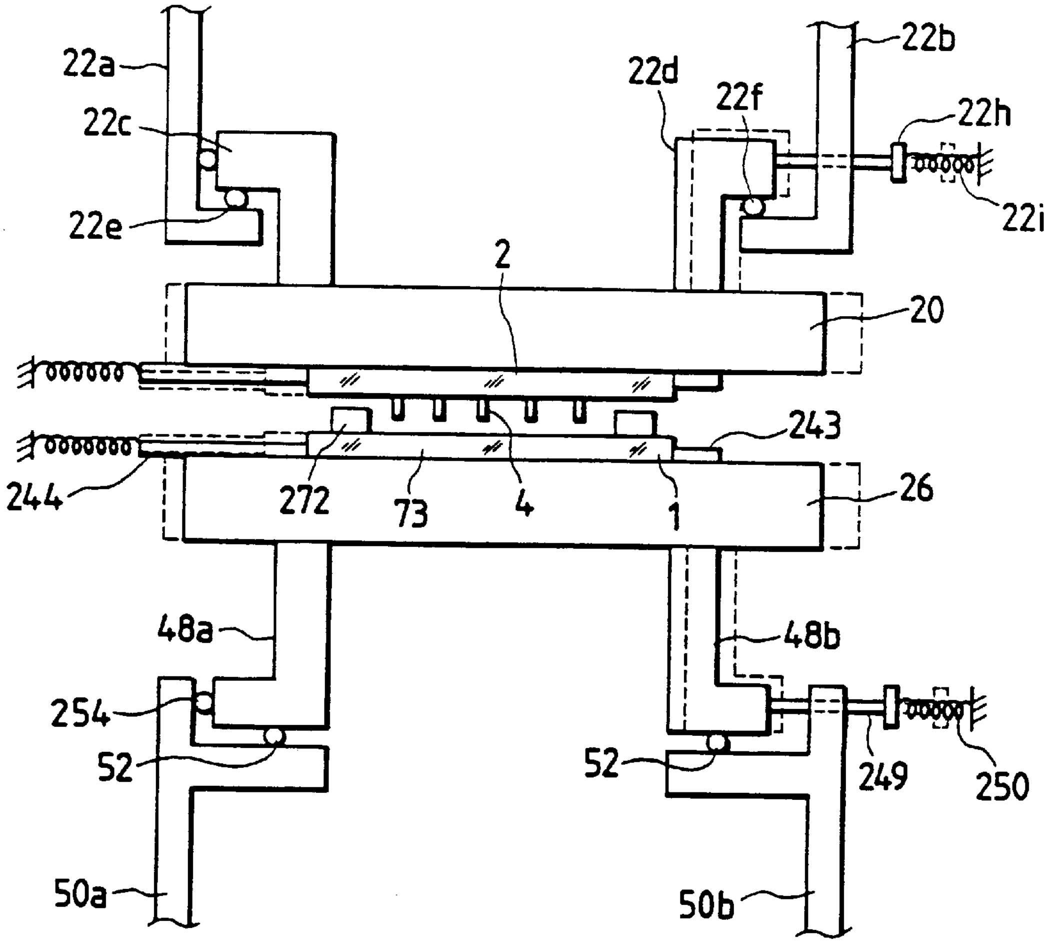
FIG. 36 is a side plate showing the state wherein the upper and lower heating plates shown in FIG. 2 underwent thermal expansion.

Since the upper and lower heating plates 20 and 26 consist of aluminum or stainless steel, they undergo thermal expansion at a thermal expansion rate of about $200\times10^{-7}$ mm/°C. For example, if the length of one side of each of the upper and lower heating plates 20 and 26 is 500 mm, an expansion of 3.90 mm (=500 mm×$200\times10^{-7}$×(410° C. −20° C.)) takes place at 410° C. with respect to room temperature (20°0 C.). FIG. 36 shows this state. FIG. 36 is a side view showing the state wherein the upper and lower heating plates 20 and 26 shown in FIG. 2 have caused thermal expansion.

As shown in FIG. 36, since one support metal member 48*b* provided with an stopper ball 254 is always biased toward the column support member 50*a* side by an stopper pin 249, its position remains the same even when the temperature rises and the lower heating plate 26 has caused thermal expansion. However, the other support metal member 48*b* that opposes the stopper ball 254 moves to a position indicated by a broken line in FIG. 36 as a result of expansion of the lower heating plate 26 while being biased by the stopper pin 249. Likewise, the heating plate suspension metal member 22*d* also moves to a position indicated by a broken line in FIG. 36 due to thermal expansion of the upper heating plate 20. Since similar mechanisms are also arranged on the side surface separated by 90° from that shown in FIG. 36, even when the upper and lower heating plates 20 and 26 have caused thermal expansion, the expansion components are absorbed in all the directions. Note that ceramic balls 22*e*, 22*f*, and 52 shield heat from the upper and lower heating plates 20 and 26 (they hardly conduct heat since they are in point-contact with the plates), and are liable to slip with respect to any movement caused by thermal expansion.

Similarly, the glass-face plate 2, the outer frame 272, and the glass-rear plate 1, which consist of soda-lime glass, also experience thermal expansion upon temperature rise of the upper and lower heating plates 20 and 26. For example, if the length of one side of each of the glass-face plate 2 and the glass-rear plate 1 is 300 mm, an expansion of 0.95 mm (=300 mm×$81\times10^{-7}$×(410° C. −20° C.)) takes place. However, since the glass-face plate 2 and the glass-rear plate 1 are also biased by plate press pieces like in the upper and lower heating plates 20 and 26, even when the glass-face plate 2 and the glass-rear plate 1 have expanded, the plate press pieces move accordingly. Therefore, the thermal expansion of the glass-face plate 2 and the glass-rear plate 1 can be absorbed, thus preventing damage inflicted by thermal stress.

Furthermore, since the gap A of 0.5 mm to 2 mm is assured between the glass-face plate 20 and the outer frame 272, as shown in FIG. 35, the thermal expansion, in the vertical direction, of the upper and lower heating plates 20 and 26 is also absorbed by the gap A, and the glass-face plate 2 does not contact the outer frame 272. As the gap A is smaller, the glass-face plate 2, the glass-rear plate 1, and the outer frame 272 can be uniformly heated. The above-mentioned mechanism exhibits a similar effect with respect to thermal shrinkage of the upper and lower heating plates 20 and 26, the glass-face plate 2, the outer frame 272, and the glass-rear plate 1 when the temperature falls.

As shown in the flow chart of FIG. 34, after the temperature of the upper and lower heating plates 20 and 26 has reached 410° C. and 30 min have passed in step 26, the NC controller 92 waits for an elapse of another 15 min, and then executes step 27. The reason why the control waits for 15 min at 410° C. is to make the temperatures of the glass-face plate 2, the outer frame 272, and the glass-rear plate 1 uniform.

Step 27

The positions of the alignment marks on the glass-face plate 2 and the glass-rear plate 1 are measured on the basis of the images obtained by the CCD cameras 36A and 36B, and the XYθ table 28 is moved, so that the positions of the alignment marks have a predetermined positional relationship therebetween. Thereafter, this alignment adjustment is executed at 30-sec intervals. A detailed description of the alignment adjustment will be omitted since the adjustment can be attained by replacing the jig 68 by the glass-rear plate 1 in the alignment adjustment between the glass-face plate 2 and the jig 68.

The NC controller 92 waits for still another 15 min after the end of step 27 (after the temperature is held at 410°0 C. for 30 min), and then starts step 28.

Step 28

Figure 37:
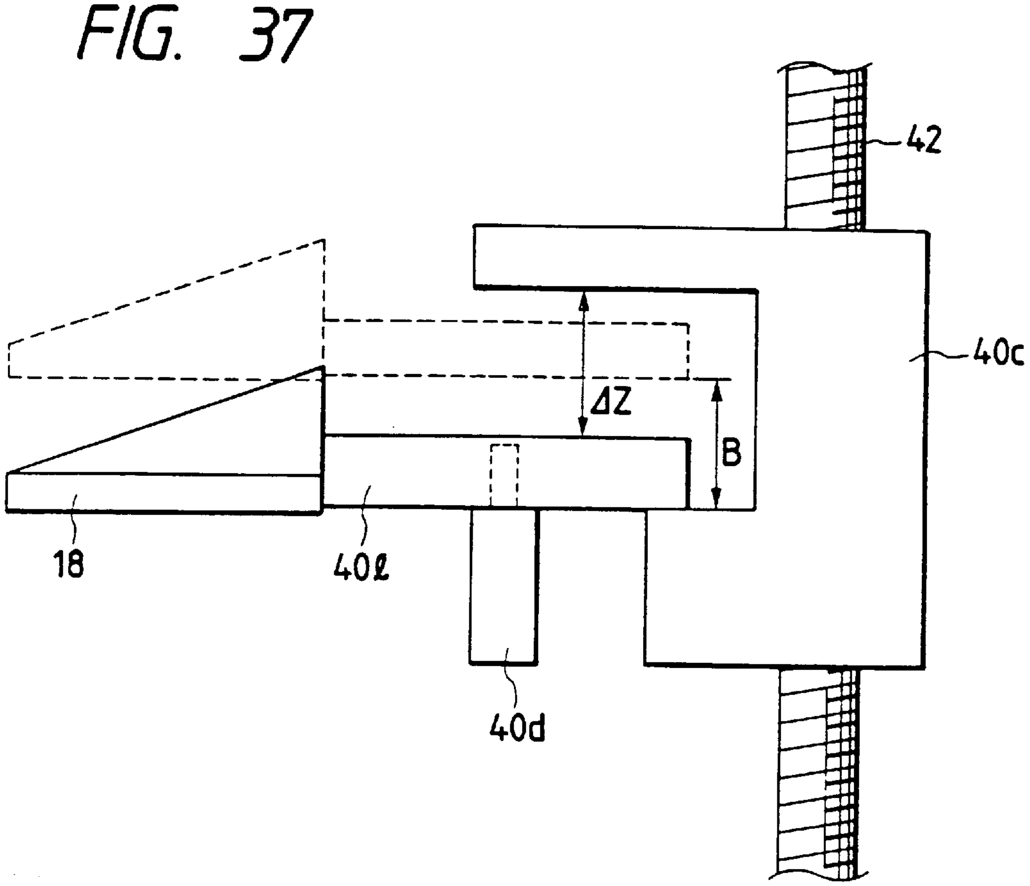
FIG. 37 is an enlarged side view showing the retracted state of a cylinder rod of a Z-axis air cylinder shown in FIG. 6.

The cylinder rod 40*h* of the Z-axis air cylinder 40*d* is retracted by pneumatic pressure to assure a gap between the housing 40*c* and the driving bar 40*e*, so that the driving bar 40*e* is free to move in the vertical direction. FIG. 37 shows this state. FIG. 37 is an enlarged side view showing the state wherein the cylinder rod of the Z-axis air cylinder shown in FIG. 6 is retracted. As shown in FIG. 6, when the cylinder rod 40*h* abuts against the housing 40*c*, the housing 40*c* and the driving bar 40*e* are integrated. On the other hand, when the cylinder rod 40*h* is retracted, the driving bar 40*e* is free to move within the range ΔZ in the vertical direction, as shown in FIG. 37.

Step 29

The Z-axis housing is moved downward while the driving bar 40*e* is in the free state. At this time, the downward movement of the up-down table 18 is stopped since the glass-face plate 20 attached to the upper heating plate 20 contacts the outer frame 272, and only the Z-axis housing 40*c* further falls. The NC controller 92 stops the downward movement of the Z-axis housing when the up-down table 18 and the driving bar 40*e* have moved to positions indicated by broken lines in FIG. 37 (a gap B shown in FIG. 37 is about 1 mm).

Since the weight 14*g* (20 kg) is placed on the up-down table 18, the 20 kg heavy load acts between the glass-face plate 2 and the glass-rear plate 1. With the load of the weight 14*g*, the glass-face plate 2, the outer frame 272, spacers 4, and the glass-rear plate 1 are in tight contact with each other without any gaps.

Step 30

After the glass-face plate 2, the outer frame 272, spacers 4, and the glass-rear plate 1 are in tight contact with each other in step 29, the temperature controller 32 starts the cooling process (10° C./min) of the heating plates.

Step 31

As has been described in step 27, since the alignment adjustment of the two glass plates is performed at 30-sec intervals, even when the alignment marks have been displaced due to shrinkage (of the upper and lower heating plates 20 and 26, the glass-face plate 2, the outer frame 272, and the glass-rear plate 1) upon cooling, their positions can be adjusted to the predetermined positional relationship.

Step 32

Since the low-melting point glass as an adhesive (bonding agent) begins to solidify as the temperature decreases and time passes, the above-mentioned alignment adjustment is stopped when the work temperature drops to 360° C. as the solidification temperature of the low-melting point glass. Since the solidification state of the low-melting point glass can be detected by the same method as described above, a detailed description thereof will be omitted.

Step 33

The cylinder rods of the X-, Y-, and θ-axis air cylinders are retracted by pneumatic pressure to set the respective axes in the free state, thus releasing the compression force acting on the glass-rear plate by the XYθ table. This is to prevent the glass-face plate 2 and the outer frame 272, the spacers 4 and the glass-rear plate 1, from being peeled from each other or damaged due to the shearing force acting in the horizontal direction since the glass-face plate 2 and the glass-rear plate 1 are attached to independent heating plates, when the glass-face plate 2, the outer frame 272, and glass-rear plate 1, which are bonded to each other, shrink at a temperature equal to or lower than 360° C.

Figure 38:
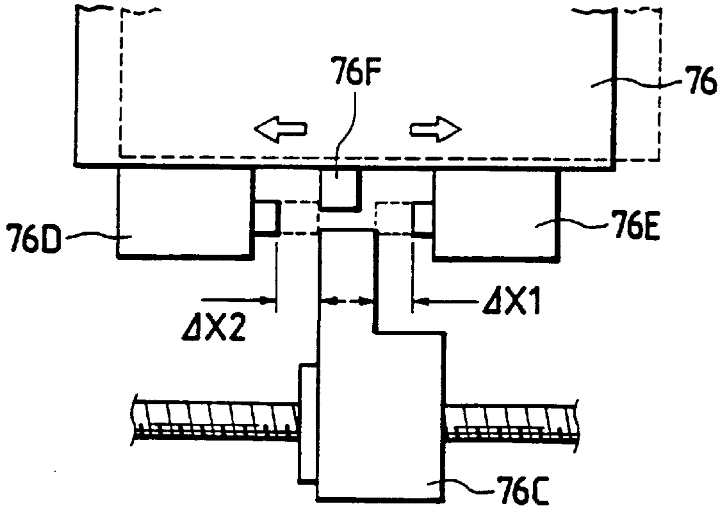
FIG. 38 is an enlarged plan view showing the attachment structure of an X-axis air cylinder to the XYθ table shown in FIG. 10.

FIG. 38 shows the state of such mechanism taking the X-axis as an example. FIG. 38 is an enlarged plan view showing the attachment structure of the X-axis air cylinder of the XYθ table 28 shown in FIG. 10. As shown in FIG. 10, in the state wherein the cylinder rods of the first and second X-axis air cylinders 76E and 76D are pushed out by pneumatic pressure, the X-axis table 76 and the X-axis flange 76C are integrated since the cylinder rods of the second and first air cylinders 76D and 76E sandwich the X-axis flange 76C therebetween. Furthermore, since the cylinder rod of the second X-axis air cylinder 76D contacts the stopper block 76F, the X-axis flange 76C and the X-axis table 76 maintain a predetermined positional relationship therebetween. The reason why the thrust of the second X-axis air cylinder 76D>the thrust of the first X-axis air cylinder 76E is set is that the cylinder rod of the second X-axis air cylinder 76D must always contact the stopper block 76F, and the X-axis table 76 and the X-axis flange 76C may deviate from the predetermined positional relationship if the cylinder rod of the second X-axis air cylinder 76D is pushed back by the thrust of the first X-axis air cylinder 76E. As shown in FIG. 38, when these cylinder rods are retracted, gaps Δx1 and Δx2 are respectively formed between the X-axis flange 76C and the cylinder rods, and the X-axis table 76 is free to move within the range of these gaps Δx1 and Δx2. In this apparatus, the gaps Δx1 and Δx2 are respectively set to be 10 mm. Since the same mechanisms are arranged in the Y- and θ-axes, the respective axes become free to move by the external force after the cylinder rods of the X-, Y-, and θ-axis air cylinders are retracted.

Step 34

As shown in the flow chart in FIG. 34, the upper and lower heating plates 20 and 26 are cooled from 360° C. to room temperature.

Step 35

The glass-face plate 2, the outer frame 272, spacers 4, and the glass-rear plate 1, which are cooled to room temperature, are integrated since they are fusion-bonded by the low-melting point amorphous glass. Therefore, the fixing state of the glass-face plate 2 using the plate chucks 60 and the plate press pieces 46*e*, 46*f*, 46*k*, and 46*l* is released.

Step 36

The up-down table 18 is returned to its upper end position.

Step 37

The fixing state of the glass-rear plate 1 is released, and the assembled product is ejected from the lower heating plate 26.

As described above, when the plates are seal-bonded using the low-melting point glass in the high-temperature state, the positions of the alignment marks pre-formed on the glass-face plate 2 and those of the alignment marks pre-formed on the glass-rear plate 1 are measured using the CCD cameras, and are adjusted to have a predetermined positional relationship therebetween, thereby preventing position displacement due to thermal expansion of the upper and lower heating plates 20 and 26, the glass-face plate 2, and the glass-rear plate 1.

While the upper and lower heating plates 20 and 26 are being cooled, the above-mentioned adjustment is repeated at predetermined time intervals until the low-melting point glass solidifies, thus preventing position displacement due to shrinkage of the upper and lower heating plates 20 and 26, the glass-face plate 2, and the glass-rear plate 1.

Furthermore, at a temperature equal to or lower than the solidification temperature of the low-melting point glass, the cylinder rods of the air cylinders that fix the XYθ table 28 to the driving shafts are retracted to set the XYθ table 28 to be free to move, thus preventing the spacers 4, the glass-face plate 2, the outer frame 272, the glass-rear plate 1, and their bonded portions from being damaged due to the stress upon thermal shrinkage of the upper and lower heating plates 20 and 26, the glass-face plate 2, and the glass-rear plate 1.

Another Embodiment of Assembling of Glass-face plate and Glass-rear plate

The above embodiment has exemplified the case wherein low-melting point amorphous glass is used as a fusion-bonding agent between the glass plates, the spacers, and outer frame. The low-melting point amorphous frit glass softens as the temperature rises, and solidifies as the temperature falls. On the other hand, as another example of the low-melting point frit glass, low-melting point crystalline glass may be used. Low-melting point crystalline glass (e.g., LS-7105, available from Nippon Electric Glass Co., Ltd.) softens and begins to solidify at 400° C., completely solidifies at 450° C., and maintains the solid state during the cooling process. This embodiment will exemplify a case wherein the low-melting point crystalline glass is used as an adhesive (bonding agent). In this embodiment, since only the control programs of the NC controller, the temperature controller, and the like are different from those in the above embodiment, and the apparatus arrangement is the same as that in the above embodiment, a detailed description thereof will be omitted.

Figure 39:
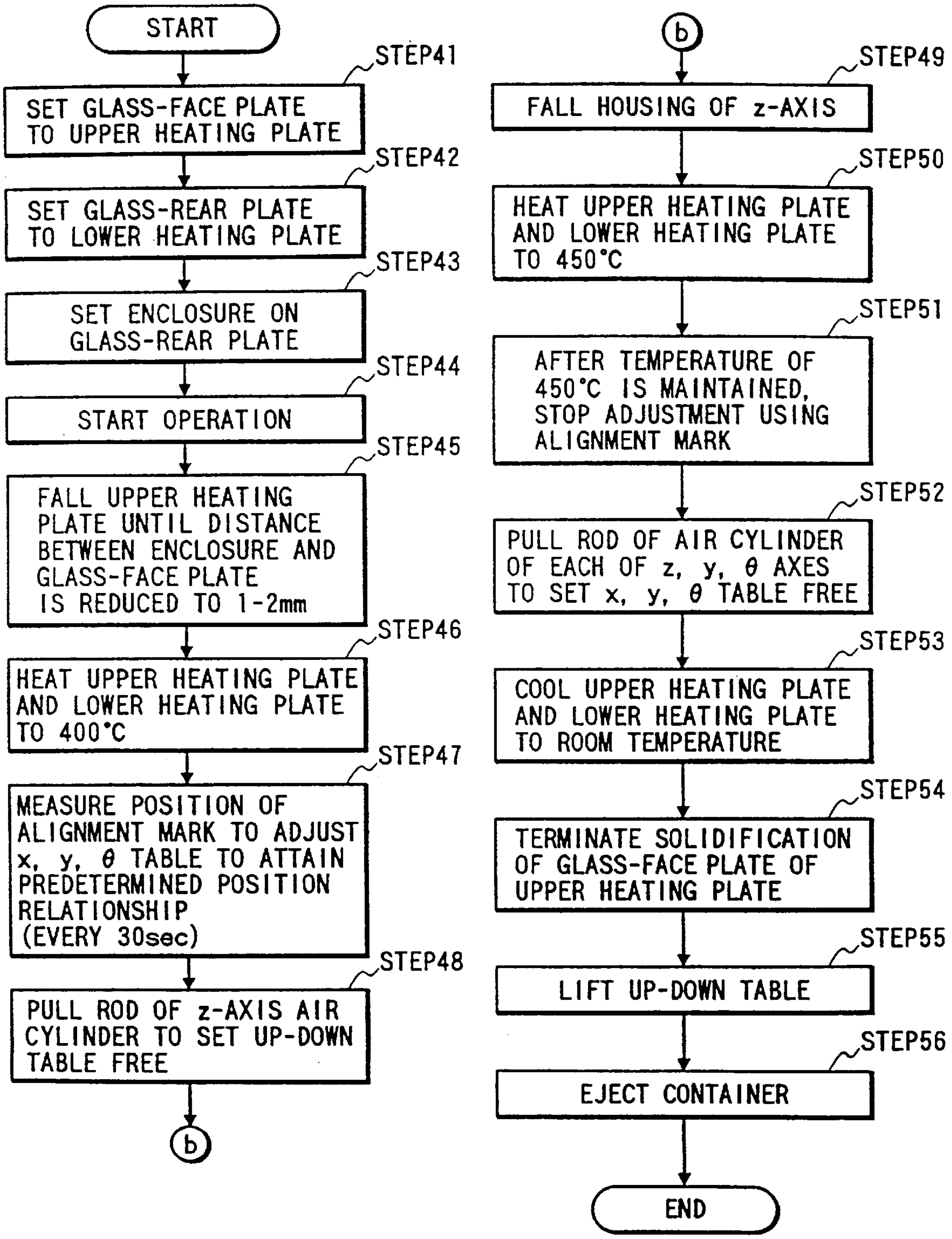
FIG. 39 is a flow chart showing another embodiment of the operation procedure upon assembling the glass-face plate and the glass-rear plate.

FIG. 39 is a flow chart showing the operation procedure of this embodiment.

Step 41

After the apparatus is initialized as in the above embodiment, the glass-face plate 2 to which the spacers 4 are bonded is attached to the upper heating plate 20, and the glass-face plate 2 is biased against the plate stopper pieces 46*a*, 46*b*, 46*c*, and 46*d* by the plate press pieces 46*e*, 46*f*, 46*k*, and 46*l*. In this embodiment as well, when the subsequent steps are to be executed after the process of bonding the spacers 4 to the glass-face plate 2, this step can be omitted.

Step 42

The glass-rear plate 1 is set on the lower heating plate 26, and is biased against the plate stopper pieces 243 by the plate press pieces 244.

Step 43

The outer frame 272 is set at the predetermined position on the glass-rear plate 1.

Step 44

Upon completion of the setting operations of the glass-face plate 2, the glass-rear plate 1, and the outer frame 272, the instruction personal computer 93 transmits a control start command to the NC controller 92, which starts the processing in accordance with the control program.

Step 45

The NC controller 92 moves the up-down table 18 downward, so that a gap of 0.5 mm to 2 mm is assured between the lower surface of the glass-face plate 2 and the upper surface of the outer frame 272.

Step 46

The operation of the temperature controller 32 is started in response to an instruction from the NC controller 92, and the temperature of the upper and lower heating plates 20 and 26 is raised to 400° C., i.e., the softening temperature of the low-melting point crystalline glass under the control of the temperature controller 32.

Step 47

After an elapse of a predetermined period of time from when the temperature has reached 400° C., the positions of the alignment marks on the glass-face plate 2 and the glass-rear plate 1 as in the above embodiment are measured, and are adjusted by the XYθ table 28 to attain a predetermined positional relationship, as in the above embodiment. Thereafter, this alignment adjustment is executed at 30-sec intervals. Since the alignment adjustment in this step is the same as that in the above embodiment, a detailed description thereof will be omitted.

Step 48

The cylinder rod 40*h* of the Z-axis air cylinder 40*d* is retracted by pneumatic pressure, thus setting the up-down table 18 in the freely movable state.

Step 49

The Z-axis housing is moved downward while the up-down table 18 is in the freely movable state, so that the glass-face plate 2, the outer frame 272, and the glass-rear plate 1 come into tight contact with each other.

Step 50

The temperature of the upper and lower heating plates 20 and 26 is further raised to 450° C. to solidify the low-melting point crystalline glass, while performing the alignment adjustment as in the above embodiment.

Step 51

The high-temperature state of 450° C. is maintained, and the alignment adjustment performed so far is stopped. Since the solidification state of the low-melting point glass can be detected in the same manner as in the above description, a detailed description thereof will be omitted.

Step 52

After the low-melting point crystalline glass completely solidifies, the cylinder rods of the X-, Y-, and θ-axis air cylinders are retracted by pneumatic pressure to set the respective axes in the free state, thus releasing the compression force, as in the above embodiment.

Step 53

The upper and lower heating plates 20 and 26 are cooled to room temperature.

Step 54

The glass-face plate 2, the outer frame 272, and the glass-rear plate 1, which are cooled to room temperature, are integrated since they are fusion-bonded by the low-melting point crystalline glass as an adhesive (bonding agent). Therefore, the fixing state of the glass-face plate is released.

Step 55

The up-down table 18 is returned to its upper end position.

Step 56

The fixing state of the glass-rear plate 1 is released, and the assembled product (chamber, enclosure) is ejected from the lower heating plate 26.

As described above, even when another low-melting point frit glass having different nature is used as the bonding agent, the same manufacturing apparatus can be used by changing only the contents of the control programs.

Still Another Embodiment

In the above-mentioned two embodiments, the alignment adjustment and the Z-axis downward movement are performed in the high-temperature state. Alternatively, the alignment adjustment and the Z-axis downward movement may be performed before heating, and the alignment adjustment may be performed during heating.

Figure 40:
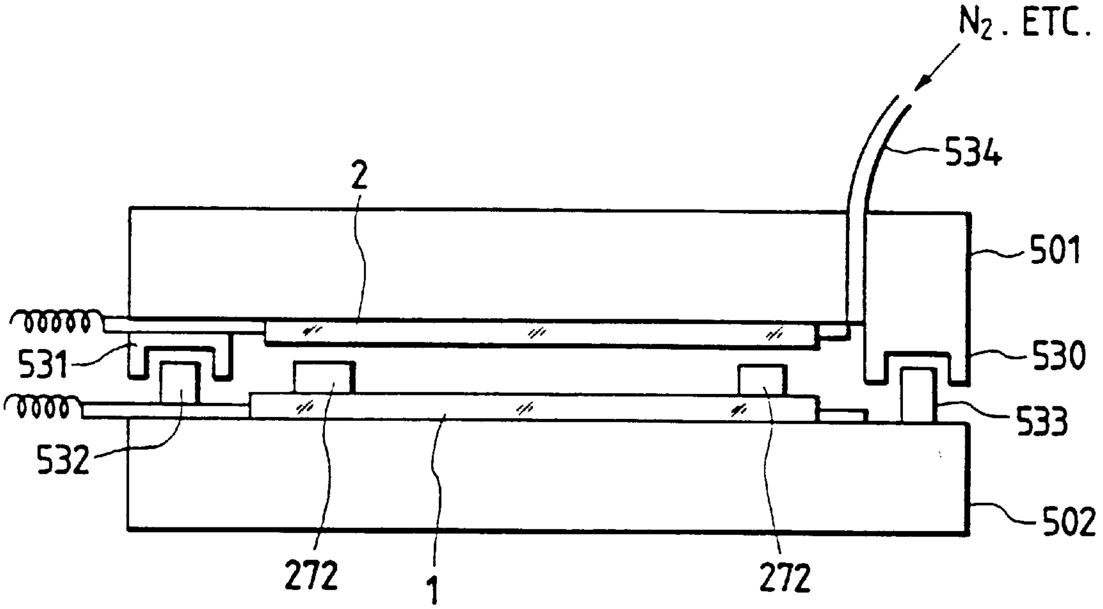
FIG. 40 is a side view showing still another embodiment upon assembling the glass-face plate and the glass-rear plate.

FIG. 40 is a side view showing the arrangement of still another embodiment.

Referring to FIG. 40, recessed walls 530 and 531, and a gas supply tube 534 are arranged on an upper heating plate 501 of this embodiment, and side walls 532 and 533 are arranged on a lower heating plate 502. Upon assembling an image display apparatus, heating is performed while the side walls 532 and 533 of the lower heating plate 502 are fitted onto recesses of the recessed walls 530 and 531 of the upper heating plate 501, and nitrogen gas or the like is supplied from the gas supply tube 534 during heating, unlike in the above embodiments. Other arrangements and the manufacturing method are the same as those in the above embodiments, and a detailed description thereof will be omitted.

The light-emitting members on the glass-face plate 2, the electron-emitting device on the glass-rear plate 1, and the like may cause various chemical reactions and deteriorate when they are exposed to the high-temperature during the fusion-bonding (adhesion) process. In view of this problem, the glass-face plate 2, the outer frame 272, and the glass-rear plate 1 are enclosed by the recessed walls 530 and 531, and the side walls 532 and 533, and a chemically stable gas such as nitrogen gas is supplied to the closed space, thereby preventing deterioration caused by chemical reactions. The gas to be supplied at that time must be temperature controlled as in the upper and lower heating plates 501 and 502.

Assembling Apparatus and Method Taking Mass-production of Proposed Image Display Apparatus into Consideration As described above, when the glass-face plate 2 and the spacers 4 are assembled, and this assembly is assembled with the glass-rear plate 1 and the outer frame 272, the proposed image display apparatus can be manufactured. However, a combination of the heating process from room temperature to the melting point of the adhesive (frit glass) or the cooling process to room temperature with the assembling apparatus is not effective in terms of the manufacturing time when mass-production is taken into consideration. In order to improve the tact (which means operation time per unit process) of the manufacturing process and mass-productivity, the heating and cooling processes which are not associated with the bonding process should be performed independently. The method and apparatus, which take mass-production into consideration, will be described in detail below.

Before the detailed description of the method and apparatus, which take mass-production into consideration, the temperatures in the respective processes will be explained below with reference to FIGS. 41, 42A, 42B and 42C.

Figure 41:
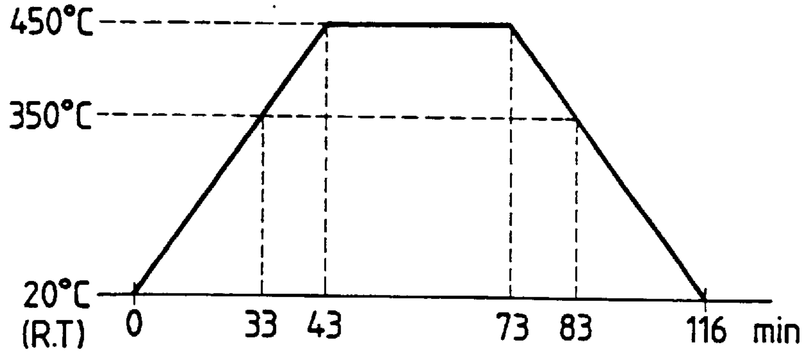
FIG. 41 is a graph showing the temperature profile of the respective processes in the apparatus of the embodiment of the present invention.

FIG. 41 shows the temperature profile in the above-mentioned apparatus. In the above-mentioned apparatus, since the works are heated at the temperature gradient of 10° C./min, the heating process (from room temperature (20° C.) to 450° C.) requires 43 min, the bonding process (maintained at 450° C.) requires 30 min, and the cooling process (from 450° C. to room temperature) requires 43 min, i.e., a total of 116 min are required.

Figure 42A:
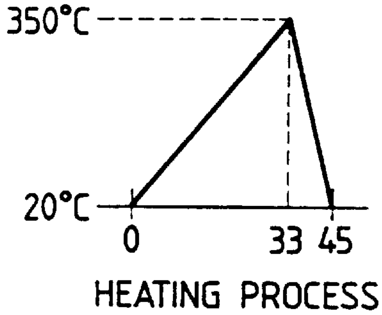
FIGS. 42A, 42B and 42C are graphs respectively showing the temperature profiles in the heating, bonding, and cooling processes.
Figure 42B:
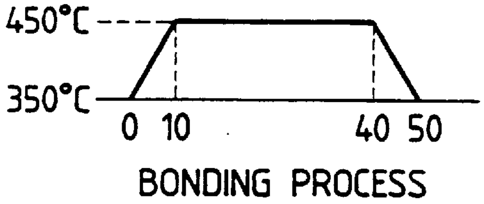
Figure 42C:
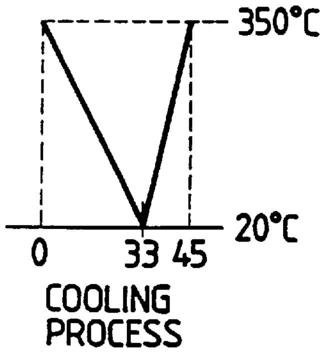

In this method, as shown in FIGS. 42A, 42B and 42C, the heating, bonding, and cooling processes are executed by different apparatuses. By adopting such divided processes, processes having the temperature profiles shown in FIGS. 42A, 42B and 42C can be realized. More specifically, the heating process heats the glass plates from room temperature (20° C.) to 350° C., and thereafter, transfers the glass plates that have reached 350° C. to the above-mentioned assembling apparatus. The assembling apparatus heats the glass plates from 350° to 450° C., performs bonding while holding the glass plates at 450° C., and cools the glass plates from 450° C. to 350° C. Thereafter, the glass plates are transferred to the cooling process, and are cooled from 350° C. to room temperature.

The time required for the bonding process in the above-mentioned assembling apparatus is 50 min, as shown in FIG. 42B. Hence, since the heating process heats the works in 33 min, 50-min tact can be realized when a heating apparatus (to be described later) is cooled to room temperature in 12 min and a cooling apparatus (to be described later) is heated to 350° C. in 12 min.

Figure 43A:
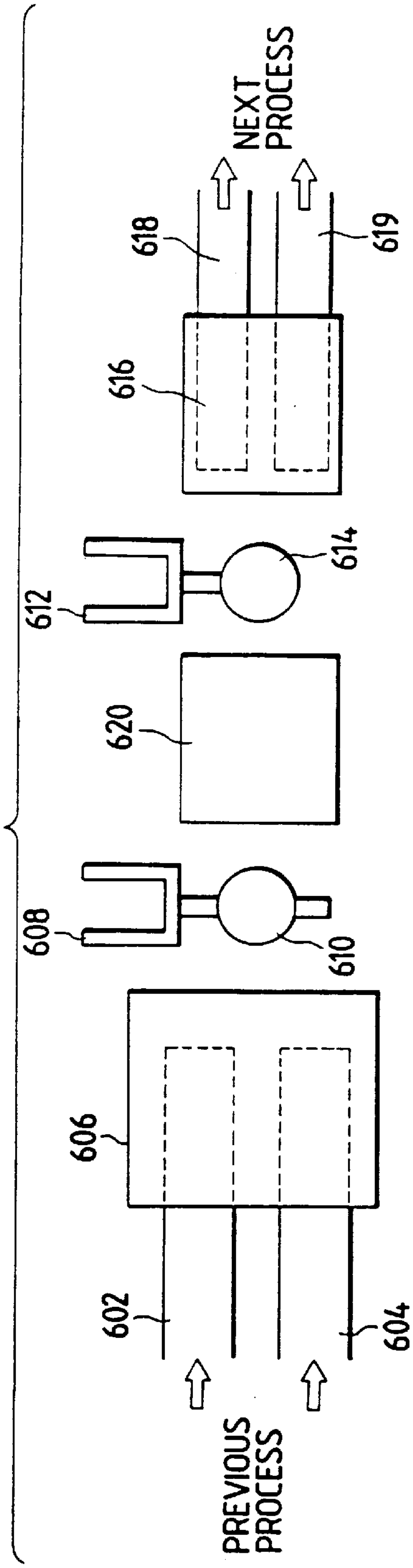
FIGS. 43A and 43B are respectively a plan view and a side view showing the arrangement of an assembling system that takes mass production into consideration.
Figure 43B:
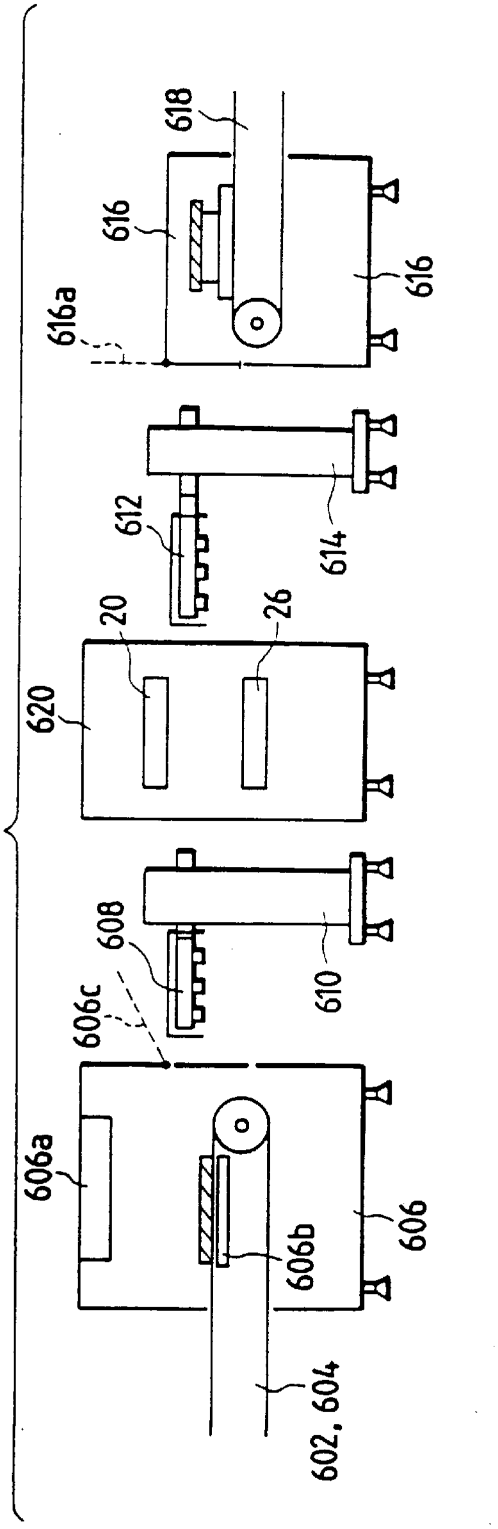

The assembling system that takes mass-production into consideration will be described below with reference to FIGS. 43A and 43B. FIG. 43A is a schematic plan view showing the arrangement of the system, and FIG. 43B is a schematic side view showing the arrangement of the system.

A conveyor 602 coupled to a heating apparatus 606 conveys the glass-face plate 2 into the heating apparatus 606. Likewise, a conveyor 604 coupled to the heating apparatus 606 conveys the jig 68 on which the spacers 4 were held in the previous process into the heating apparatus 606.

The heating apparatus 606 heats the conveyed members to be processed using a hot gas device 606*a* or heating plate 606*b* from room temperature to 350° C. over 33 min. After the apparatus 606 transfers the members to be processed to an assembling/bonding apparatus 620, the interior of the heating apparatus 606 or the heating plate 606*b* is cooled from 350° C. to room temperature. The members to be processed are transferred to the assembling/bonding apparatus 620 as follows.

A chucking hand 608 of a convey robot 610 is inserted into the heating apparatus 606 via an open door 606*c*, and chucks the peripheral portion of the surface, which is not used for image display, of the glass-face plate 2, which has been heated to 350° C. by the heating apparatus 606. When the convey robot 610 carries the chucked glass-face plate 2 outside the heating apparatus 606, the chucking hand 608 reverses the direction of the surface of the glass-face plate 2, so that the surface to which the spacers 4 are to be bonded faces down. Thereafter, the chucking hand 608 carries the glass-face plate 2 into the assembling/bonding apparatus 620, and sets it in the initial state of the above-mentioned process of bonding the spacers 4 onto the glass-face plate 2. Similarly, the vertically movable chucking hand 608 of the convey robot 610 chucks the jig 68, and carries it into the assembling/bonding apparatus 620 at a position lower than the chucking position of the glass-face plate 2 and sets it in the initial state. Therefore, the glass-face plate 2 is held by the upper heating plate 20, and the jig 68 is held by the lower heating plate 26. At this time, the temperature of the upper and lower heating plates 20 and 26 is 350° C., and these plates are heated to 450° C., thus executing the above-mentioned bonding (adhesion) process. Upon completion of bonding, the heating plates are cooled to 350° C.

A chucking hand 612 of a convey robot 614 having the same arrangement as that of the convey robot 610 carries the glass-face plate 2 from the assembling/bonding apparatus 620 into a cooling apparatus 616. At this time, the chucking hand 612 chucks the glass-face plate, and carries it outside the assembling/bonding apparatus 620. Then, the chucking hand 612 reverses the direction of the glass-face plate 2, conveys the glass-face plate 2 with the surface bonded with the spacers 4 facing up into the cooling apparatus 616 via an open door 616*a*, and places it on a conveyor 618. Likewise, the chucking hand 612 chucks the jig 68, and places it on a conveyor 619. The cooling apparatus 616 cools the glass-face plate 2 and the jig 68 from 350° C. to room temperature over 33 min. The jig 68 carried by the conveyor 619 is returned to the process of holding the spacers 4.

On the other hand, the cooled glass-face plate 2 on which the spacers 4 are bonded enters the next process that has the same arrangement as that of the system shown in FIGS. 43A and 43B. More specifically, the glass-face plate 2 is carried into the heating apparatus 606 to be bonded to the glass-rear plate 1. In this case, the heating apparatus 606 is heated up to 410° C. Upon executing the bonding process of the glass-face plate 2 and the glass-rear plate 1, the conveyor 604 conveys the glass-rear plate 1 on which the outer frame 272 is temporarily fixed in the previous process into the heating apparatus 606. In this case, the outer frame 272 may be temporarily fixed to the glass-face plate 2. However, in the method of holding the glass-face plate 2 on the upper heating plate 20, it is practical to temporarily fix the outer frame 272 to the glass-rear plate 1 in terms of the weight of the outer frame 272. Of course, if the glass-rear plate 1 is held on the upper heating plate 20, the outer frame 272 can be temporarily fixed to the glass-face plate 2.

In this process, since the glass-face plate 2 and the glass-rear plate 1 are bonded to each other, only one member is carried outside from the assembling/bonding apparatus 620, and hence, one conveyor need only be connected to the cooling apparatus 616.

Figure 44A:
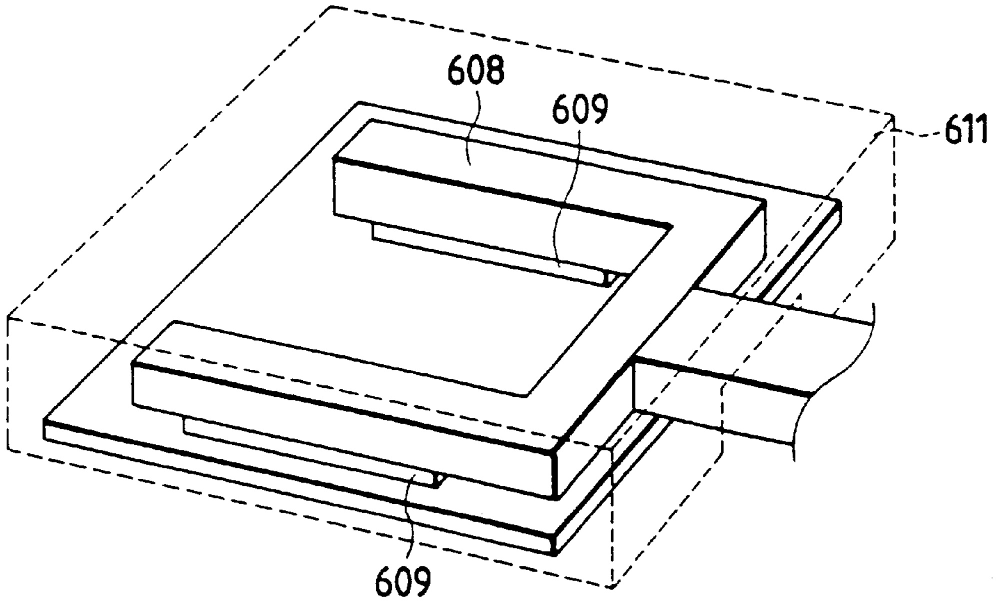
FIG. 44A is a schematic view showing the arrangement of a chucking hand.
Figure 44B:
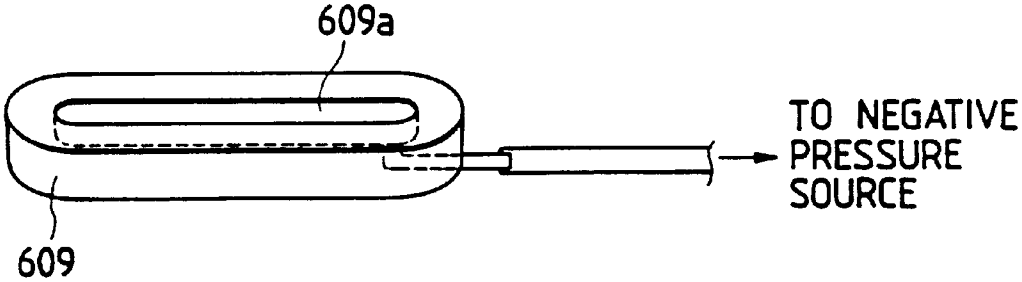
FIG. 44B is a view showing a chucking pad used for the chucking hand.

The chucking hand 608 will be described below with reference to FIGS. 44A and 44B. FIG. 44A shows the schematic arrangement of the chucking hand 608, and FIG. 44B shows a chucking pad used in the chucking hand 608.

Since the chucking hand 608 vacuum-chucks the glass-plate heated to 350° C. to 450° C., pads 609 having chucking ports 609*a* consist of asbestos or the like having high heat resistance and high heat insulating properties are used. The pads 609 with this arrangement do not inflict any thermal distortion to the glass plate heated to 350° C. to 450° C. Note that the chucking hand 608 comprises a cover 611 to prevent the chucked member from being cooled during conveyance.

Improvement in Assembling/bonding Apparatus

Figure 45:
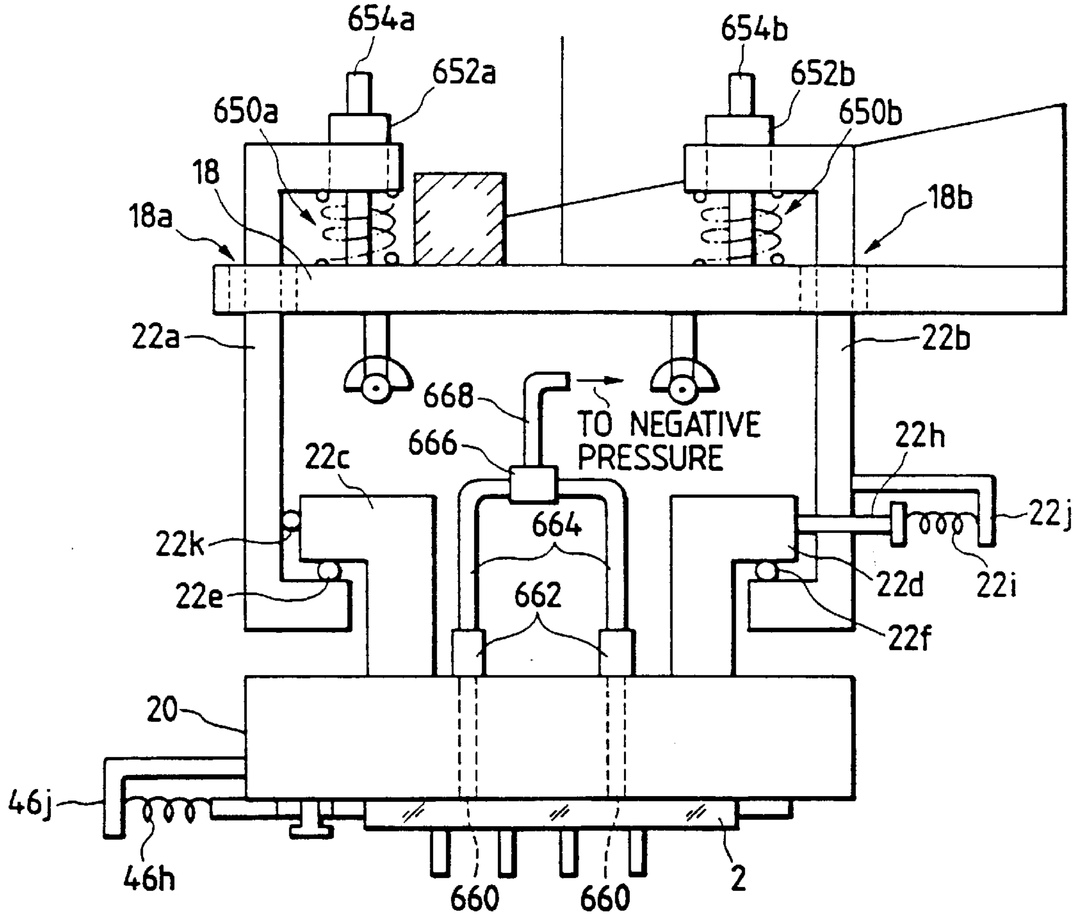
FIG. 45 is a schematic view for explaining an example of an improved assembling/bonding apparatus.
Figure 46:
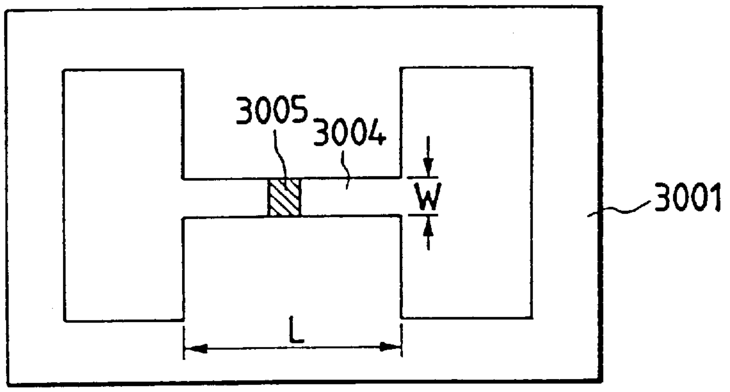
FIG. 46 PRIOR ART
FIG. 46 is a view showing an example of the typical element arrangement of an electron-emitting device.
Figure 47:
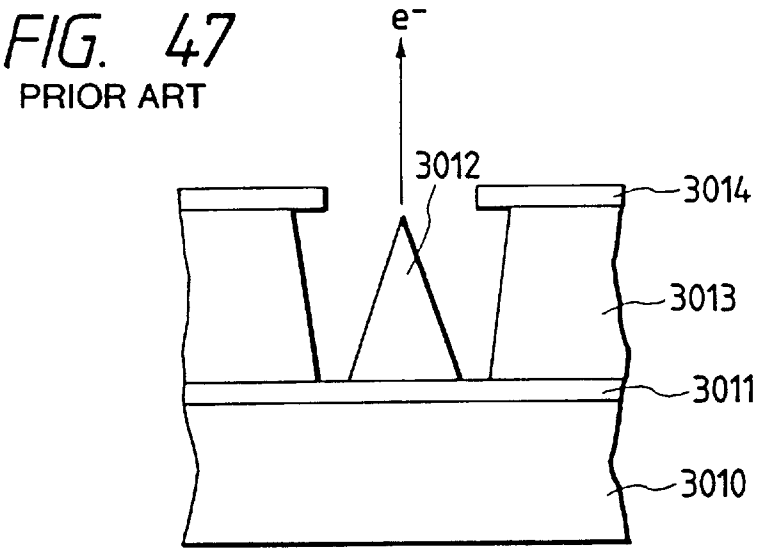
FIG. 47 PRIOR ART
FIG. 47 is a view showing another example of the typical element arrangement of an electron-emitting device.
Figure 48:
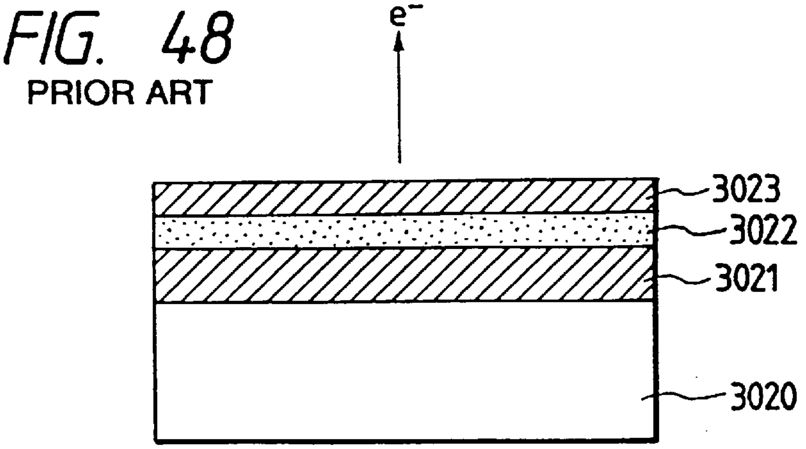
FIG. 48 PRIOR ART
FIG. 48 is a view showing an example of the typical element arrangement of a metal/insulating layer/metal type emission element.

The above-mentioned assembling/bonding apparatus may be improved as follows. This improvement will be explained below with reference to FIG. 45. FIG. 45 shows principal part of the apparatus shown in FIG. 2.

When the placing surface of the upper heating plate 20 is not kept parallel to that of the lower heating plate 26, or when the glass plates 1 and 2 are formed into a wedge shape, the glass-face plate 1 and the glass-rear plate 2 may be undesirably bonded to each other since the gap therebetween is not uniformly held. In this improvement, this problem is eliminated by providing a compliance compensation structure to upper heating plate 20.

The suspension metal member columns 22*a* and 22*b* are supported on the up-down table 18 via the through holes 18*a* and 18*b* formed on the up-down table 18, and springs 650*a* and 650*b*. Linear bearings 652*a* and 652*b* are respectively fixed to the suspension metal member columns 22*a* and 22*b*, and are fitted on shafts 654*a* and 654*b* which stand upright on the up-down table 18. Hence, the bearings 652*a* and 652*b* are slidable along the shafts 654*a* and 654*b*.

The above-mentioned degree of non-parallelism is about 0.2 mm at maximum, and when the spring constant of each of the springs 650*a* and 650*b* is set to be 1 kg/mm, a parallel state can be obtained by applying a force of 0.2 kg. Therefore, upon compression bonding of the glass plates 1 and 2, the glass plates 1 and 2, and the spacers 4 are not damaged by applying the above-mentioned force.

The suspension metal member columns 22*a* and 22*b* are movable in only the vertical direction of the apparatus since they are restricted by the shafts 654*a* and 654*b* and the linear bearings 652*a* and 652*b*. Hence, upon alignment of the plates, the heating plate 20 must stand still in the horizontal direction. However, in this improvement, no problem is posed.

In each of the above embodiments, the glass-face plate 2 is mechanically chucked but may be vacuum-chucked. In this case, four chucking holes 660 each having a diameter of 4 mm are formed on the upper heating plate 20. These holes are connected to a negative pressure source via stainless-steel air connectors 662, pipes 664, coupling connectors 666, and pipes 668 to attain required vacuum chucking. Upon executing such vacuum chucking, when the upper heating plate 20 is moved upward by 2 to 3 mm after the vacuum chuck of the glass-face plate 2 is released and the biasing state of the plate press pieces 46*e*, 46*f*, 46*k*, and 46*l* is released manually or by a robot device (not shown), the influence of shrinkage of the upper heating plate 20 can be prevented from being transmitted to the lower heating plate 26 side, and hence, the manufactured glass panel (image display apparatus) can be prevented from being damaged.

According to the manufacturing apparatus and method of this embodiment described above, in an image display apparatus constituted by arranging a pair of opposing glass plates, the glass plates are not merely heated and bonded after the positions of the two glass plates are aligned at room temperature. That is, when an adhesive is applied to the bonding portion between the enclosure and the two glass plates, and the two glass plates are bonded by compressing and heating them, the position alignment is repetitively performed until the adhesive solidifies, thus suppressing position displacements between the two plates due to thermal expansion caused by heating, and improving bonding accuracy. For this reason, the image display apparatus is free from any position displacement between electron-emitting devices formed on the glass-rear plate and light-emitting members (phosphors) formed on the glass-face plate, and hence, a satisfactory image display apparatus free from any color misregistration can be formed.

In this embodiment, when the two glass plates undergo thermal shrinkage in the solidification process of the adhesive (steps 17 and 35) during the cooling process, the cylinder rods of the X-, Y-, and θ-axis air cylinders of the XYθ table for fixing one glass plate are retracted by pneumatic pressure to set the respective axis in the freely movable state, or one glass plate is separated from one heating plate, so as to prevent the glass plates from being destroyed or peeled due to concentration of the shearing force on the bonded portions when the two glass plates are fixed to the position alignment means or the heating plates.

For this reason, upon thermal shrinkage of the two glass plates, concentration of the shearing force generated on the bonded portions between the outer frame and the two glass plates in the case of an image display apparatus without any spacers or of the shearing force generated on the bonded portions between the spacers and the glass plates in the case of an image display apparatus with spacers can be reduced, and the bonded portion between the spacers and/or outer frame, and the two glass plates can be prevented from being peeled or the spacers with low mechanical strength can be prevented from being destroyed, thus obtaining a structure having sufficiently tightly seal and atmospheric pressure resistance as a vacuum chamber.

Furthermore, in place of performing all the processes by one apparatus, the heating and cooling processes of the heating, position alignment, and cooling processes are performed by special-purpose apparatuses in addition to the assembling apparatus, thus improving productivity.

In the description of the above embodiment, since it is important to form a chamber (enclosure or an image display apparatus) having a high-atmospheric pressure resistance structure to attain high-accuracy position alignment between two glass plates, the method of forming electron-emitting devices or the type of electron-emitting device to be used is not described. The above embodiment adopts a field emission type electron-emitting device, a surface conduction type electron-emitting device, and the like, which serve as cold cathode electron sources and described in the paragraphs of the related art.

May widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for manufacturing a chamber, the chamber constituted by first and second glass substrates and an enclosure arranged between said first and second substrates or an enclosure and at least one spacer arranged between said first and second substrates, comprising:

(a) a pair of heating plates which can respectively hold said first and second substrates and comprise heaters for heating said first and second substrates;

(b) a temperature controller for controlling temperatures of the heaters;

(c) position alignment means for moving at least one of said pair of heating plates in X-, Y-, and θ-directions;

(d) first driving means for driving said position alignment means;

(e) second driving means for moving at least one of said pair of heating plates in a Z-direction;

(f) image monitoring means for monitoring positions of said first and second substrates; and (g) control means for supplying a command to one of said first and second driving means on the basis of information supplied from said image monitoring means.

2. An apparatus according to claim 1, wherein a through hole for monitoring the positions of said first and second substrates by said image monitoring means is formed on at least one of said pair of heating plates.

3. An apparatus according to claim 1, wherein said pair of heating plates consist of aluminum or stainless steel.

4. An apparatus according to claim 1, wherein the heaters are built in said pair of heating plates.

5. An apparatus according to claim 4, wherein the heaters are divided into a plurality of members, which are respectively controlled by said temperature which are respectively controlled by said temperature controller.

6. An apparatus according to claim 1, wherein said image monitoring means comprises a CCD camera.

7. An apparatus according to claim 1, further comprising detection means for detecting a solidification state of a bonding agent applied between said first and second substrates and said enclosure or said enclosure and said at least one spacer.

8. An apparatus according to claim 7, wherein said detection means detects a pre-set estimated solidification temperature.

9. An apparatus according to claim 7, wherein said detection means detects a torque of said first driving means.

10. An apparatus according to claim 7, wherein said detection means detects a displacement amount of said first and second substrates before and after the positions of said first and second substrates are moved by said position alignment means.

11. An apparatus according to claim 1, further comprising vibrating means for vibrating at least one of said pair of heating plates.

12. An apparatus according to claim 11, wherein said control means controls said vibrating means.

13. An apparatus according to claim 1, further comprising a heating device and a cooling device.

* * * * *

UNITED STATES PATENT AND TRADEMARK OFFICE

CERTIFICATE OF CORRECTION

PATENT NO. : 5,928,399

DATED : July 27, 1999

INVENTOR(S) : TAKESHI YAKOU, ET AL.

It is certified that error appears in the above-identified patent and that said Letters Patent is hereby corrected as shown below:

Drawings:

AT SHEET 22, FIGURE 25

"ACCURAY" should read --ACCURACY--.

Title page, item

[57] ABSTRACT

Line 16, "device" should read --device.--

COLUMN 3

Line 28, "et at." should read --et al.--.
Line 51, "are" should read --is--.

COLUMN 7

Line 12, "th" should read --the--.
Line 13, "e" should be deleted.

COLUMN 11

Line 31, "member" should read --members--.

UNITED STATES PATENT AND TRADEMARK OFFICE
CERTIFICATE OF CORRECTION

PATENT NO. : 5,928,399

DATED : July 27, 1999

INVENTOR(S) : TAKESHI YAKOU, ET AL.

It is certified that error appears in the above-identified patent and that said Letters Patent is hereby corrected as shown below:

COLUMN 22

Line 41, "$L_{y1}$" should read --$l_{y1}$--.

COLUMN 29

Line 62, "4.5 $10^7$" should read --4.5 x $10^7$--.

COLUMN 31

Line 63, "410°0C." should read --410°C.--.

COLUMN 32

Line 11, "equipments." should read --equipment.--.
Line 16, "waits" should read --awaits--.
Line 21, "plate" should read --Plate--.

COLUMN 33

Line 64, "an" should read --a--.
Line 65, "an" should read --a--.

COLUMN 34

Line 66, "410°0C." should read --410°C.--.

UNITED STATES PATENT AND TRADEMARK OFFICE

CERTIFICATE OF CORRECTION

PATENT NO. : 5,928,399

DATED : July 27, 1999

INVENTOR(S) : TAKESHI YAKOU, ET AL.

It is certified that error appears in the above-identified patent and that said Letters Patent is hereby corrected as shown below:

COLUMN 35

Line 59, "1," should read --1--.

COLUMN 37

Line 4, "plate" should read --Plate--.
Line 5, "plate" should read --Plate--.

COLUMN 44

Line 4, "consist" should read --consists--.
Line 9, "are" should read --is--.

Signed and Sealed this

Eighth Day of February, 2000

Attest:

Q. TODD DICKINSON

*Attesting Officer*

*Commissioner of Patents and Trademarks*